United States Patent
Hoffer, Jr.

(10) Patent No.: US 9,857,159 B1
(45) Date of Patent: Jan. 2, 2018

(54) VELOCITY COMPENSATED FREQUENCY SWEEPING INTERFEROMETER AND METHOD OF USING SAME

(71) Applicant: John M Hoffer, Jr., Columbia, MD (US)

(72) Inventor: John M Hoffer, Jr., Columbia, MD (US)

(73) Assignee: TVS Holdings, LLC, Columbia, MD (US)

( * ) Notice: Subject to any disclaimer, the term of this patent is extended or adjusted under 35 U.S.C. 154(b) by 507 days.

(21) Appl. No.: 14/494,862

(22) Filed: Sep. 24, 2014

Related U.S. Application Data

(60) Provisional application No. 61/881,560, filed on Sep. 24, 2013.

(51) Int. Cl.
| | | |
|---|---|---|
| *G01B 11/14* | (2006.01) | |
| *G01S 7/481* | (2006.01) | |
| *G01B 9/02* | (2006.01) | |

(52) U.S. Cl.
CPC ..... *G01B 9/02077* (2013.01); *G01B 9/02083* (2013.01); *G01B 11/14* (2013.01)

(58) Field of Classification Search
CPC ....................... G01B 9/02077; G01B 9/02083; G01B 11/14; G01B 11/02; G01S 7/481; G01S 7/499; G01S 17/36
See application file for complete search history.

(56) References Cited

U.S. PATENT DOCUMENTS

| | | | |
|---|---|---|---|
| 4,714,339 A | 12/1987 | Lau et al. | |
| 4,790,651 A | 12/1988 | Brown et al. | |
| 5,305,091 A | 4/1994 | Gelbart et al. | |
| 5,371,587 A | 12/1994 | de Groot et al. | |

(Continued)

FOREIGN PATENT DOCUMENTS

EP          0880674 A1     12/1998

OTHER PUBLICATIONS

Gorecki et al., Multifunction Wavelength-Shift Interferometry: Absolute Distance and Velocity Measurements, Dec. 12, 1994, Proc. SPIE 2340, Interferometry '94: New Techniques and Analysis in Optical Measurements, pp. 356-365.*

(Continued)

*Primary Examiner* — Toan Le
(74) *Attorney, Agent, or Firm* — Invention To Patent Services; Alex Hobson

(57) ABSTRACT

A velocity-compensated frequency sweeping interferometer has a single measurement light producing device that produces a coherent light source consisting of a single light beam. The light producing device produces a scanning wavelength light beam. A primary beam splitter produces a first reference beam and a first measurement beam from said single light beam. The first reference beam travels a fixed path length to a primary reference reflector and the first measurement beam travels to and from a moveable reflective target over an unknown path length. A distance measurement interferometer is created by interfering the first reference beam with the first measurement beam. A return frequency measurement interferometer provides a measure of frequency of the return beam from the target which, when compared with the frequency of the outgoing beam, allows for velocity compensation of the target.

22 Claims, 70 Drawing Sheets

(56) References Cited

U.S. PATENT DOCUMENTS

| | | |
|---|---|---|
| 5,412,474 A | 5/1995 | Resenberg et al. |
| 5,530,549 A | 6/1996 | Brown et al. |
| 6,049,377 A | 4/2000 | Lau et al. |
| 6,359,692 B1 | 3/2002 | de Groot |
| 6,675,122 B1 | 1/2004 | Markendorf et al. |
| 7,230,689 B2 | 6/2007 | Lau et al. |
| 7,312,862 B2 | 12/2007 | Zumbrunn et al. |
| 7,576,836 B2 | 8/2009 | Bridges |
| 8,670,114 B2 | 3/2014 | Bridges et al. |
| 8,773,667 B2 | 7/2014 | Edmonds et al. |
| 2003/0234936 A1 | 12/2003 | Marron |
| 2004/0066520 A1 | 4/2004 | Marron |
| 2004/0075843 A1 | 4/2004 | Marron et al. |
| 2004/0075844 A1 | 4/2004 | Marron et al. |
| 2006/0061773 A1 | 3/2006 | Lee et al. |
| 2007/0206200 A1 | 9/2007 | Lindner et al. |
| 2009/0091767 A1 | 4/2009 | Liang |
| 2009/0207418 A1* | 8/2009 | Kim .................. G01B 9/02004 356/498 |
| 2010/0053633 A1 | 3/2010 | Jansen |
| 2010/0134786 A1 | 6/2010 | De Lega et al. |
| 2011/0292405 A1 | 12/2011 | Dunn et al. |
| 2013/0148129 A1 | 6/2013 | Warden et al. |
| 2013/0155413 A1 | 6/2013 | Liesener et al. |
| 2013/0170010 A1 | 7/2013 | Parker |

OTHER PUBLICATIONS

Abstract of Gorecki et al. reference, Dec. 12, 1994, 2 pp.*
Bosch et al., Optical Feedback Interferometry for Sensing Application, Jan. 2001, Society of Photo-Optical Instrumentation Engineers, Opt. Eng. 40(1), pp. 20-27.*

* cited by examiner

| Current State | Event | New State |
|---|---|---|
| No Target | Target Acquired | Forced FFI |
| Forced FFI | Target Lost | No Target |

| Current State | Event | New State |
|---|---|---|
| No Target | Target Acquired | Forced FSI |
| Forced FSI | Target Lost | No Target |

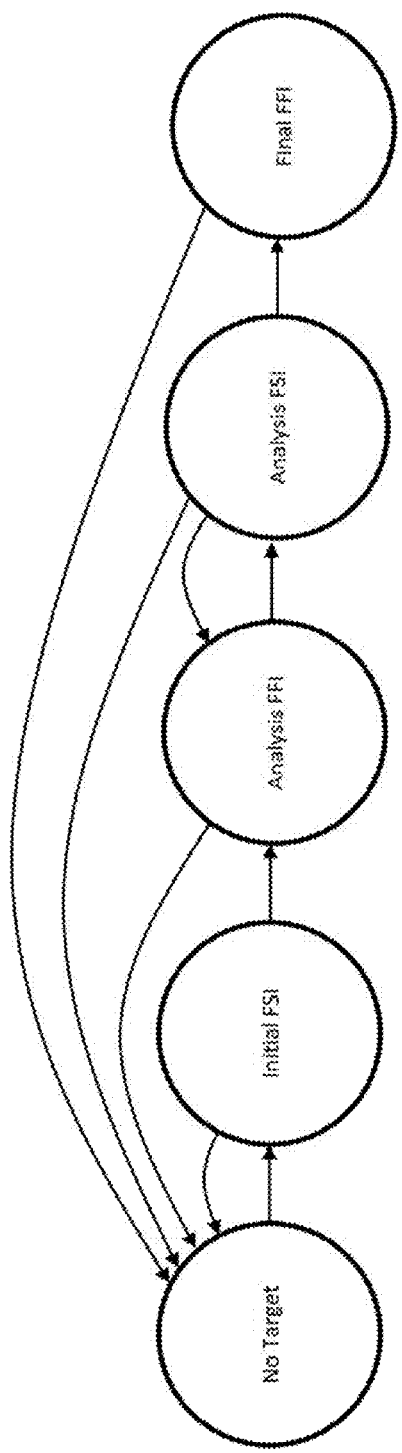

FIG. 58

| Current State | Event | New State |
|---|---|---|
| No Target | Target Acquired | Initial FSI |
| Initial FSI | Target Lost | No Target |
| Initial FSI | Measurement Completed | Analysis FFI |
| Analysis FFI | Target Lost | No Target |
| Analysis FFI | Target Criteria Met | Analysis FSI |
| Analysis FSI | Target Lost | No Target |
| Analysis FSI | Measurement Criteria Met | Final FSI |
| Analysis FSI | Measurement Criteria Not Met | Interim FFI |

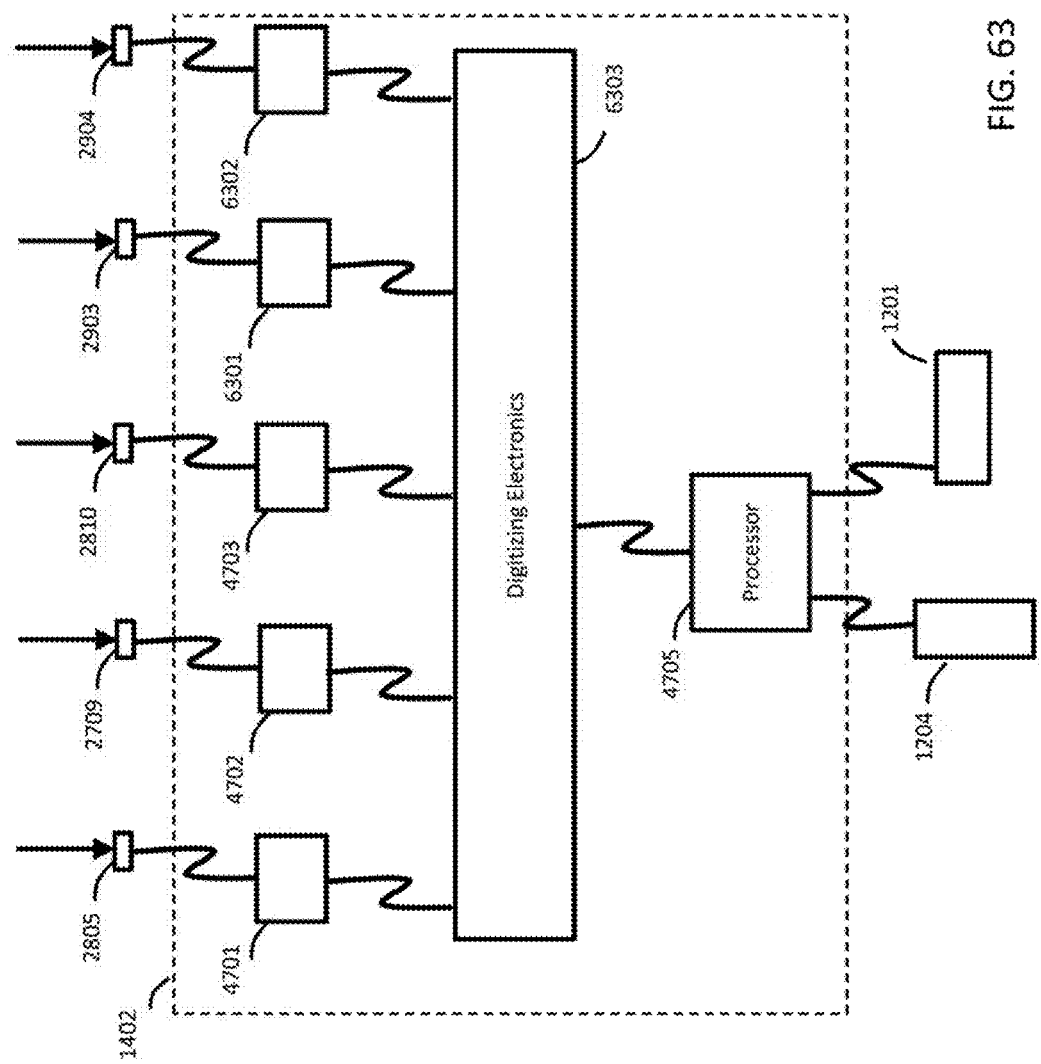

VELOCITY COMPENSATED FREQUENCY SWEEPING INTERFEROMETER AND METHOD OF USING SAME

CROSS REFERENCE TO RELATED APPLICATIONS

This application claims the benefit of U.S. Provisional Patent Application No. 61/881,560, filed on Sep. 24, 2013 and entitled Multi-Mode Frequency Sweeping Interferometer and Method of Using Same; the entirety of which is incorporated by reference herein.

BACKGROUND OF THE INVENTION

Field of the Invention

The present invention relates to interferometers configured to measure distances to a target

Background

Distance measurement devices using coherent light sources are often described in two broad categories: relative measurement devices or absolute measurement devices. We will see however that in many systems, this distinction is really just a function of the ambiguity range of the device and the context in which it is used. Many systems use a combination of relative and absolute measurement devices to provide a mix of ease-of-use as well as speed and accuracy. In metrology, interferometers are often used to measure the displacement of an object, which can range from a few nanometers to hundreds of meters.

The most common measurement devices are known as interferometers, which use the wave nature of light and measure relative changes in two optical paths that are derived from a single coherent source with a fixed frequency and therefore a fixed wavelength. The two optical paths are then merged back together. Depending on the difference in distance of the two paths, the waves will have either constructive interference or destructive interference. For our purposes, we will consider one path being fixed in length and refer to it as the reference path. The other path we will consider as having a variable length and refer to that as the measurement path.

FIG. 2 is an example of a Michelson interferometer. Here, a coherent light source 200 passes through a splitter 201 that divides the beam into two paths, a reference path and measurement path. The reference path remains a fixed length while the measurement path can vary. A reference beam 205 reflects back as beam 207 from reflector 206. A measurement beam 202 is reflected back as beam 204 from target 203. The beams combine at the splitter to form an interference beam 208 measured by sensor 209. The sensor detects changes in light intensity that come from constructive and destructive interference as the length of the measurement path changes with respect to the reference path. The sensor converts intensity to an electrical signal by sensor 209 and is processed by electronics, which are not shown.

FIG. 3 shows example measurement and reference beams that have a 0-degree phase difference. Shown is reflected reference beam 207 as a wave of light 301 of zero degrees phase angle and reflected measure beam 204 as a wave of light 302 with zero degrees phase angle. Both light waves in this example have the same intensity. The combined beam 208 created by the beam splitter creates a light wave 303 that is double the intensity of either of the individual waves.

FIG. 4 shows example measurement and reference beams that have a 90-degree phase difference. The reflected reference beam 207 and corresponding light wave 301 remain unchanged from the example in FIG. 3. However, measure beam 204 is now a light wave 401 shifted by 90 degrees but still with the same intensity. The combined beam 208 is now a light wave 402 of reduced intensity compared to light wave 303 in FIG. 3.

FIG. 5 shows example measurement and reference beams that have a 180 degree phase difference. The reflected reference beam 207 and corresponding light wave 301 remain unchanged from the example in FIG. 3. However, measure beam 204 is now a light wave 501 shifted by 180 degrees but still with the same intensity. The combined beam 208 is now a light wave 502 of zero intensity.

From FIG. 3, FIG. 4, and FIG. 5, it is clear that if the measurement path does not vary more than one half of a wavelength, you have an absolute measurement within that range by evaluating the intensity of the combined beam and relating that to the minimum and maximum intensities. Because the measurement beam travels to the target and back, the change in phase is twice that of the target movement, so the most the target position can vary, and still be measurable, is one fourth of a wave. By way of example, if a wavelength of 633 nm is used, the target can be displaced along the beam path from 0 nm to 158.25 nm. For many applications, this distance is not practical. To compensate, the transitions from light to dark are counted as the target moves thus providing an accurate relative measurement of the distance. This can be converted to an absolute distance if the counter is reset while the target is placed at a known distance from the device. We will refer to this type of measurement as Fixed Frequency Interferometry or FFI.

FIG. 6 is an alternate interferometer design called the Mach-Zehnder interferometer, which has a coherent light source 600 that is split by beam splitter 601. The split beam 602 travels to a mirror 603 which transmits a reflected beam 604. The other split beam 605 travels to mirror 606 which transmits reflected beam 607. Beam 604 and beam 607 are combined at beam splitter 608 and interfere based on their phase relationship to produce interference beam 609. The intensity is converted to an electrical signal by sensor 610 and is processed by electronics, which are not shown. This type of interferometer can measure a change in optical path distance caused by objects inserted into one of the paths.

Fixed Frequency Interferometry has the advantage of high accuracy even with a moving target. However, the measurement is relative, so to get an absolute distance to the reflector, the interferometer must first be reset when the reflector is at a known distance. If the beam is interrupted, the target must be returned to a known location to be reset.

It is possible to increase the ambiguity range by using heterodyne techniques as shown in FIG. 7. In this design, a first coherent light of fixed frequency 700 is mixed with a second coherent light of close but not identical fixed frequency 701 that when mixed produce a combined signal 702 with a beat frequency 703. This beat frequency translates to a longer wavelength, and therefore increases the ambiguity range. In addition, it creates other advantages such as improved performance as the intensity of light changes and higher accuracy for a moving target. U.S. Pat. No. 3,458,259, U.S. Pat. No. 4,688,940 and U.S. Pat. No. 5,274,436 disclose inventions related to Heterodyne Interferometers. The heterodyne design generally has simpler sensing electronics but more complicated source opto-electronics, so generally this design is more expensive than its homodyne counterpart because of the need for an additional laser or Axouso-Optic, AO, modulators. In addition, the increase in ambiguity range is limited by the existing technology.

Other absolute distance measurement systems, or ADM systems, have been developed to overcome the limitations of interferometer-based systems. The simplest form is a time-of-flight system. In this design, shown in FIG. 8, a light source is pulsed 800, and the elapsed time to receive the reflected pulse back 801 to the device is measured. The pulse travels at the speed of light (c), so the total distance traveled is calculated by multiplying c times the elapsed time. The distance traveled must be divided by two since the pulse travel distance is both to and from the target. The maximum range is limited by the frequency at which the pulses are generated, but trades off the frequency at which the distance can be measured. Therefore, doubling the pulse frequency will cut the maximum measurement range in half but it will take measurements twice as fast, which is advantageous when the target is moving. The maximum measurement rate is limited by the smallest pulse that can be generated. A more limiting aspect of this design is the minimum distance. As the target approaches the measuring device, the time of flight begins to approach the limit that the electronics can measure the time. Accuracy is limited by measuring electronics and the accuracy of the clocks used for timing, making it difficult to achieve micron level accuracy because a single micron error in the target position equates to a timing error as small as $7 \times 10^{-15}$ seconds.

Pulse compression techniques that involve modulating the pulse are used in radar to improve the performance of the time of flight measurement. However, these techniques do not translate well to light based applications where high accuracy is required because technology is limited.

Rather than generating pulses, the light source can be modulated continuously. The technology exists to modulate light sources at frequencies that are multiple gigahertz, which corresponds to wavelengths of 125 mm or smaller. The modulated light is sent to and reflected by a target. The receiving electronics may down convert the signal to make the digital processing more manageable. Alternately, the received signal can be under-sampled to produce an aliased lower frequency. The phase of the measured signal corresponds to a distance to the moveable target within a single wavelength. The design can be improved by adding a reference channel that measures a fixed distance. FIG. 9 shows an example reference channel 900 with a signal of 0 degrees phase 902 and a measure channel 901 with a signal of 90 degrees 903. The phase difference of 90 degrees is ¼ of a wave and is multiplied by the wavelength to convert it to a distance such as meters. Multiple modulation frequencies can be used to overcome the mm ambiguity range and extend the measurements. U.S. Pat. No. 7,701,559 defines such a system, which has measurement and reference channels, down-converting electronics, a method to digitized and extract the phase, and a method to compensate for a moving target. These systems have high accuracy and work well with a moving target. However, the accuracy is not as high as an interferometer. The systems are sometimes subject to drift that are not found in interferometer based systems. U.S. Pat. No. 6,847,436 describes some of these limitations and possible solutions. Implementing these systems can be challenging because of the high frequency modulation, which requires some special handling to minimize electrical noise.

An alternate ADM solution is Frequency Sweeping Interferometry, or FSI, which can measure an absolute distance using interferometry techniques. The concept takes the basic interferometer and replaces the fixed frequency laser with a laser having a selectable frequency, referred to as a tunable laser. The key advantage of this concept is that it does not have an ambiguity range issue to overcome like other ADM solutions and is only limited by the coherence length of the laser, so it is especially useful for long range measurements.

FSI works off of the fact that interference between the reference and measure beams changes either because the path length changes (e.g. the reflector on one path is moved) or because the wavelength changes as demonstrated in FIG. 3, FIG. 4, and FIG. 5. Simple FSI assumes for a short period of time that the measurement path is fixed while the wavelength is swept over a known range. By way of example, FIG. 10, which shows a reference path 1000 traversed by a beam of light 1001 with a length of 12 waves and measurement path 1002 traversed by a beam of light 1003 with a length of 24 waves. From this example, the optical path difference, or OPD, is 12 waves. If the wavelength is known to be 500 nm, then the OPD can be calculated to be 6000 nm. However, because the interferometer measurement is relative, the number of waves in each path is not known and therefore the OPD distance cannot be calculated. Only the interference fringes can be counted as the OPD changes. To create this change, frequency of the light can be changed, which of course changes the wavelength. FIG. 11 shows the result of quadrupling the wavelength. The same reference path 1000 is traversed by a beam of light 1101 that now has a length of 3 waves. The same measurement path 1002 is now traversed by a beam of light 1103 that now has a length of 6 waves. During the change in wavelength, the interferometer will count the difference between the reference path change of 9 waves and the measure path change of 18 waves, which results in a net change of 9 waves or the change in the OPD. Those skilled in the art will recognize that the change in wavelength creates a synthesized wavelength based on the following equation:

$$\frac{\lambda_2 \lambda_1}{\lambda_2 - \lambda_1} \quad (1)$$

Where $\lambda_1$ is the initial wavelength and $\lambda_2$ is the final wavelength. In the example provided, the starting wavelength was 500 nm and the final wavelength was 2000 nm creating a synthesized wavelength of 666.6667 nm; that when multiplied by the 9 waves of changes produces an OPD of 6000 nm.

"High-precision absolute laser interferometer distance measurement system", Zhang et al. describes a basic FSI system. Their implementation has a tunable laser combined with a Michelson interferometer. This system relies heavily upon the accuracy of the frequencies generated by the tunable laser since there is no feedback as to the actual range swept by the laser. Given the existing technology, the accuracy will degrade over time and temperature as the frequencies generated by the tunable laser drift.

"Laser interferometer for absolute distance measurement based on a tunable VCSEL laser", O. Číp, B. Mikel and J. Lazar and "Absolute Distance Measurement using Frequency Scanned Interferometry", Yang et al. propose improvements to the basic FSI system in that they add a measurement of the frequency sweep using a Fabry-Perot interferometer. In these designs, the frequency sweep is measured or controlled as needed to improve the accuracy of the measurement. It is important to note that tip et al. discloses that a tunable laser may in fact be derived from other types of lasers as a side effect of the design. For example, changing the input current of certain lasers will impact both the output power as well as the frequency, so if the desired frequency sweep is small, it may be adequate to use one of these lasers rather than one specifically designed to be tunable.

"Dimensional Metrology and Frequency Sweeping Interferometry", Cabral et al. builds upon the FSI Fabry-Perot design by adding a longer reference path and adding a reference interferometer to monitor the reference path, effectively creating a system with three separate interferometers. This paper points out a key weakness in the design, which is movement of the target during the frequency sweep operation. This is due to the fact that the frequency is no longer fixed and therefore the relative measurement capability of the interferometer is lost and can only be addressed by mathematical compensation, which is still limited to low acceleration in the measurement path. This limitation is a problem for some applications.

Laser trackers, as disclosed in U.S. Pat. No. 4,790,651 Tracking Laser Interferometer, to Brown et al. and U.S. Pat. No. 4,714,339, Three and Five Axis Laser Tracking Systems, to Hoken et al., discuss the combined usage of an interferometer with a tracking system to provide at least a three dimensional location of the target. Given the convenience of an ADM system, they have been added to trackers. U.S. Pat. No. 7,701,559 ADM Measures Moving Retro Bridges et al. discusses the improvements to the use of an ADM on a moving target. However, an ADM only type system still does not have the accuracy of an interferometer based system. U.S. Pat. No. 7,609,387 Method and Measuring Device for Measuring and Absolute Distance, to Meir discusses and ADM system in combination with an interferometer system to get both convenience and accuracy. However, this dual system solution carries significantly more cost. U.S. Pat. No. 7,538,888 tries to address this problem in a laser tracker by replacing the ADM system with a method to estimate the distance, which certainly reduces the cost. However, methods such as this on a laser tracker have lower accuracy than any of the discussed ADM systems.

U.S. Pat. No. 3,970,389, to Mendrin, et al. and U.S. Pat. No. 7,292,347, to Tobiason et al., disclose a system which performs both frequency scanning interferometry and fixed frequency interferometry. However, these systems require two lasers to perform this operation and so increase the complexity and expense.

U.S. Pat. No. 5,781,295 discloses an absolute distance measurement interferometer. In this design, two separate lasers, one of which is tunable, are combined through a combining optic such as a beam splitter. The combined beam is then passed through an acousto-optic modulator, which creates two separate beams of slightly different frequencies. The configuration is then similar to a heterodyne interferometer when the beam of one wavelength is transmitted and reflected from the measurement target and then combined with a reference beam of a slightly different wavelength.

SUMMARY OF THE INVENTION

The above and other problems and disadvantages of the prior art are overcome and alleviated by the embodiments disclosed in the present device, which has multiple measurement modes in that is can perform both an absolute distance measurement using frequency scanning interferometry and a relative distance measurement using fixed frequency interferometry. The invention is directed to a measurement device that is capable of measuring a one dimensional absolute distance to a reflective target using a coherent light source with an adjustable frequency. This same device then has the ability to switch to operating as a standard interferometer performing accurate relative measurements. The discussed features and advantages of the present apparatus and methods will be appreciated and understood by those skilled in the art from the following detailed description and drawings.

In an exemplary embodiment a velocity compensated frequency sweeping interferometer of the present invention comprises a single measurement light producing device that produces a coherent light source consisting of a single light beam, such as a laser beam. The single measurement light producing device is configured to transition the single light beam between a fixed light beam to a scanning wavelength light beam. In an exemplary embodiment, the single light beam is directed to a distance measurement interferometer comprising one or more optics and the light beam is split to produce a first reference beam and a first measurement beam. The reference beam travels a path of fixed distance and the measurement beam travels to a moveable reflective target. Both beams reflect and return to the optics and are combined to produce an interference beam. This interference beam is directed to an optoelectronic component that converts the interference beam into one or more first electrical signals. Digitizing electronics convert the electrical signals into digital values that are utilized by a processor having one or more algorithms to provide a measured distance value to the movable reflective target. The processor, or controller, may automatically control the transition from a fixed light beam to a scanning wavelength beam. Input variables, such as the digital values from the digitizing electronics or any other inputs, including user interface inputs and inputs from sensors, may be utilized by the processor and associated algorithms to control the transition of light beam type. In addition, the processor and any number of associated algorithms may control the frequency sweep rate of the light beam or frequency sweep range. A velocity compensated frequency sweeping interferometer therefore can operate as a multi-mode frequency sweeping interferometer that is configured to operate in both an absolute distance mode and a relative distance mode. In the absolute distance mode, frequency scanning interferometry is utilized to provide an absolute distance measurement to said moveable reflective target and in a relative distance mode, fixed frequency interferometry is utilized to provide a relative distance measurement to said moveable reflective target. In an exemplary embodiment, a velocity compensated frequency sweeping interferometer automatically transitions between the absolute distance measurement mode and the relative distance measurement mode to determine a measured distance to the moveable reflective target.

In an exemplary embodiment, a velocity compensated frequency sweeping interferometer comprises an outgoing frequency measurement device that comprises one or more optics configured between the single measurement light producing device and the distance measurement interferometer to derive a frequency measurement beam from the single light beam. The outgoing frequency measurement beam may interface with one or more optics to produce a frequency interference beam that is converted by an optoelectronic device and digitizing electronics, for example, to determine the optical frequency of the single light beam. This optical frequency value may be provided to the processor and subsequent algorithms as an input. The optics used to measure the optical frequency may be a Fabry-Perot etalon. In another embodiment, a velocity compensated frequency sweeping interferometer comprises a frequency indicator that comprises an optic configured in the path of the outgoing frequency measurement beam, or frequency indicator beam. A Bragg reflector may be used to indicate a particular frequency, as only light of a certain wavelength is transmitted through the Bragg reflector. In another embodiment an optical filter is used to indicate the light frequency wherein only a certain frequency will pass through the optical filter and all other frequencies are absorbed.

A velocity compensated frequency sweeping interferometer may comprise a return frequency measurement device that comprises one or more optics configured in the path of the return beam from the target derive a return frequency measurement beam from the return beam. The return frequency measurement beam may interface with one or more optics to produce a frequency interference beam that is converted by an optoelectronic device and digitizing electronics, for example, to determine the optical frequency of the return beam. This optical frequency value may be provided to the processor and subsequent algorithms as an input. The optics used to measure the optical frequency may be an Fabry-Perot etalon. In another embodiment, velocity compensated frequency sweeping interferometer comprises a frequency indicator that comprises an optic configured in the path of the return frequency measurement beam, or frequency indicator beam. A Bragg reflector may be used to indicate a particular frequency, as only light of a certain wavelength is transmitted through the Bragg reflector. In another embodiment an optical filter is used to indicate the light frequency wherein only a certain frequency will pass through the optical filter and all other frequencies are absorbed.

The difference in frequency and the rate of change in the frequency difference between the outgoing light beam and return beam may be used by the processor and one or more algorithms to determine a rate of movement of the target toward or away from the velocity compensated frequency sweeping interferometer. The outgoing and/or return frequency measurement device may provide an absolute or relative frequency value depending on the type of optics utilized. In some embodiments, an algorithm may be used to determine the frequency of the output light as a function of inputs to the single measurement light producing device such as voltage, for example. The frequency of the output light may be mapped to an input voltage to the single measurement light producing device and therefore, does not require monitoring.

The velocity compensated frequency sweeping interferometer may further comprise a Mach-Zehnder interferometer, as described herein. The velocity compensated frequency sweeping interferometer may further comprise a second distance measurement interferometer that is used to determine the difference in distance as measured by the first, or primary, distance measurement interferometer and the second distance measurement. The difference in distance can be used to create a reference distance that can be used to calculate the optical frequency. The calculated optical frequency may then be used to calculate an absolute distance to the target and can be used to control the laser to a fixed frequency. In an exemplary embodiment, the second distance interferometer comprises a second beam splitter configured between the first beam splitter and the first reference reflector to produce a second reference beam, and a third beam splitter configured between the first beam splitter and the movable reflective target to produce a second measurement beam. A second combining optics may be configured to combine the second reference beam and second measurement beam into a second interference beam that impinges on an optoelectronic device to convert the second interference beam into a second electrical signal. A digitizing electronic feature may the produce one or more second digital values from the second electrical signals. These second digital values and first digital values from the primary distance measurement interferometer may be processed by the processor and one or more algorithms.

In an exemplary embodiment, a velocity compensated frequency sweeping interferometer comprises an index compensating feature that adjusts a measured distance value to a target as a function of a refractive index of air. The index of refraction of air may be affected by temperature, humidity, and pressure, for example. A user may input these input variables to the velocity compensated frequency sweeping interferometer through a user interface or sensor may measure these input variables and provide data to the processor and/or one or more algorithms.

In an exemplary embodiment, a velocity compensated frequency sweeping interferometer comprises a temperature compensating feature that adjusts a measured distance value to a target as a function of a temperature input. Again, a user may input an ambient temperature or a measured temperature of one or more of the optical components or these input variables may be measured by a sensor and provided directly to the processor for use in one or more algorithms for compensation.

In an exemplary embodiment, a velocity compensated frequency sweeping interferometer comprises a frequency sweep rate algorithm and/or a frequency sweep range algorithm that automatically adjust the frequency sweep rate or range, respectively. The frequency sweep rate and/or range may be adjusted to provide a more accurate distance measurement. The frequency sweep rate and/or range may be adjusted to ensure the corresponding signals generated by the sweep remain within the design parameters of the electronics. For example, a target a long distance away will generate more waves as the frequency is swept. If the sweep rate is too high, the rate in the change of waves will exceed the capability of the electronics to process them. If the sweep range is too large, the number of waves may exceed the number of bits available to count them. In an exemplary embodiment, a user interface may be provided to allow a user to change or adjust a frequency sweep rate and/or range. In another embodiment, a user interface may be provided to allow a user to input the distance or relative distance to a target. For example, a user a knob may be provided that indicates the order of magnitude of the distance to the target, such as 10 m, 100 m, 1000 m and the like. For example, if a target is at 45 m from the velocity compensated frequency sweeping interferometer, a user may turn the knob to the 10 m setting and an algorithm may set the sweep rate and range accordingly. A user may also type in, or otherwise input, an approximate distance to the target and this input value may be used by the processor and/or one or more algorithms to adjust the frequency sweep rate and/or range.

In an exemplary embodiment, a velocity compensated frequency sweeping interferometer comprises a moveable platform that can be used to direct the single light beam from the single measurement light producing device. A moveable platform may enable movement in one, two, or three degrees of freedom. In one embodiment, the single measurement light producing device may be directly coupled or mounted to the moveable platform. In another embodiment, the light beam from a single measurement light producing device is configured to impinge on a beam steering feature that is configured on the moveable platform. For example, a mirror or other beam directing device may be configured on a moveable platform and the single light beam may be directed to hit the mirror and then be directed as the mirror is moved by the moveable platform.

In an exemplary embodiment, a velocity compensated frequency sweeping interferometer comprises a position sensing device that converts a positioning beam from a position sensing beam splitter to digital values or displacement values. A position sensing device provides a transverse position of the moveable target with respect to the measurement beam path.

A velocity compensated frequency sweeping interferometer may further comprise a frequency indicator that may be used to indicate when a light beam is at a particular frequency and thereby provide an absolute reference of frequency. A velocity compensated frequency sweeping interferometer that incorporates a frequency indicator and a frequency interferometer may provide absolute frequency information about the light beam over a range of frequencies. In another embodiment, a velocity compensated frequency sweeping interferometer incorporates an algorithm that correlates inputs to a single measurement light source to provide a relative or absolute measurement of frequency of the light beam. For example, an algorithm may correlate a change in voltage or voltage level of the single measurement light source.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
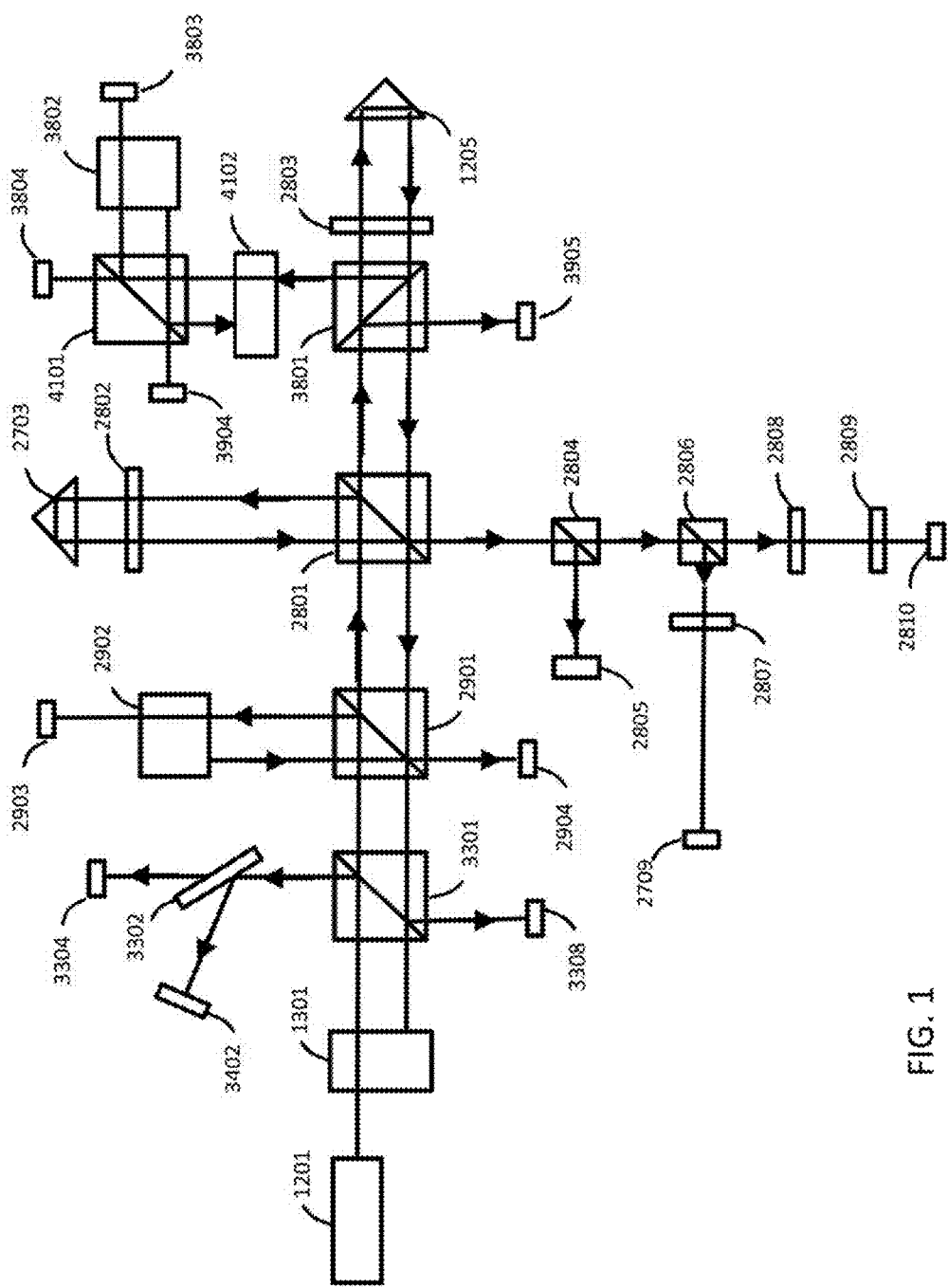

FIG. 1 shows a schematic of exemplary opto-electrical components of the velocity compensated frequency sweeping interferometer, as described herein.

Figure 2:
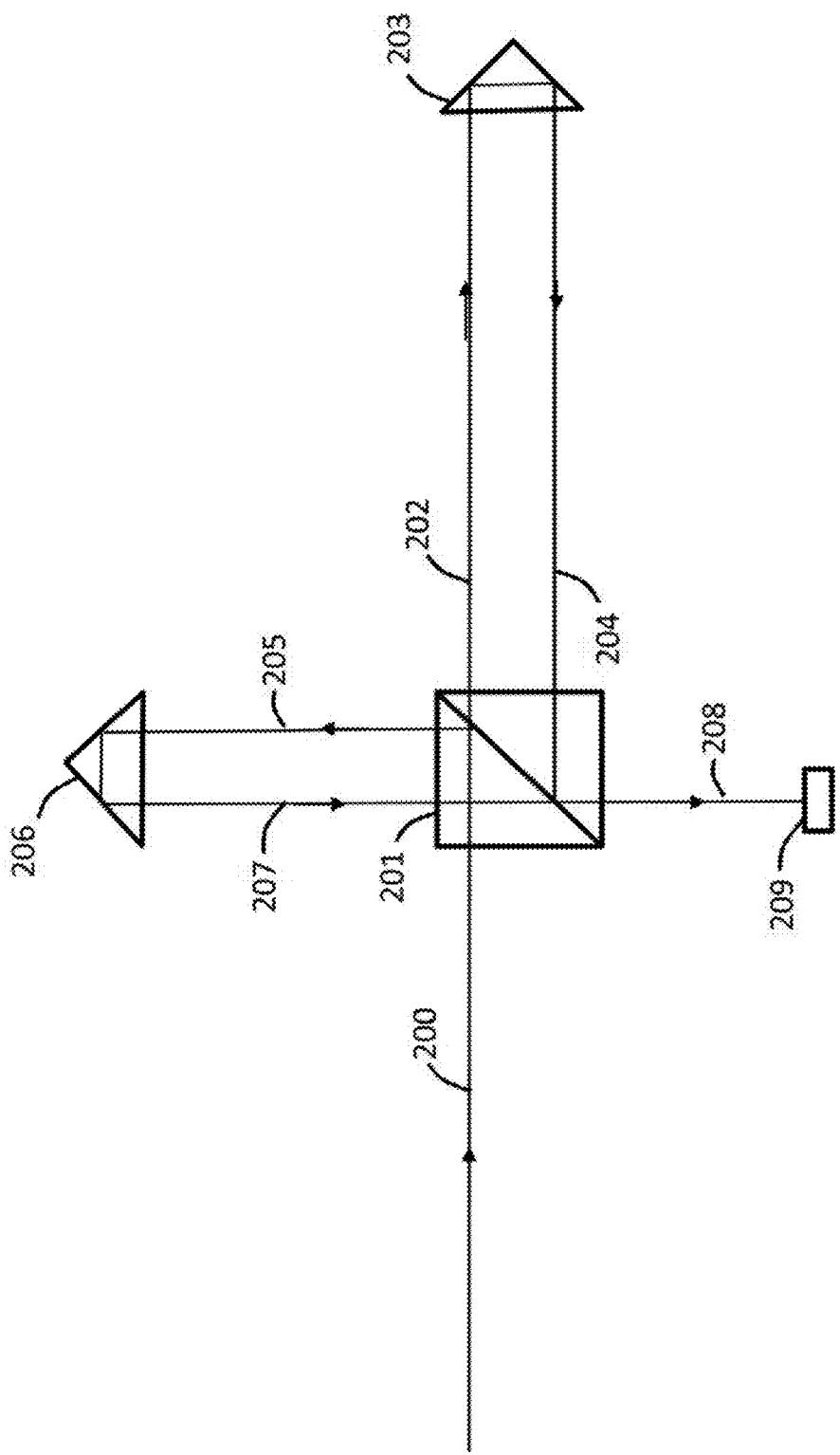

FIG. 2 shows a schematic of basic Michelson interferometer principles.

Figure 3:
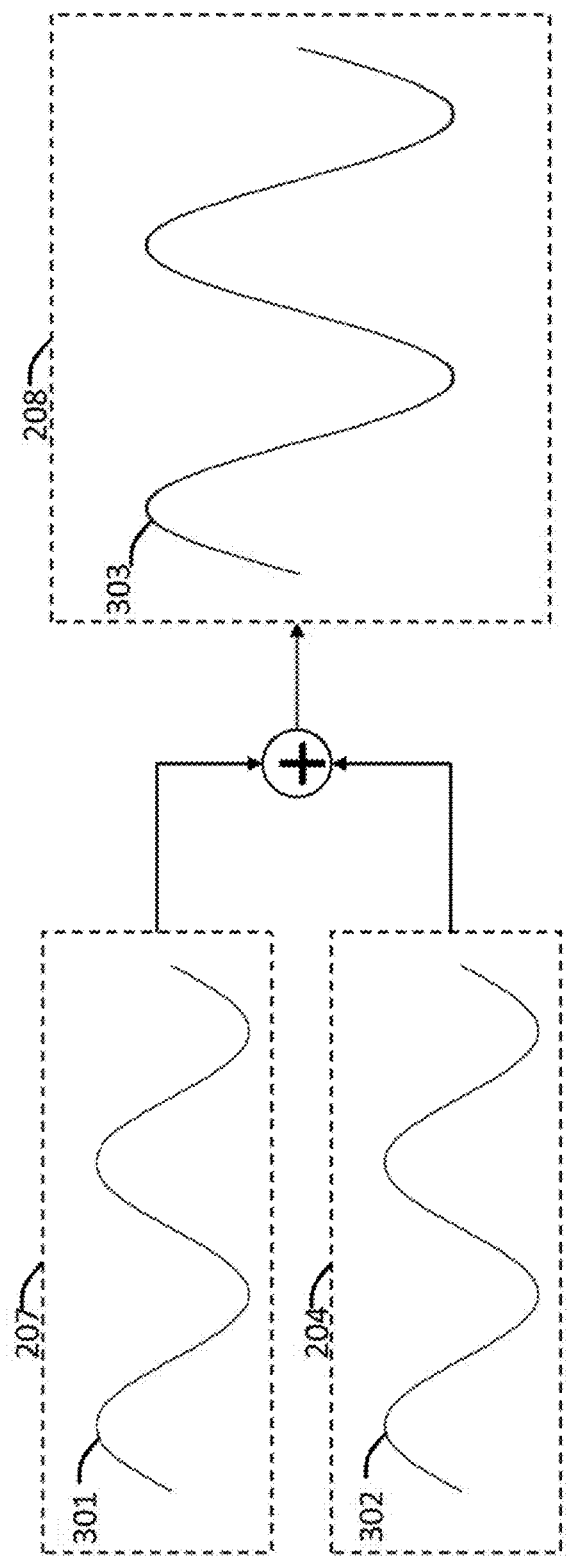

FIG. 3 shows a graphical representation of constructive interference of two light waves that are in phase.

Figure 4:
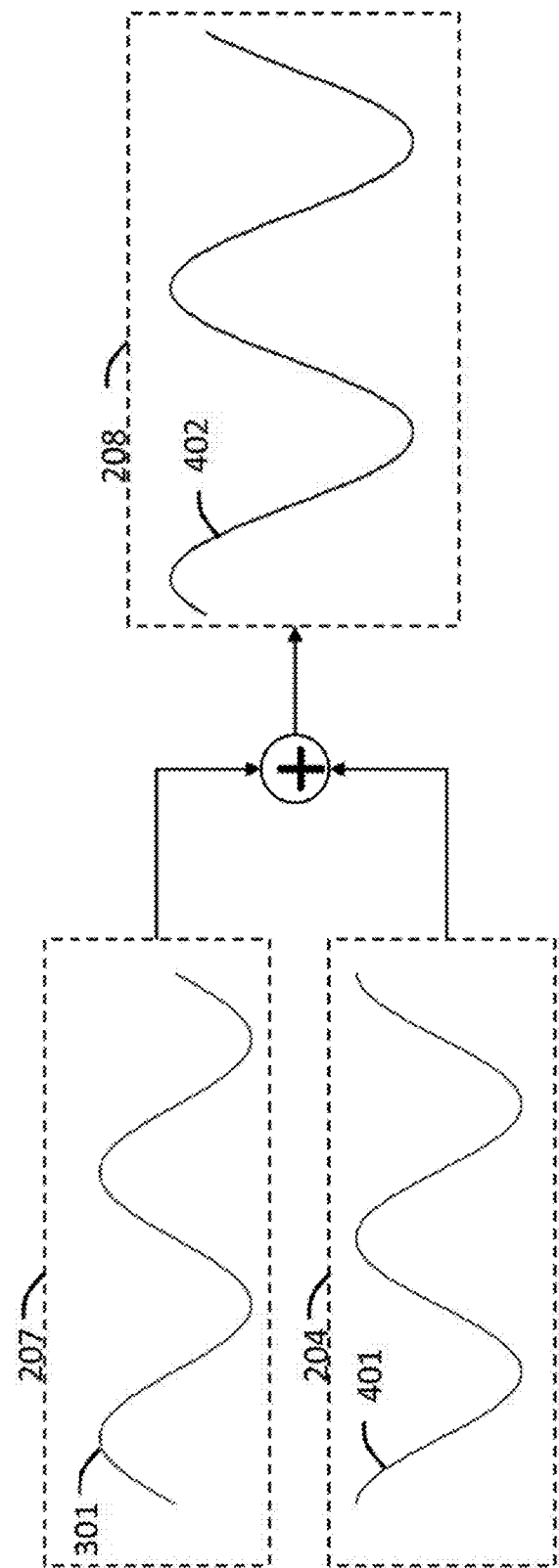

FIG. 4 shows a graphical representation of constructive interference of two light waves that are 90 degrees out of phase.

Figure 5:
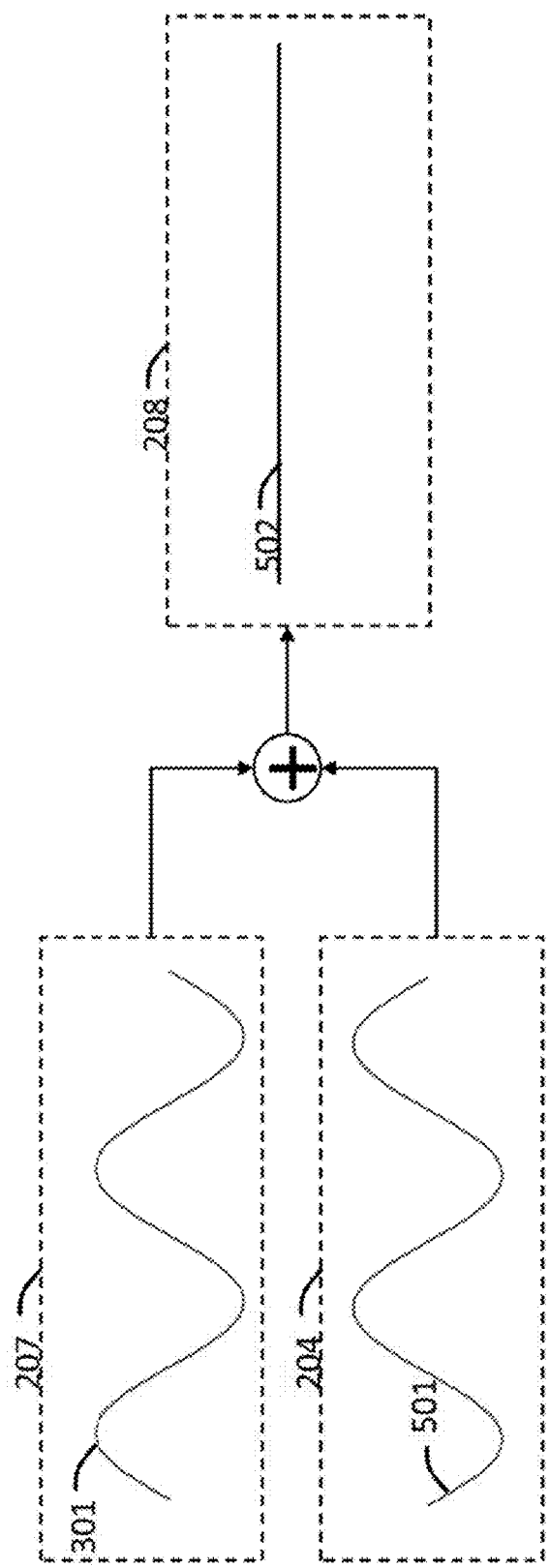

FIG. 5 shows a graphical representation of destructive interference of two light waves 180 degrees out of phase.

Figure 6:
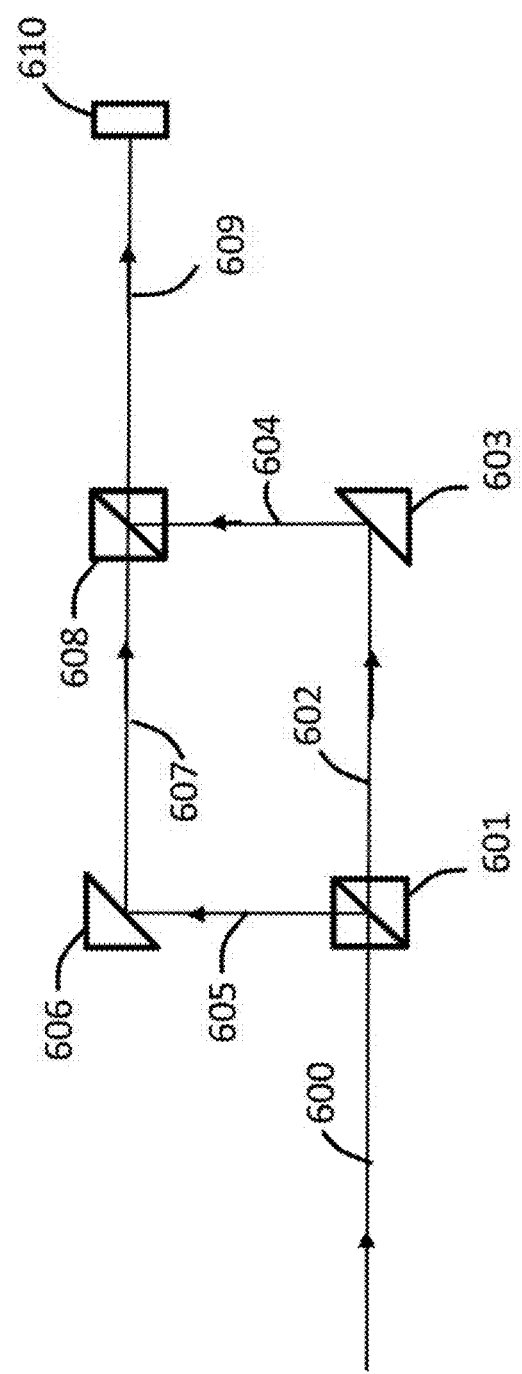

FIG. 6 shows a schematic of exemplary opto-electrical components of a Mach-Zehnder Interferometer, as described herein.

Figure 7:
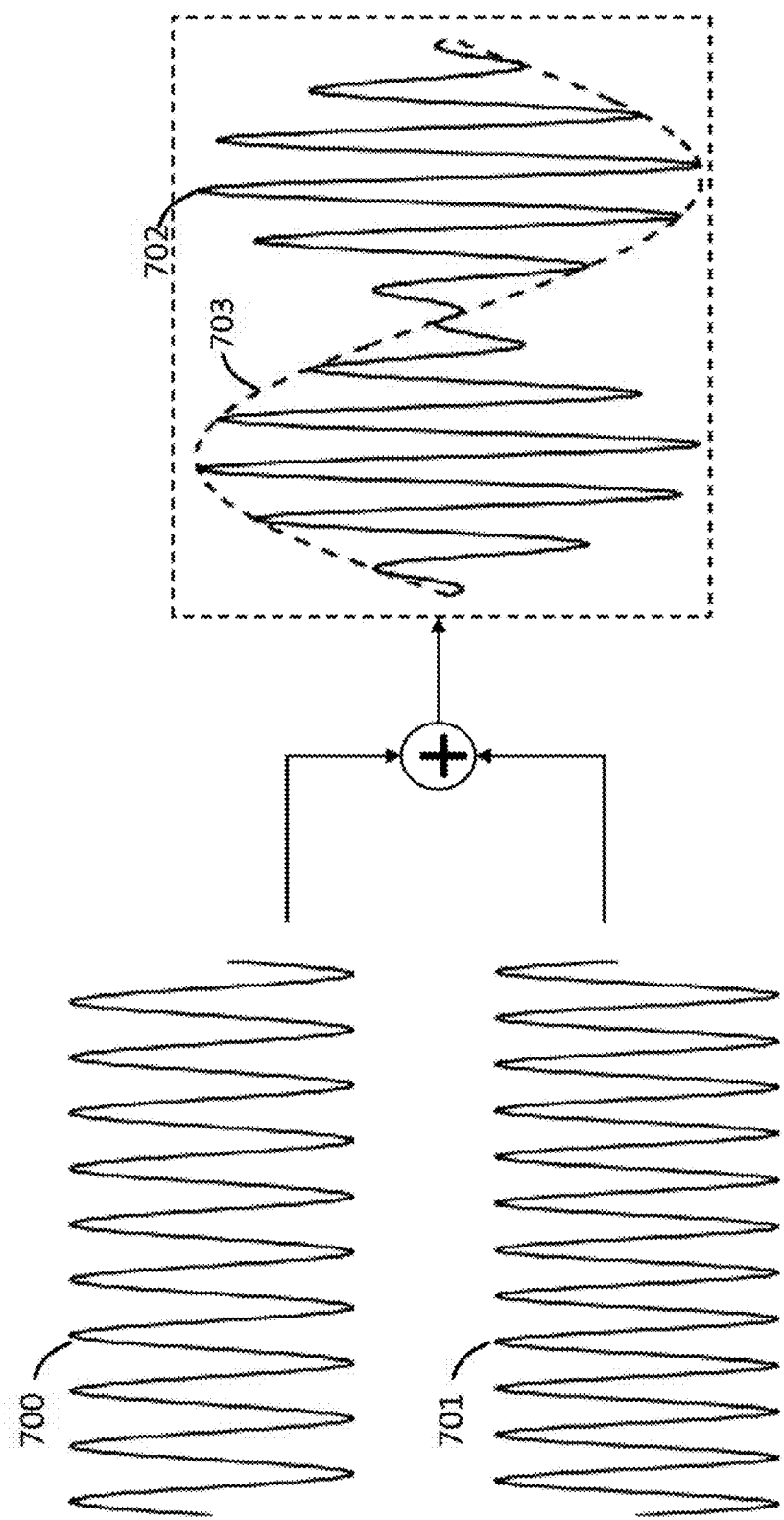

FIG. 7 shows a graphical representation of the mixing of two light waves of slightly different frequencies to produce a combined beam with a beat frequency.

Figure 8:
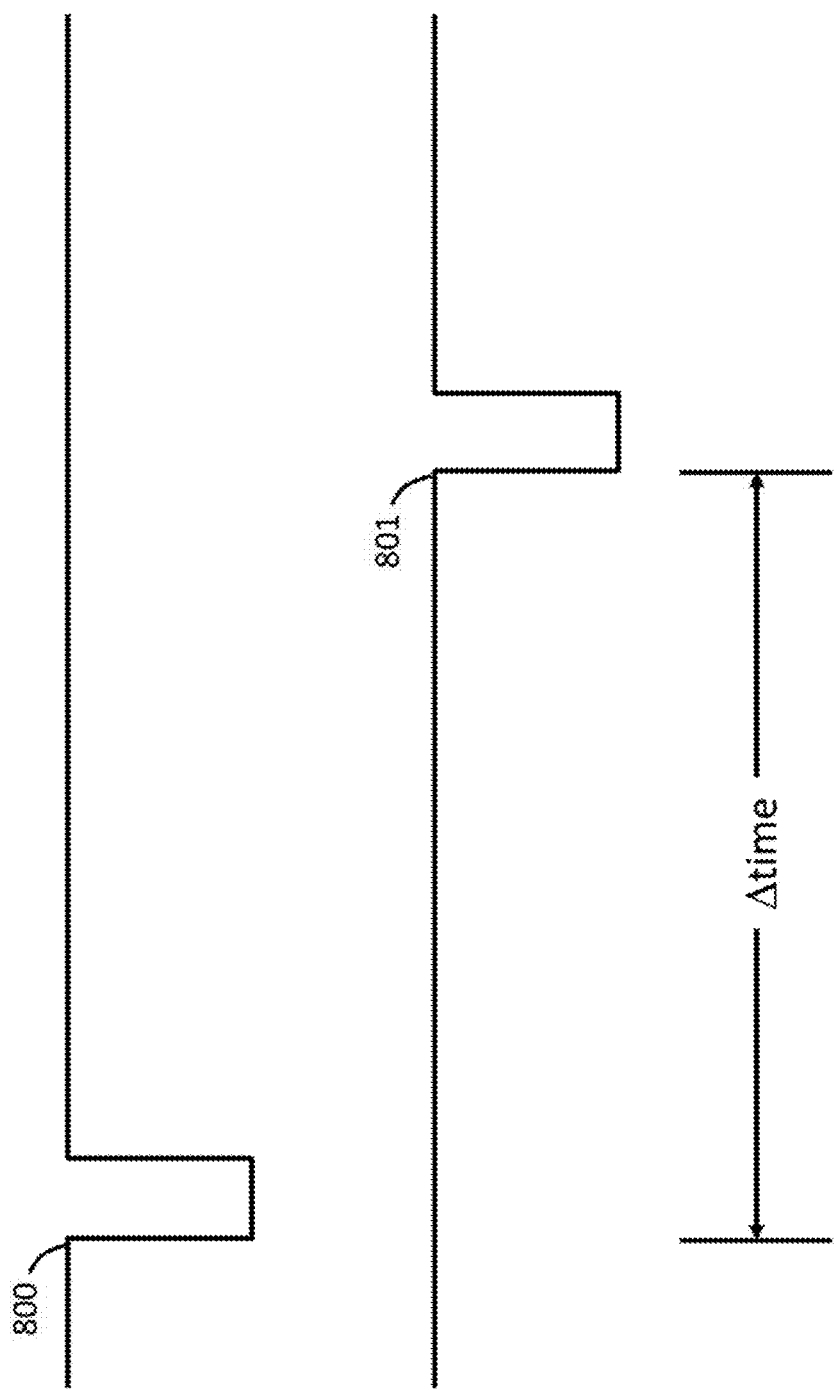

FIG. 8 shows a graphical representation of a signal in a time-of-flight type of measurement.

Figure 9:
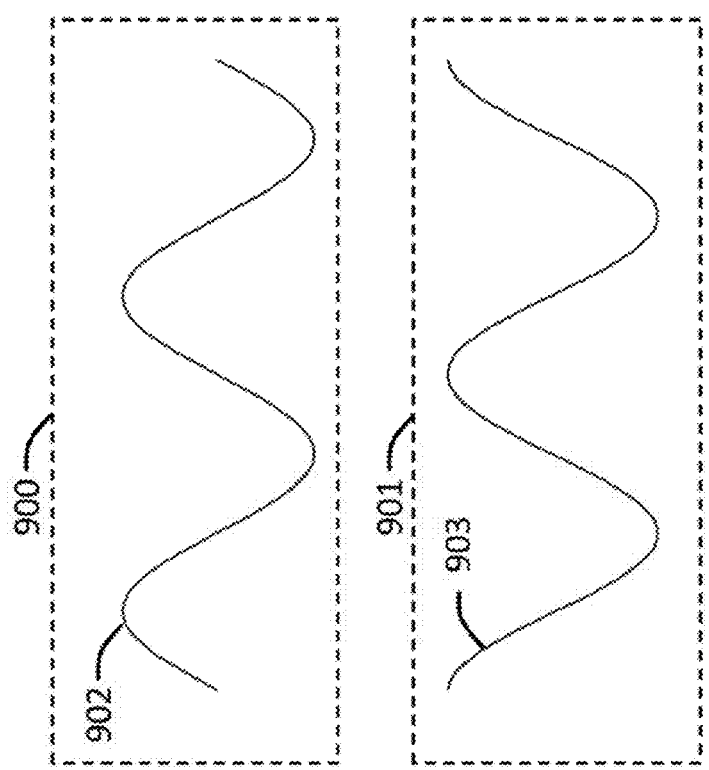

FIG. 9 shows a graphical representation of an amplitude modulated measurement and reference beam used in certain ADM measurements.

Figure 10:
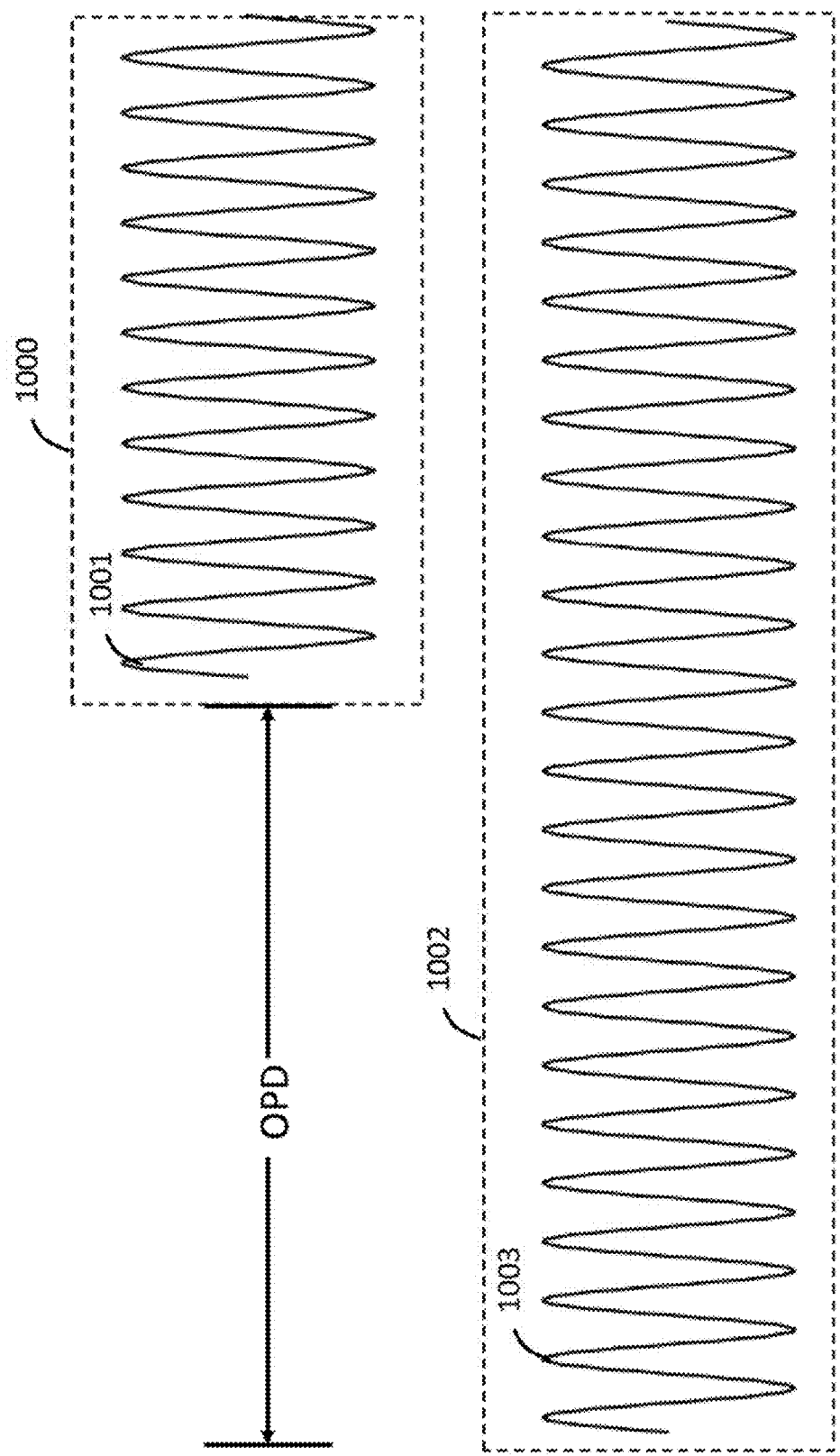

FIG. 10 shows a graphical representation of the measurement and reference path of an interferometer with light at a first frequency.

Figure 11:
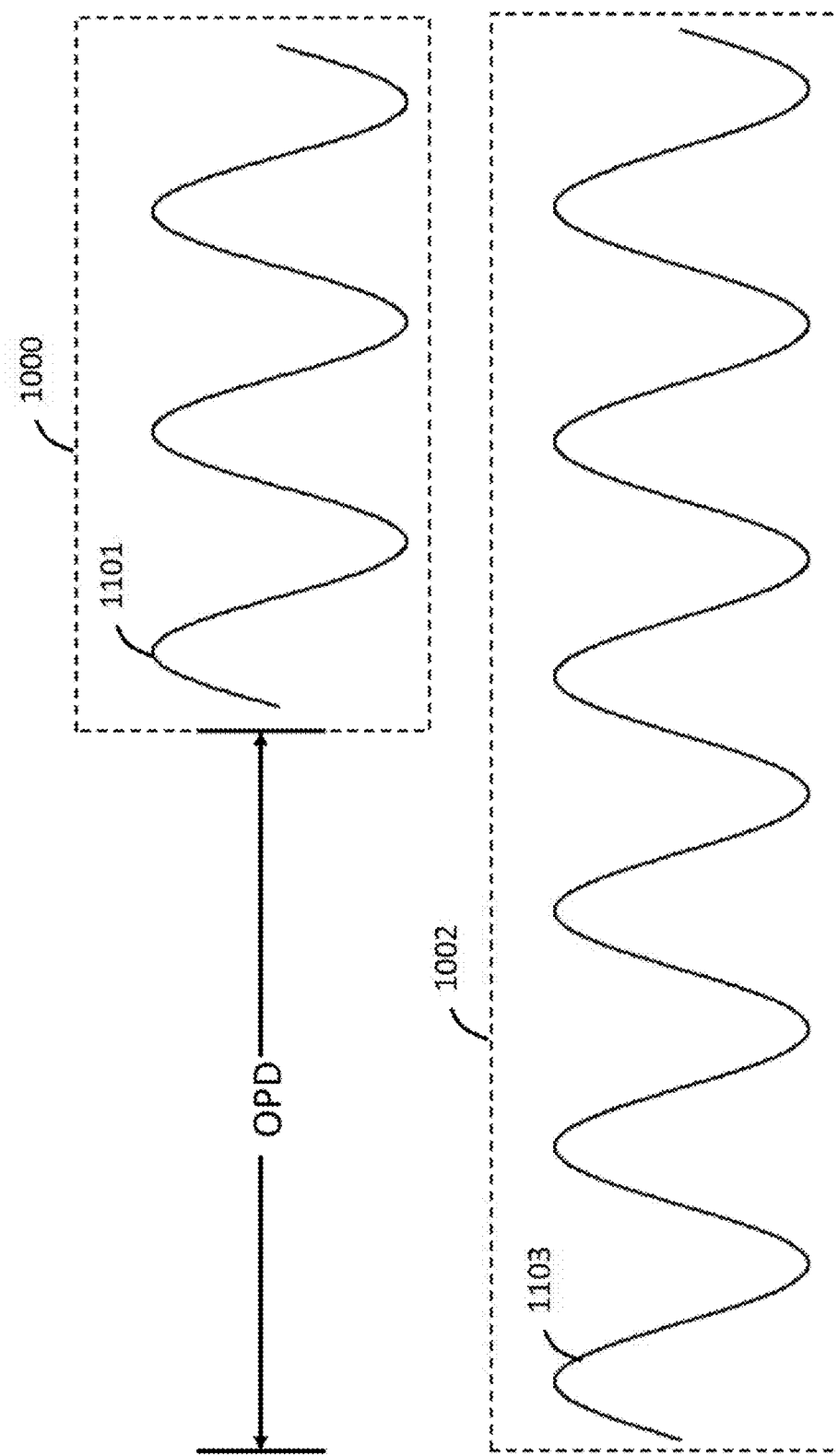

FIG. 11 shows a graphical representation of the measurement and reference path of an interferometer with light at a second frequency.

FIGS. 12 to 26 show diagrams of exemplary configurations of sub-systems of the present invention.

Figure 27:
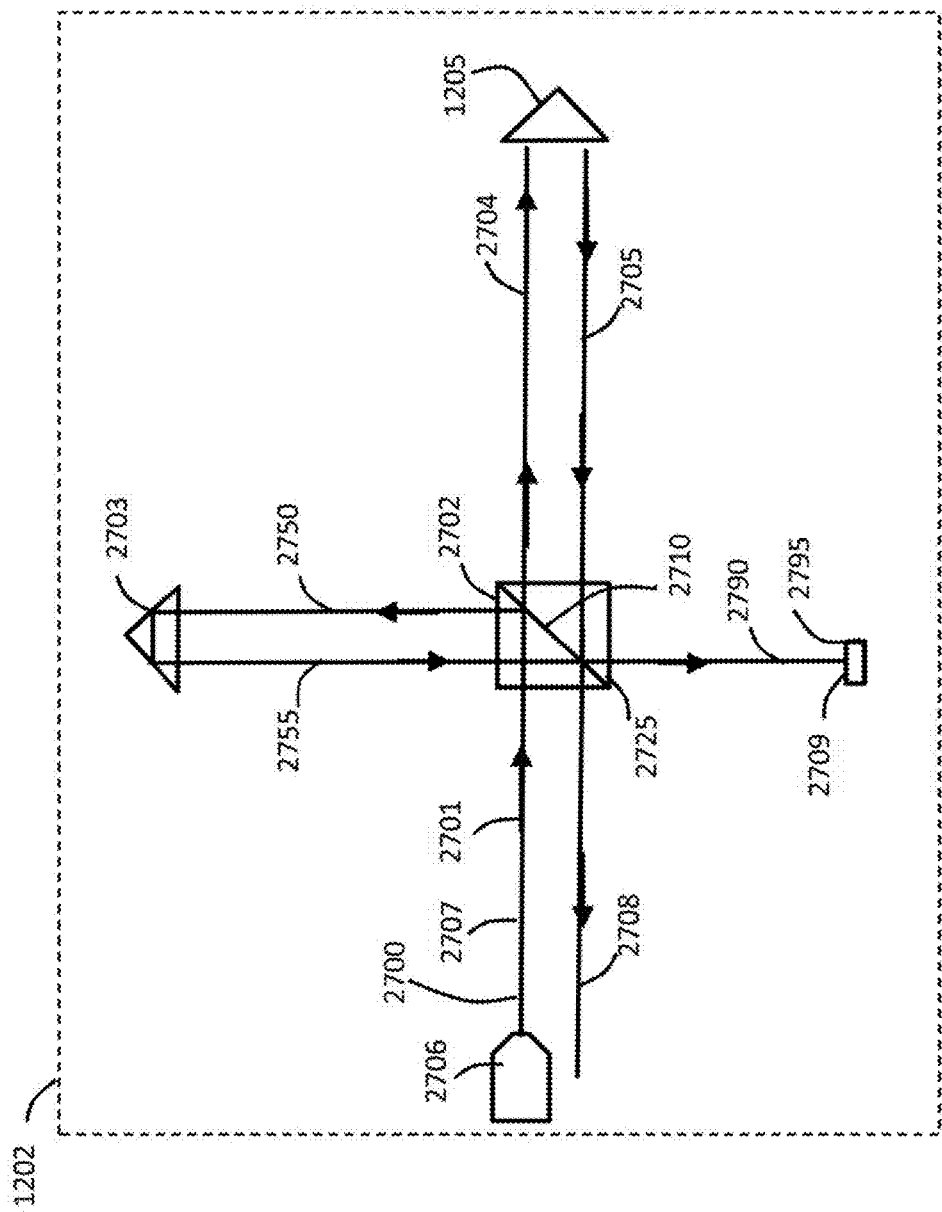
Figure 28:
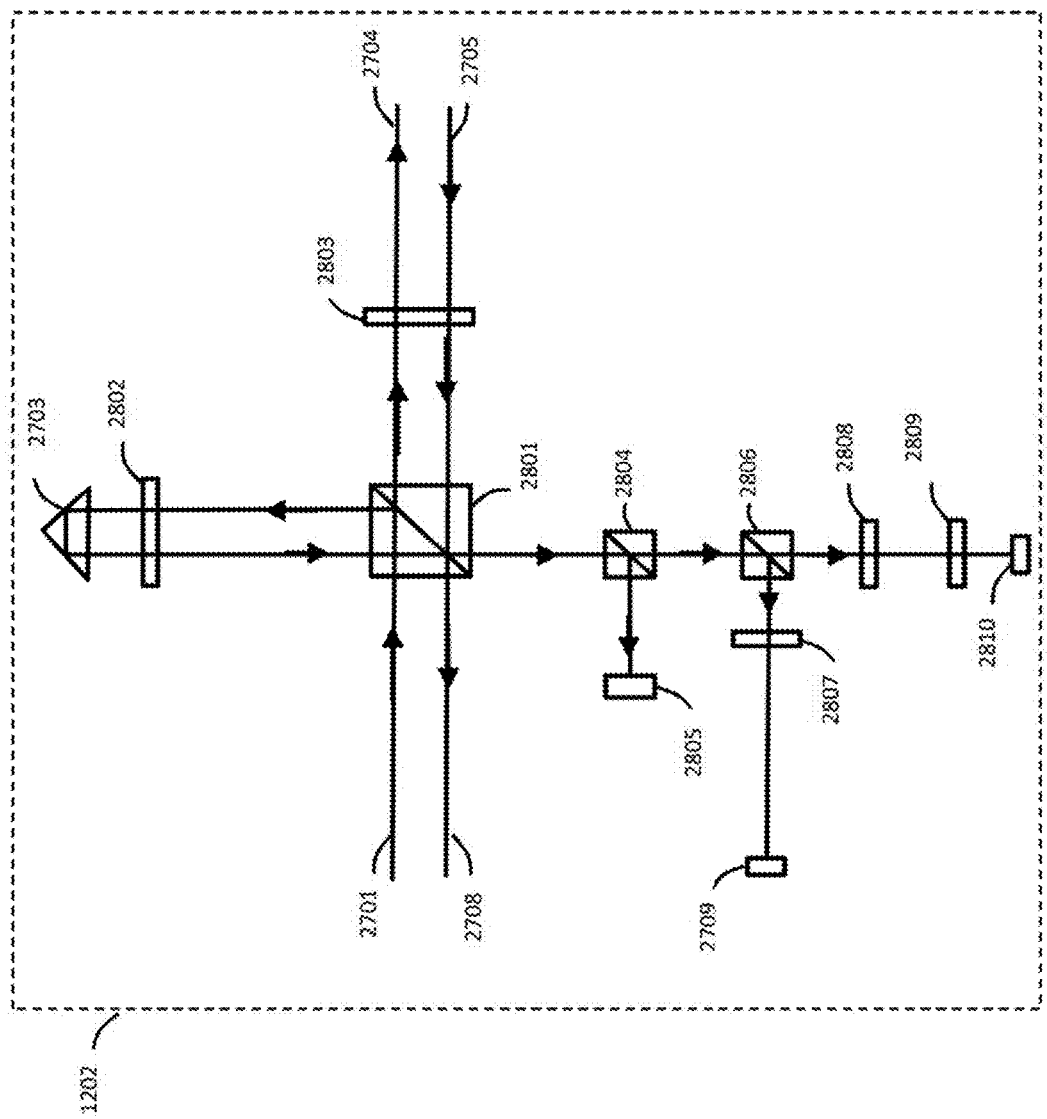

FIGS. 27 and 28 show diagrams of exemplary distance measurement interferometers.

FIGS. 29 to 32 show diagrams of exemplary outgoing frequency measurement interferometers.

FIGS. 33 to 37 show diagrams of exemplary frequency indicators.

FIGS. 38 to 41 show diagrams of exemplary return frequency measurement interferometers.

FIGS. 42 to 46 show diagrams of exemplary return frequency indicators.

Figure 47:
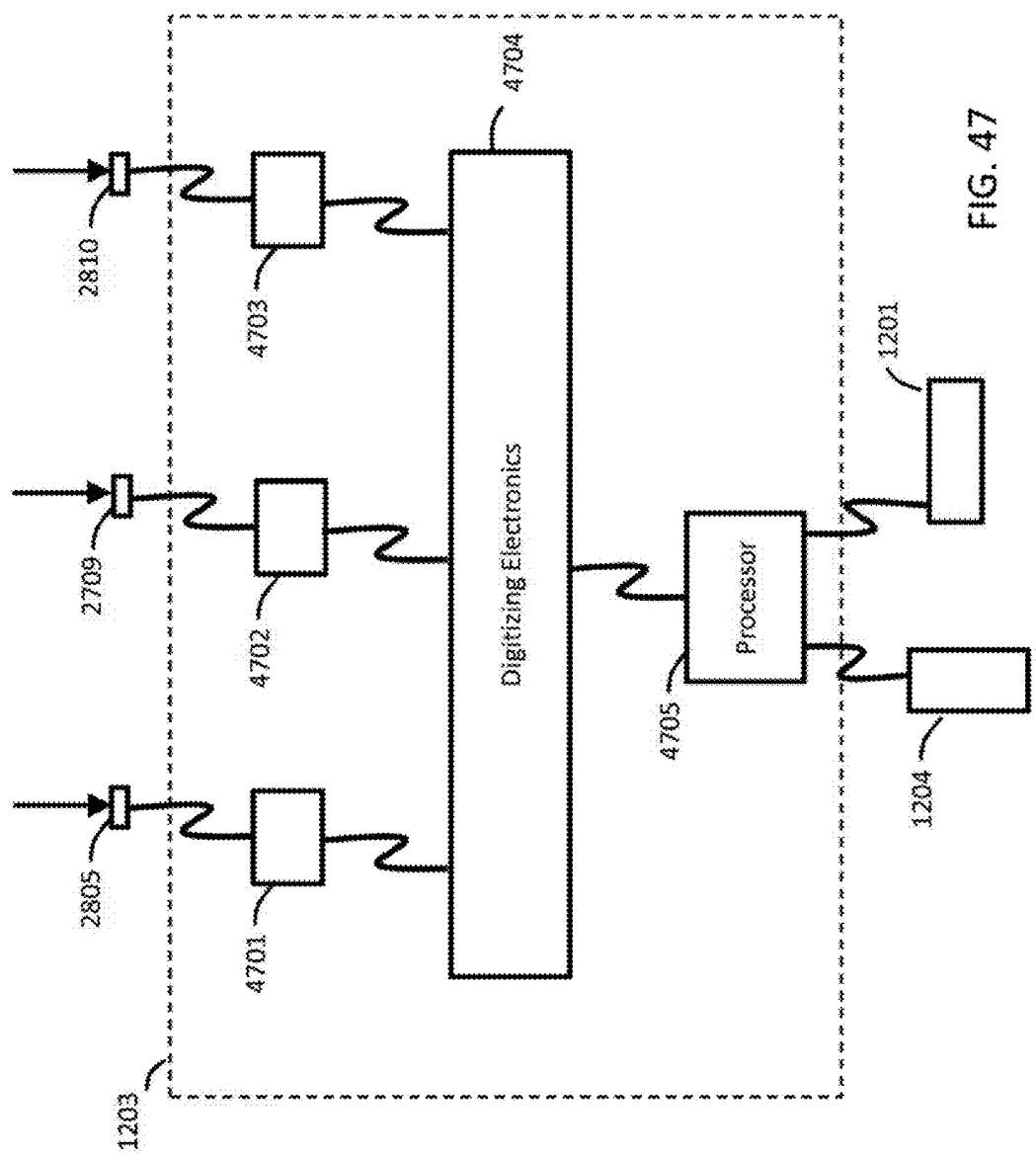

FIG. 47 shows a schematic of exemplary electronics, as described herein.

Figure 48:
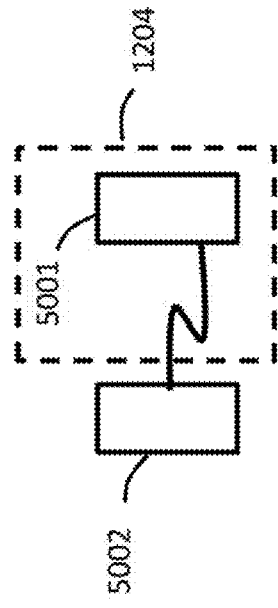
Figure 49:
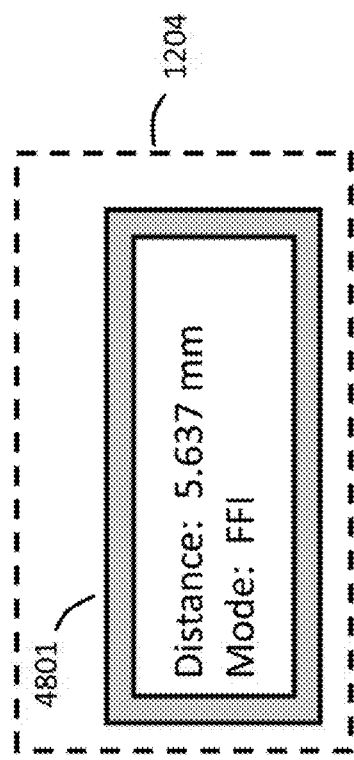

FIGS. 48 and 49 show exemplary user interfaces.

Figure 50:
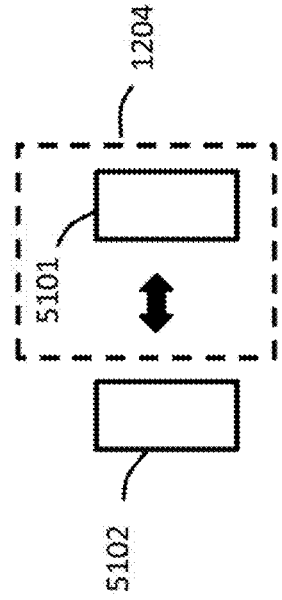
Figure 51:
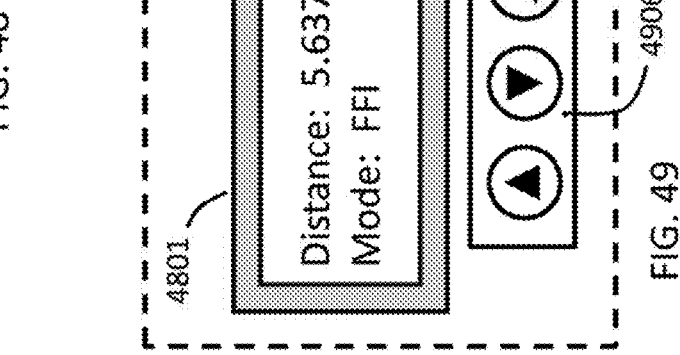

FIGS. 50 and 51 show diagrams of communication interfaces between the interferometer and remote device.

Figure 52:
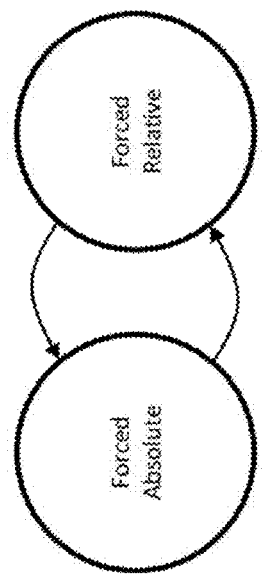

FIG. 52 shows an exemplary state-machine diagram for different functional modes of a velocity compensated frequency sweeping interferometer, as described herein.

Figure 53:
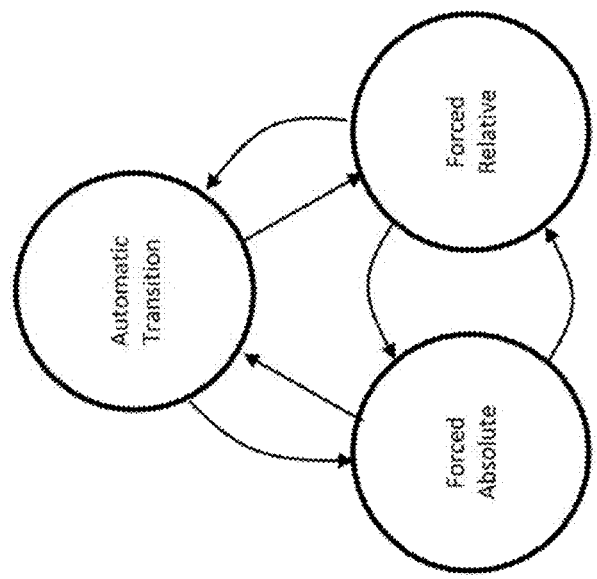

FIG. 53 shows an exemplary state-machine diagram for different functional modes of a velocity compensated frequency sweeping interferometer, as described herein.

Figure 54:
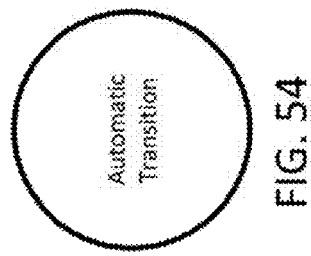

FIG. 54 shows an exemplary state-machine diagram for single functional mode of a velocity compensated frequency sweeping interferometer, as described herein.

Figure 55:
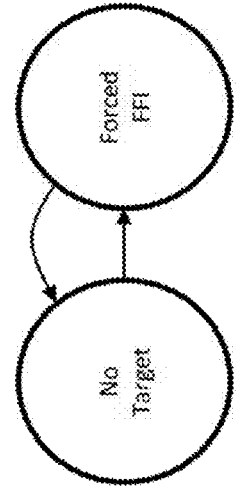

FIG. 55 shows an exemplary state-machine diagram of a Forced Absolute mode of a velocity compensated frequency sweeping interferometer, as described herein.

Figure 56:
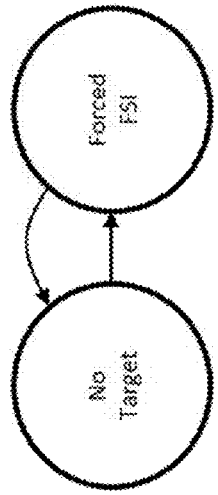

FIG. 56 shows an exemplary state-machine drawing of a Forced Relative mode of a velocity compensated frequency sweeping interferometer, as described herein.

Figure 57:
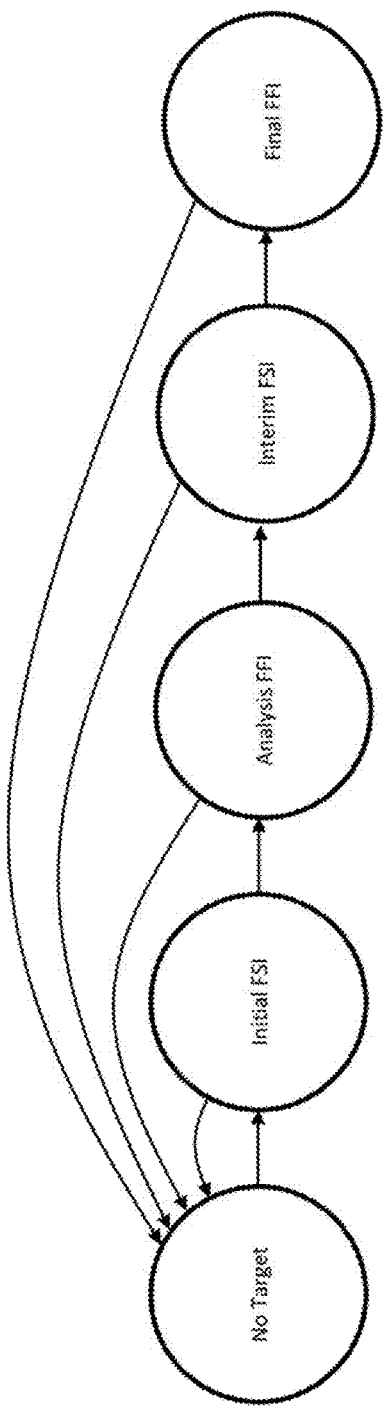

FIG. 57 shows an exemplary state-machine diagram of an Automatic Transition mode of a velocity compensated frequency sweeping interferometer, as described herein.

FIG. 58 shows an exemplary state-machine diagram of an alternate embodiment of the Automatic Transition mode of a velocity compensated frequency sweeping interferometer, as described herein.

Figure 59:
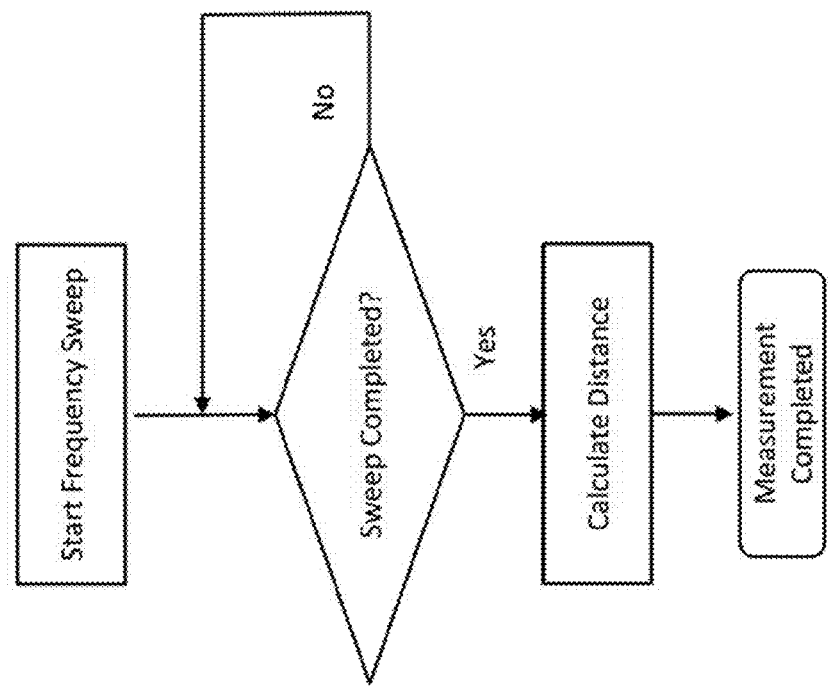

FIG. 59 shows a flow chart for an exemplary FSI mode.

Figure 60:
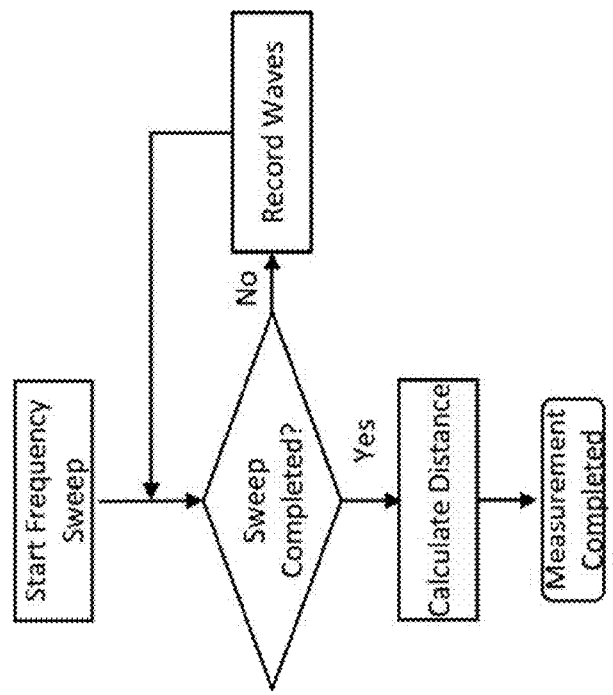

FIG. 60 shows a flow chart for another exemplary FSI mode.

Figure 61:
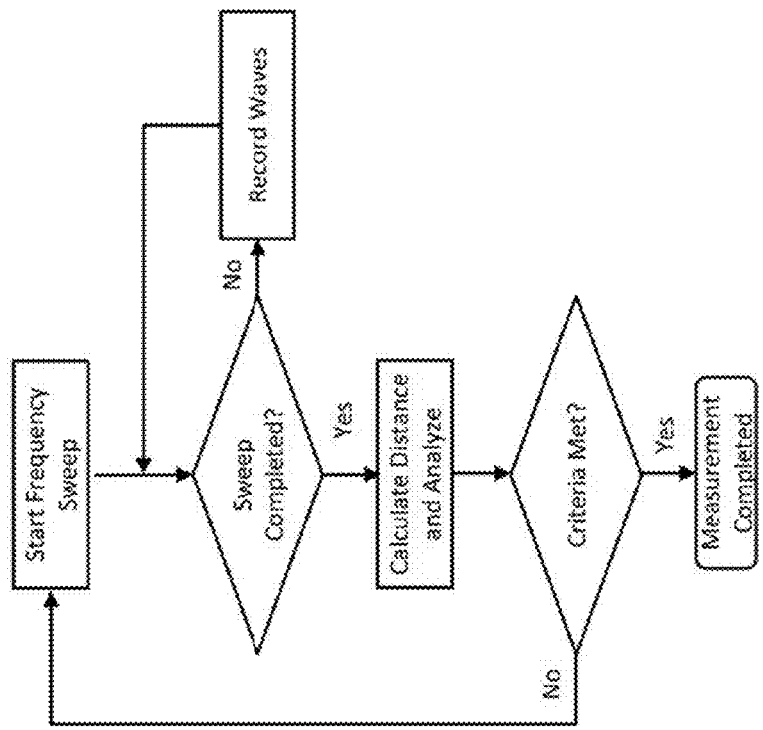

FIG. 61 shows a flow chart for yet another exemplary FSI mode.

Figure 62:
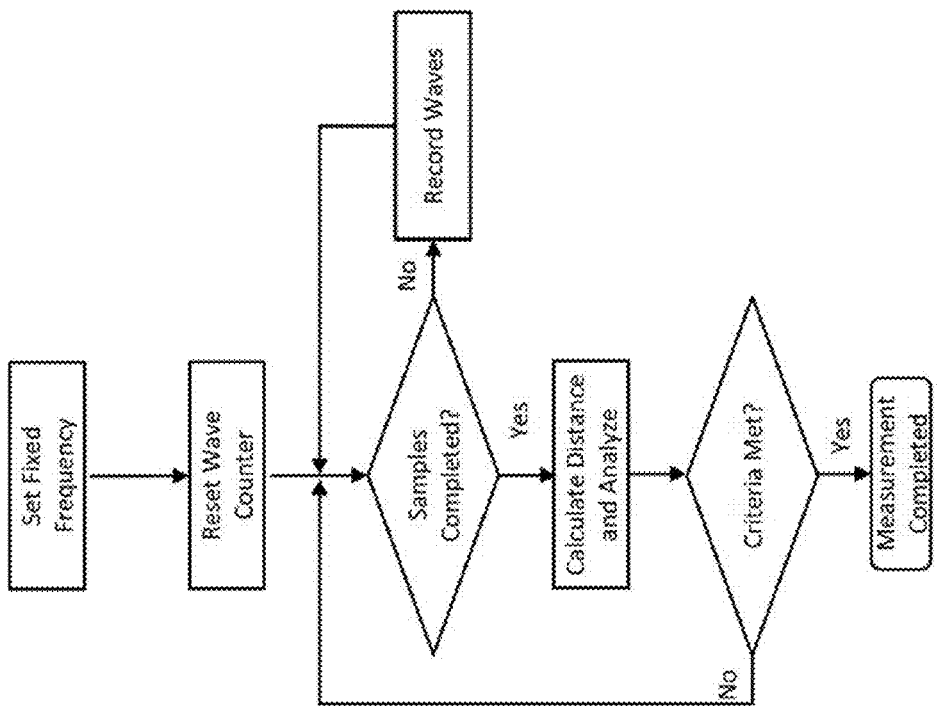

FIG. 62 shows a flow chart for an exemplary FSI mode.

FIG. 63 shows a schematic of exemplary opto-electrical components of a velocity compensated frequency sweeping interferometer, as described herein, comprising an exemplary Fabry-Perot interferometer configuration.

Figure 64:
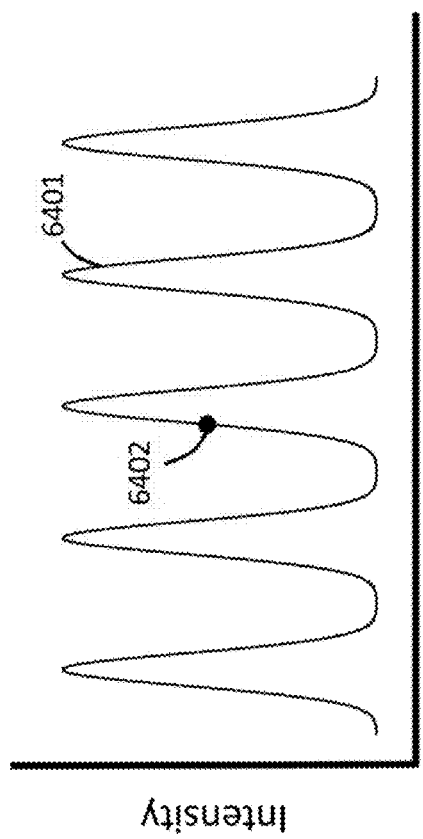

FIG. 64 shows a graphical representation of an exemplary signal from a Fabry-Perot interferometer configuration.

Figure 65:
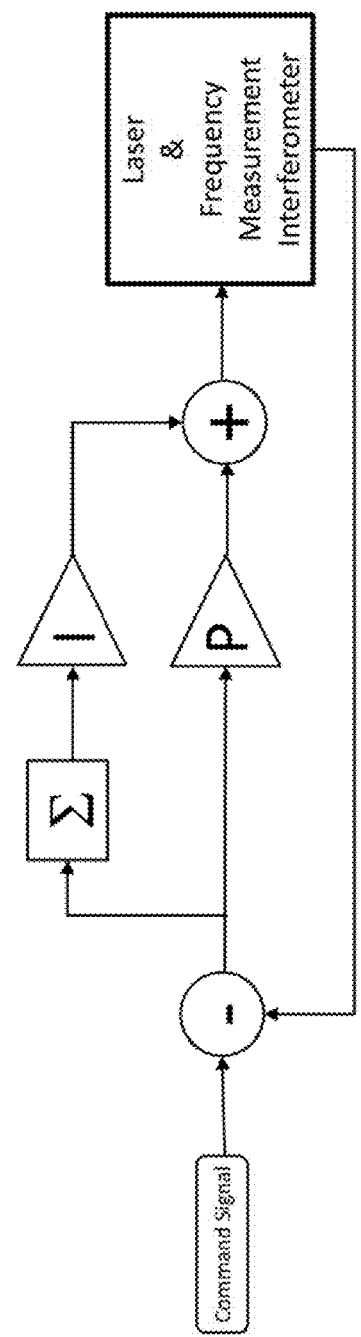

FIG. 65 shows a diagram of an exemplary loop for controlling a coherent light source frequency.

Figure 66:
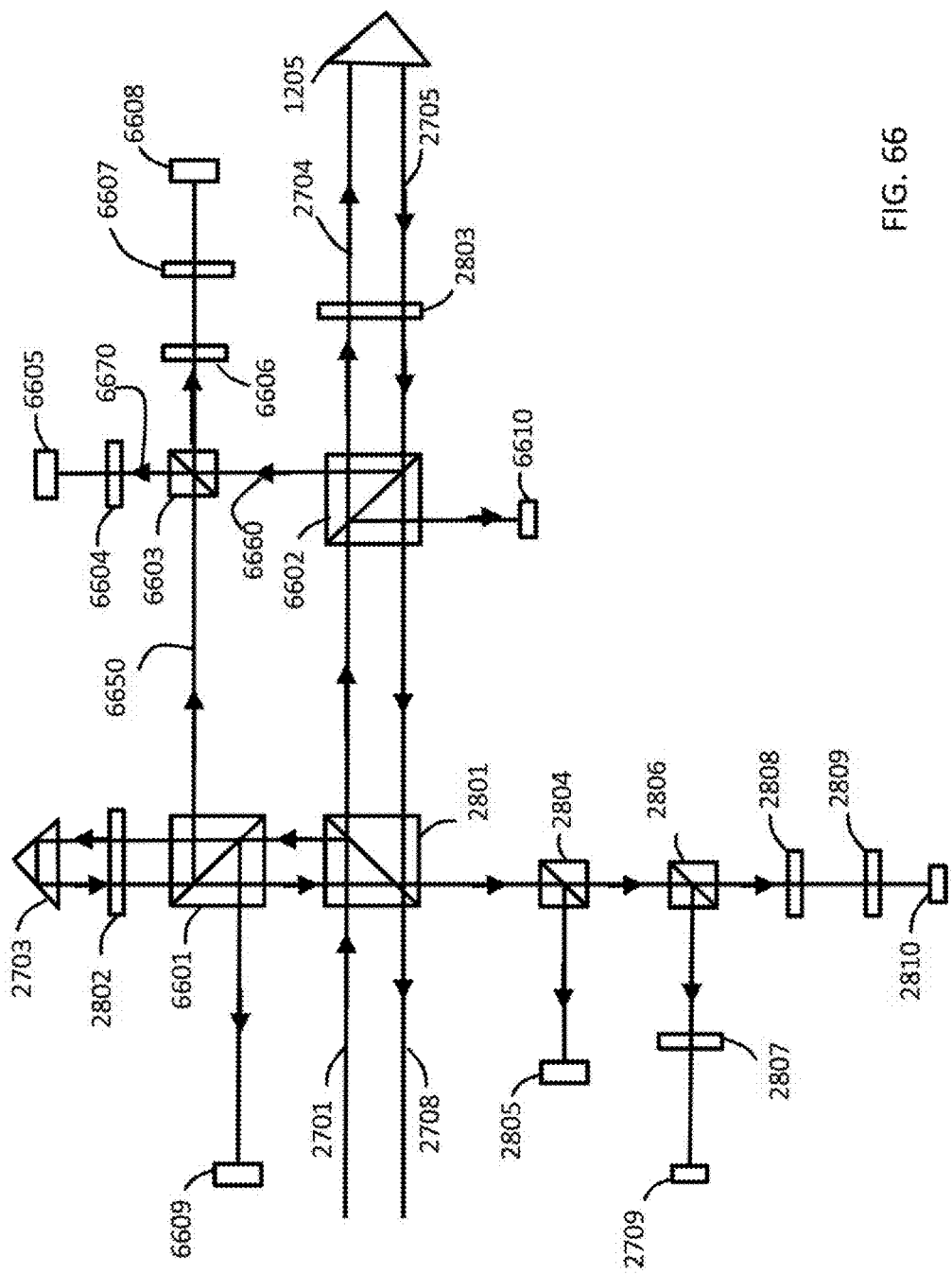

FIG. 66 shows a schematic of exemplary opto-electrical components of a dual measurement interferometer, as described herein, comprising an exemplary Mach-Zehnder interferometer configuration.

Figure 67:
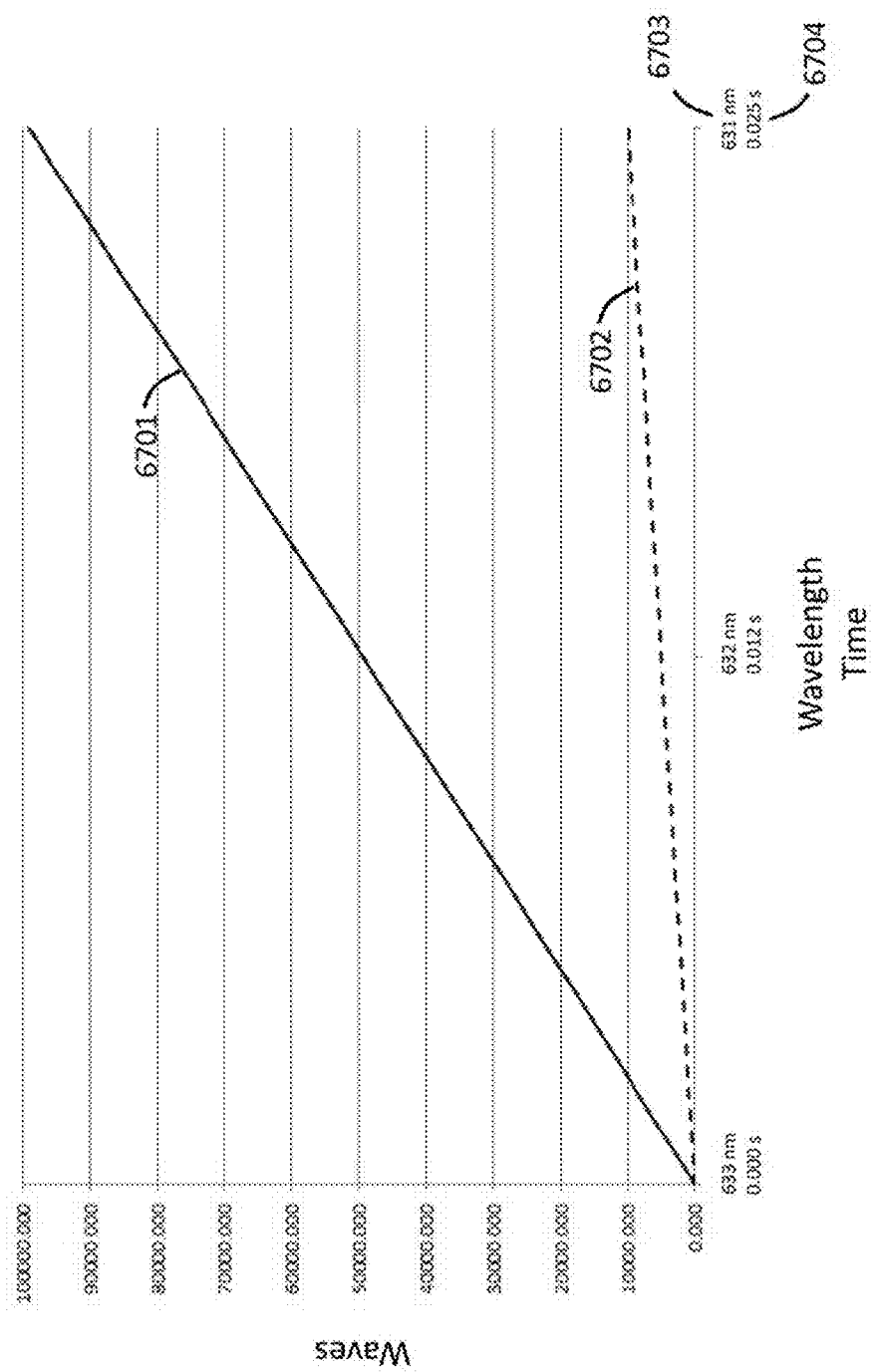

FIG. 67 shows a graph of exemplary wave measurements as the frequency is swept for two different optical path differences.

Figure 68:
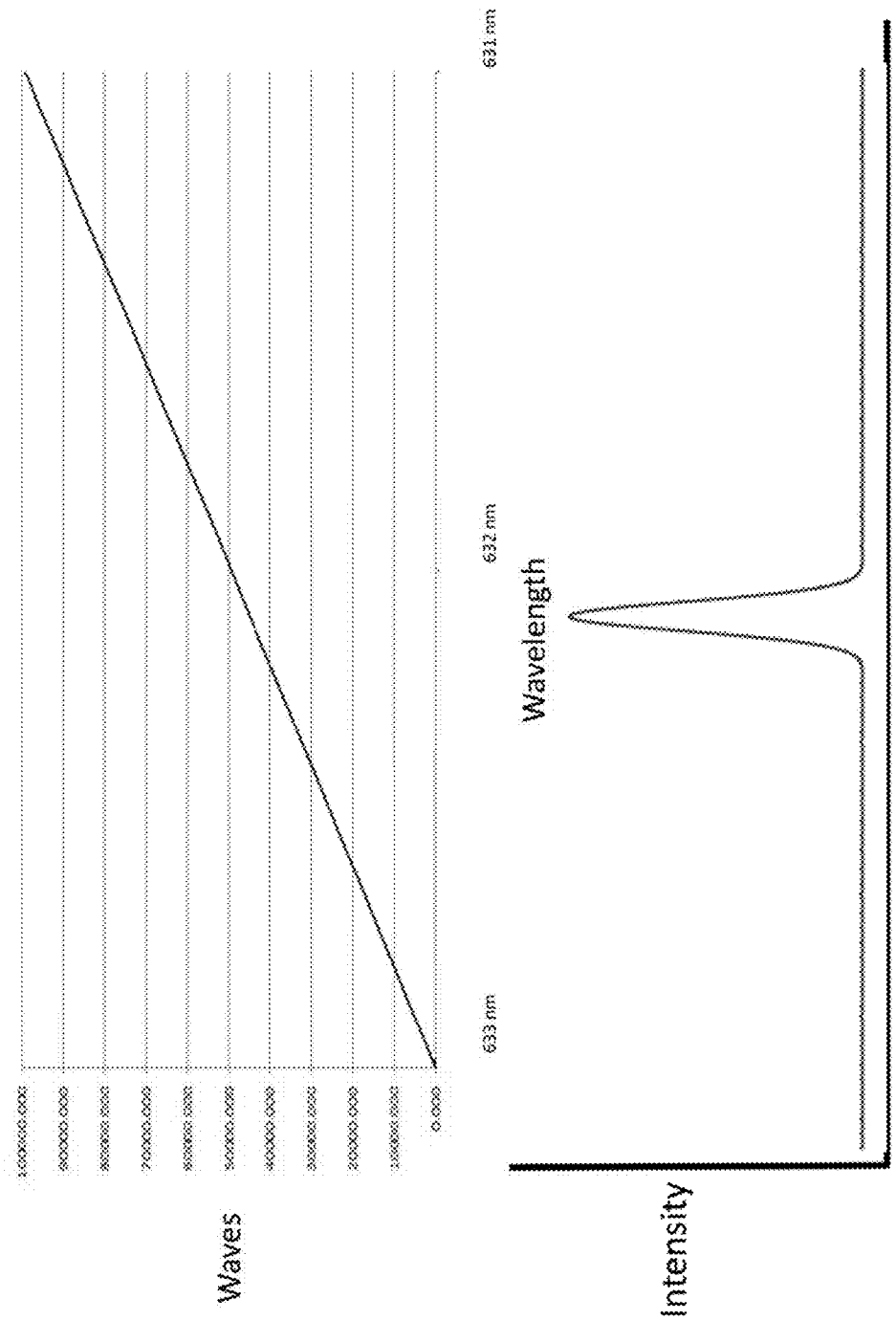

FIG. 68 shows a graphical representation of an exemplary signal from a frequency indicator as the frequency is swept.

Figure 69:
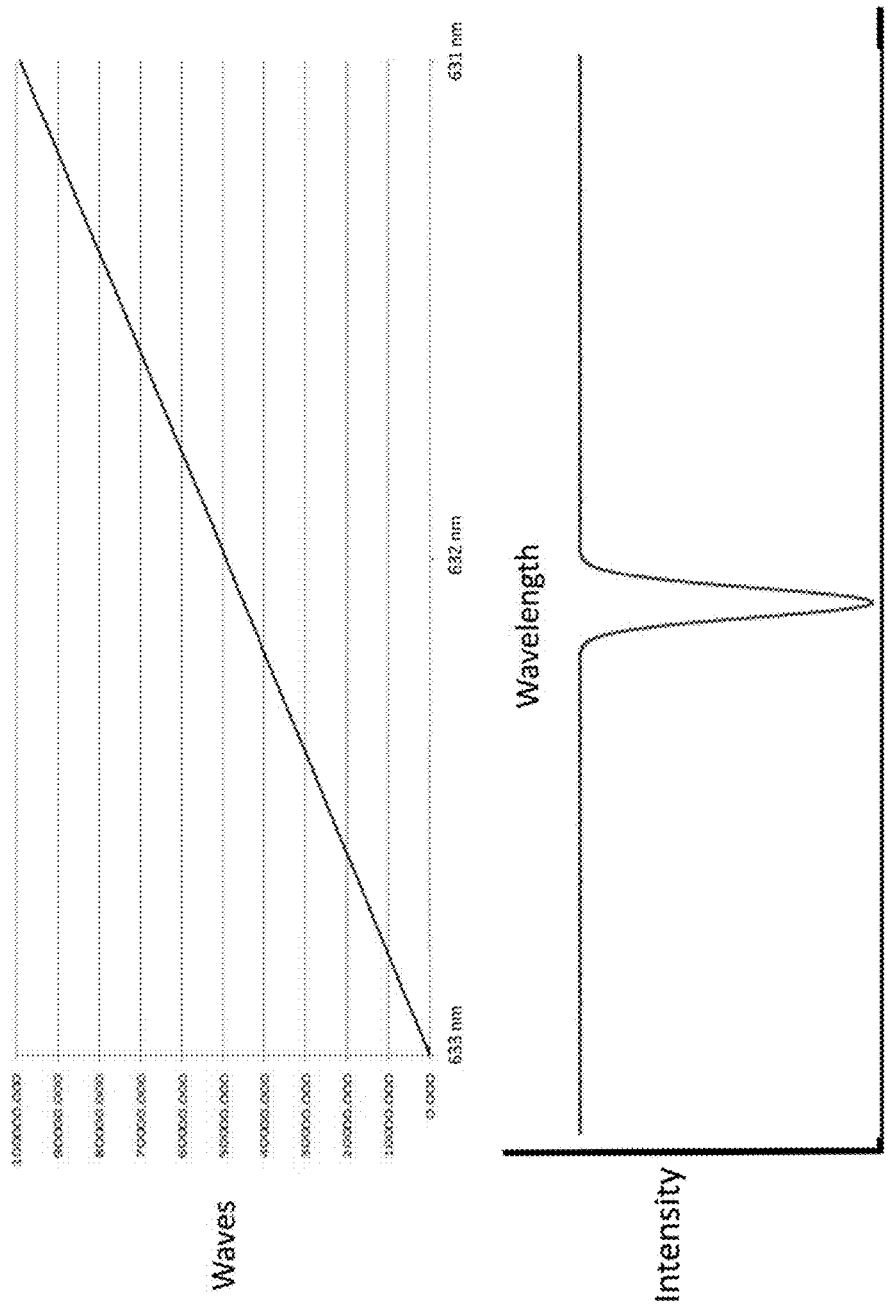

FIG. 69 shows a graphical representation of an exemplary signal from a frequency indicator as the frequency is swept.

Figure 70:
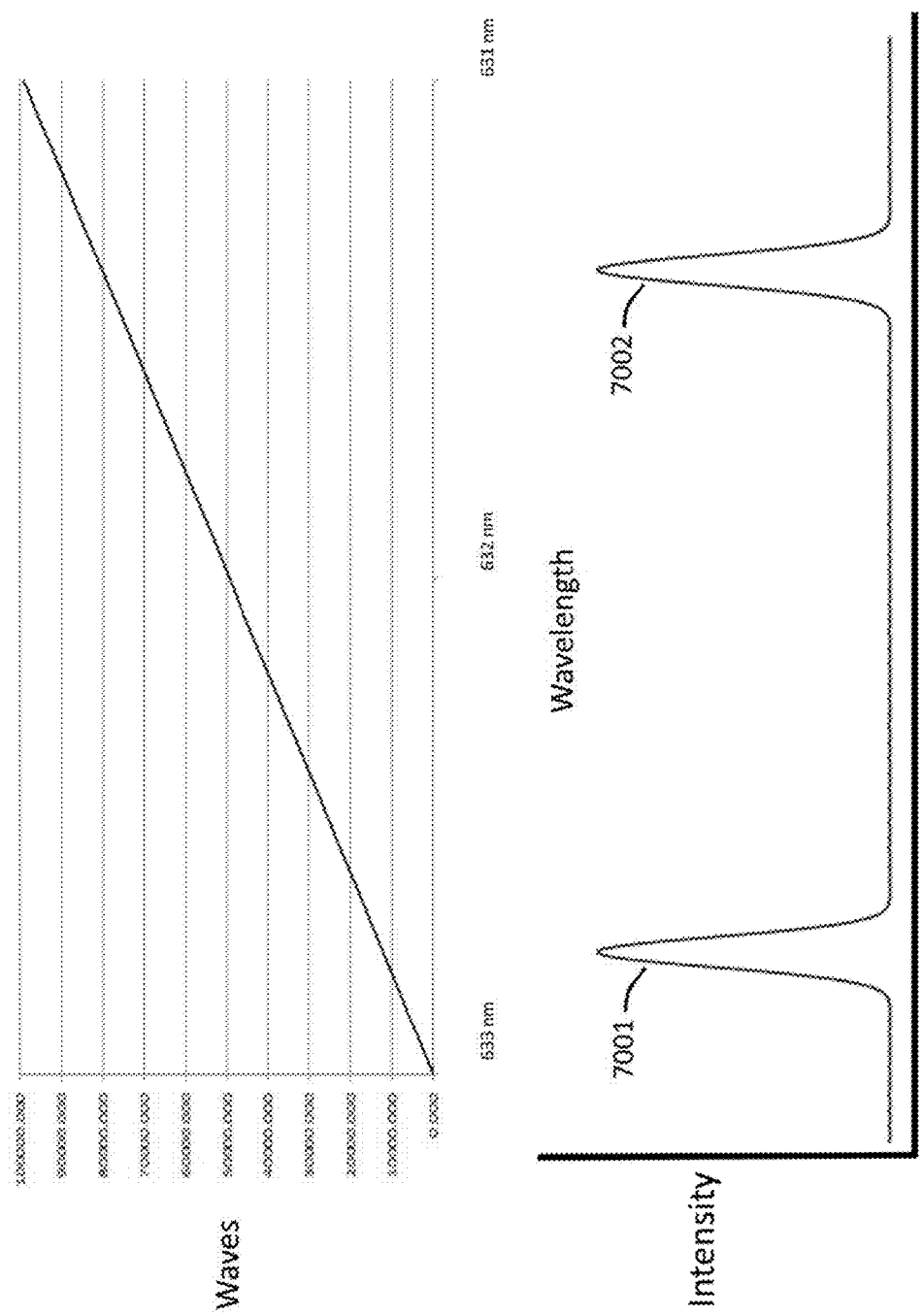

FIG. 70 shows a graphical representation of an exemplary signal from a frequency indicator as the frequency is swept.

Figure 71:
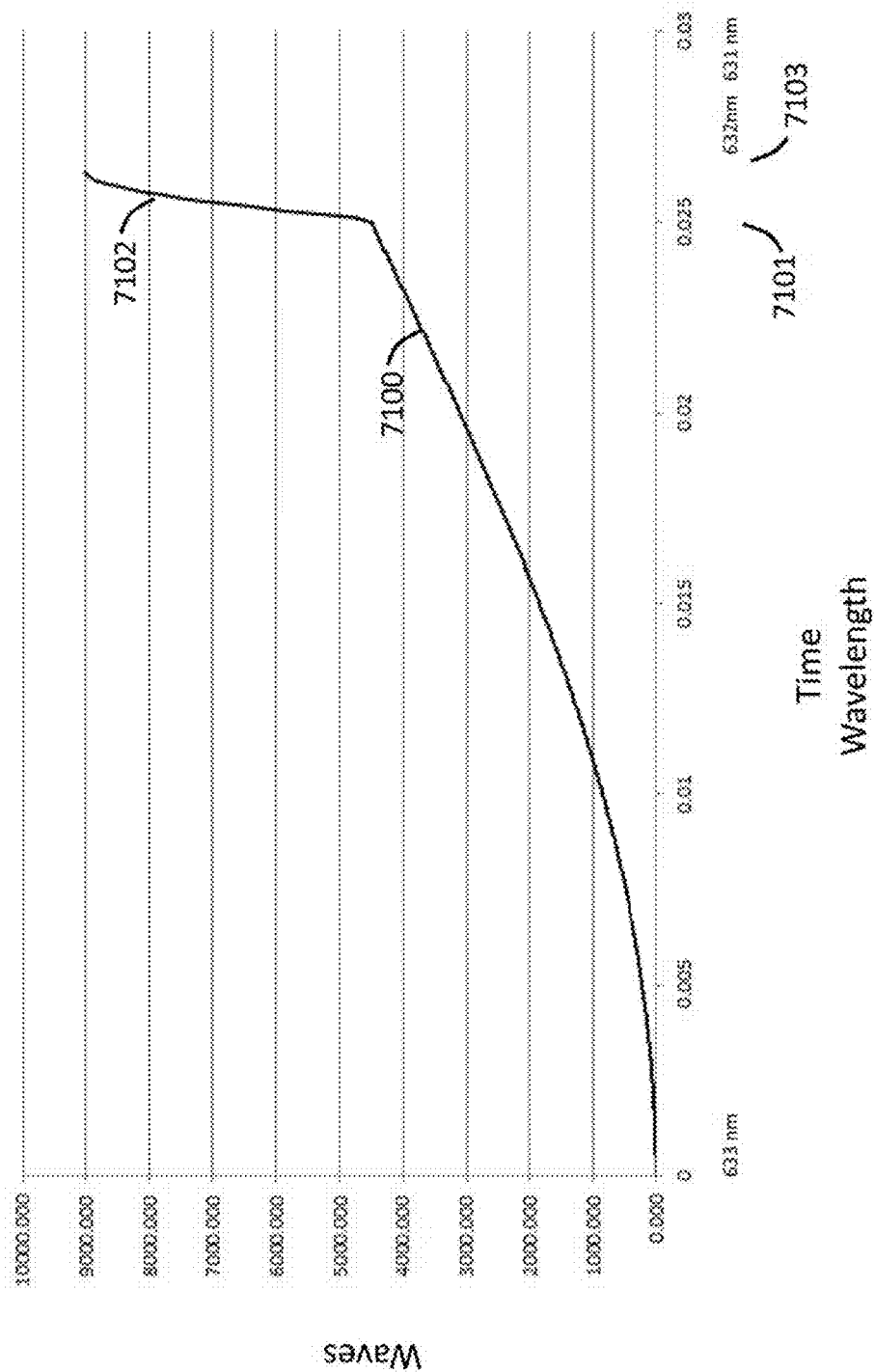

FIG. 71 shows a graph of an exemplary wave measurement as the frequency is swept at different rates.

Figure 72:
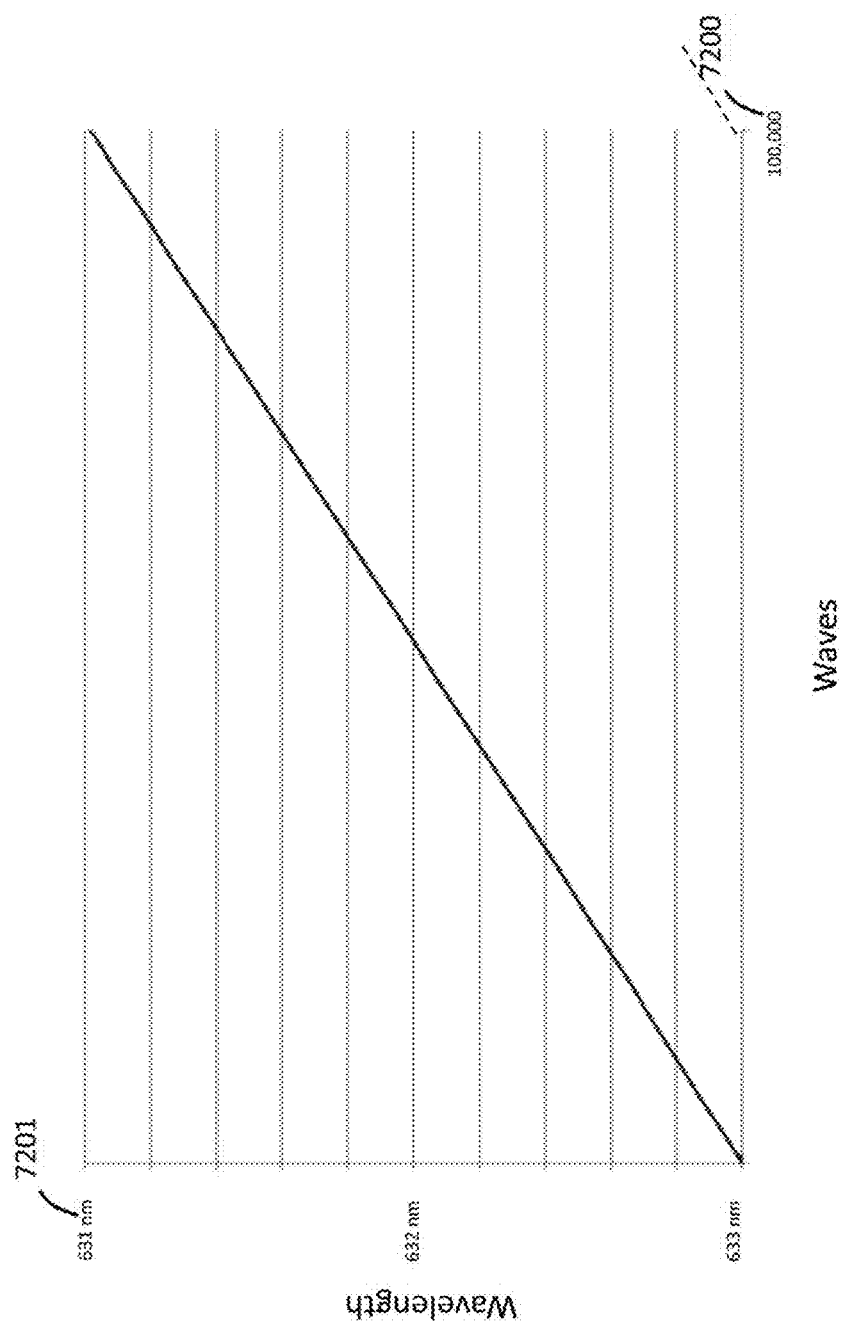

FIG. 72 shows a graph of an exemplary wave measurement as the frequency is swept until a specific wave count is met.

Figure 73:
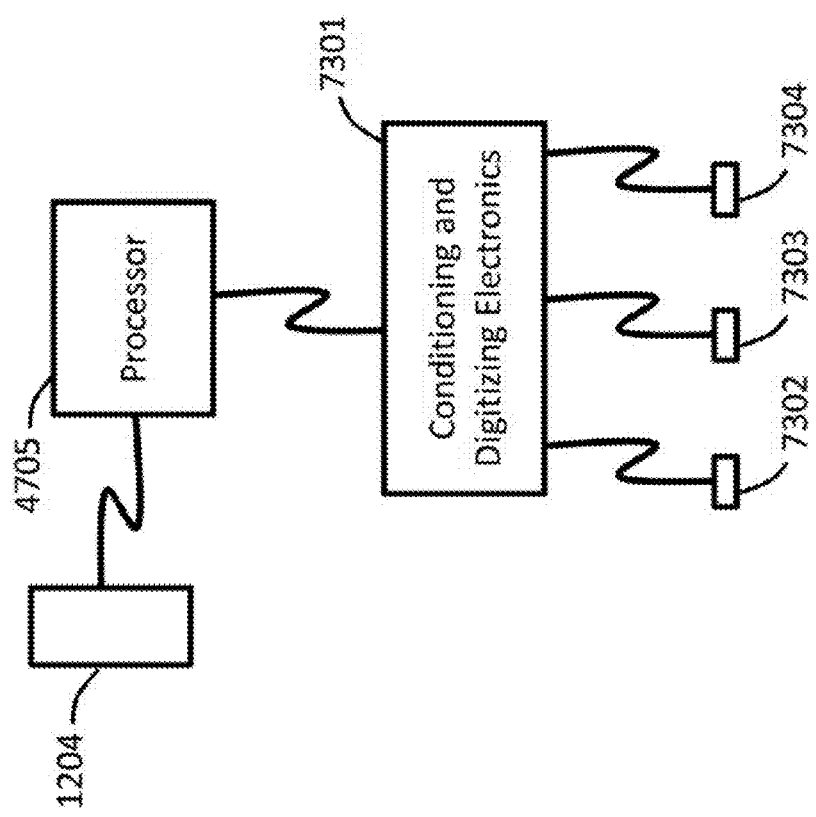

FIG. 73 shows a schematic of an exemplary sensors and electronics for the measurement air temperature, air pressure, and humidity for the purposes of adjusting for the changes in the index of refraction of air.

Figure 74:
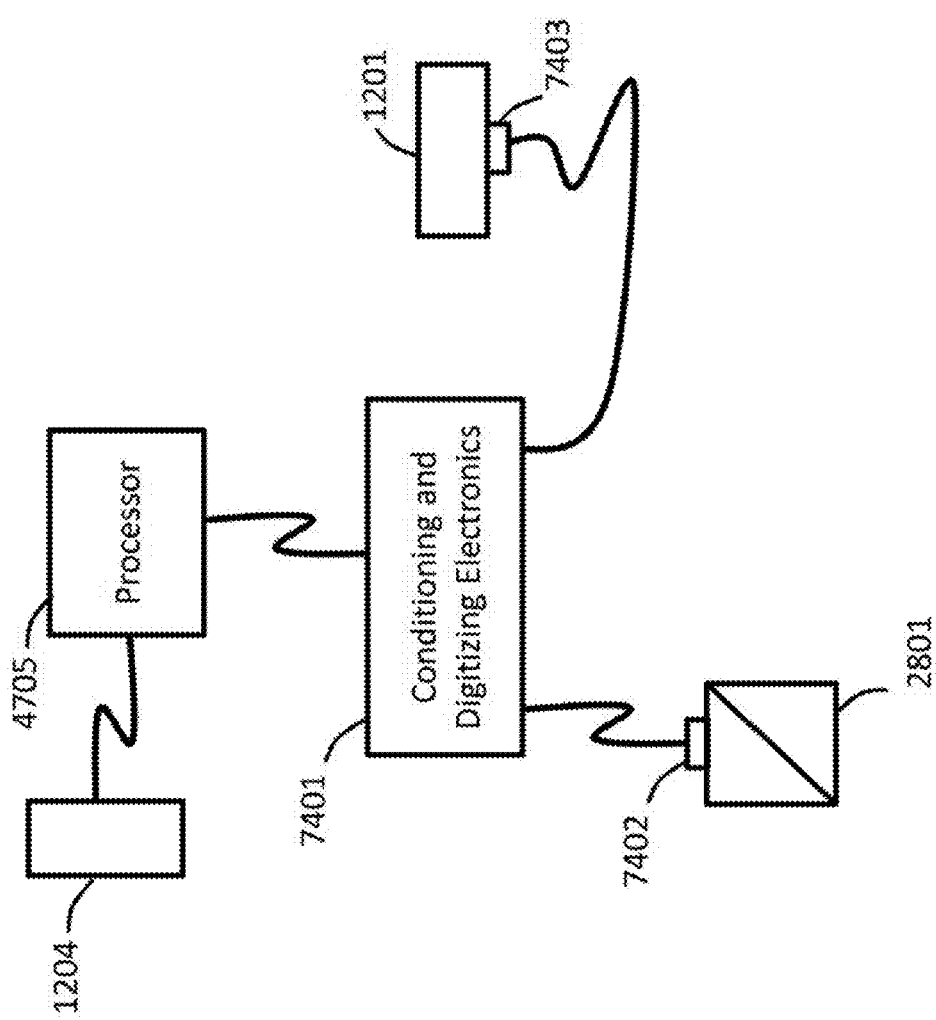

FIG. 74 shows a schematic of an exemplary velocity compensated frequency sweeping interferometer with sensors to measure the temperature of components.

Figure 75:
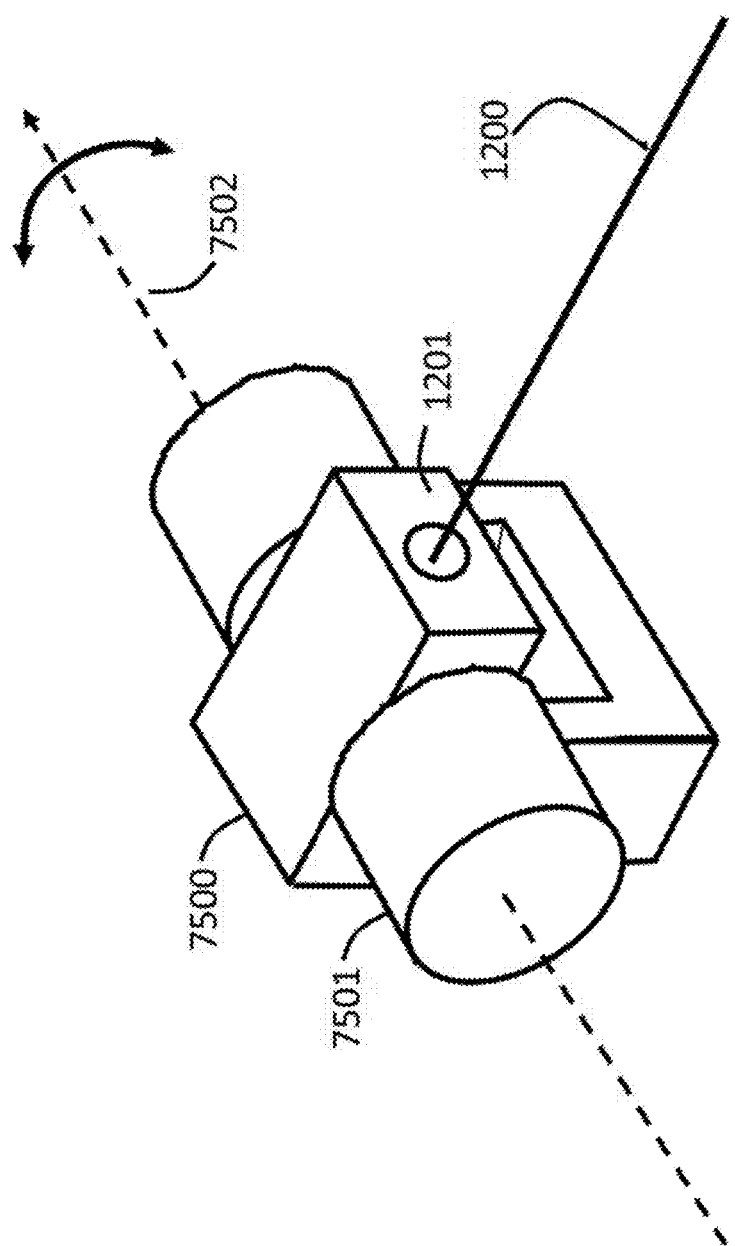

FIG. 75 shows an exemplary velocity compensated frequency sweeping interferometer mounted on a moveable platform having a single rotating axis.

Figure 76:
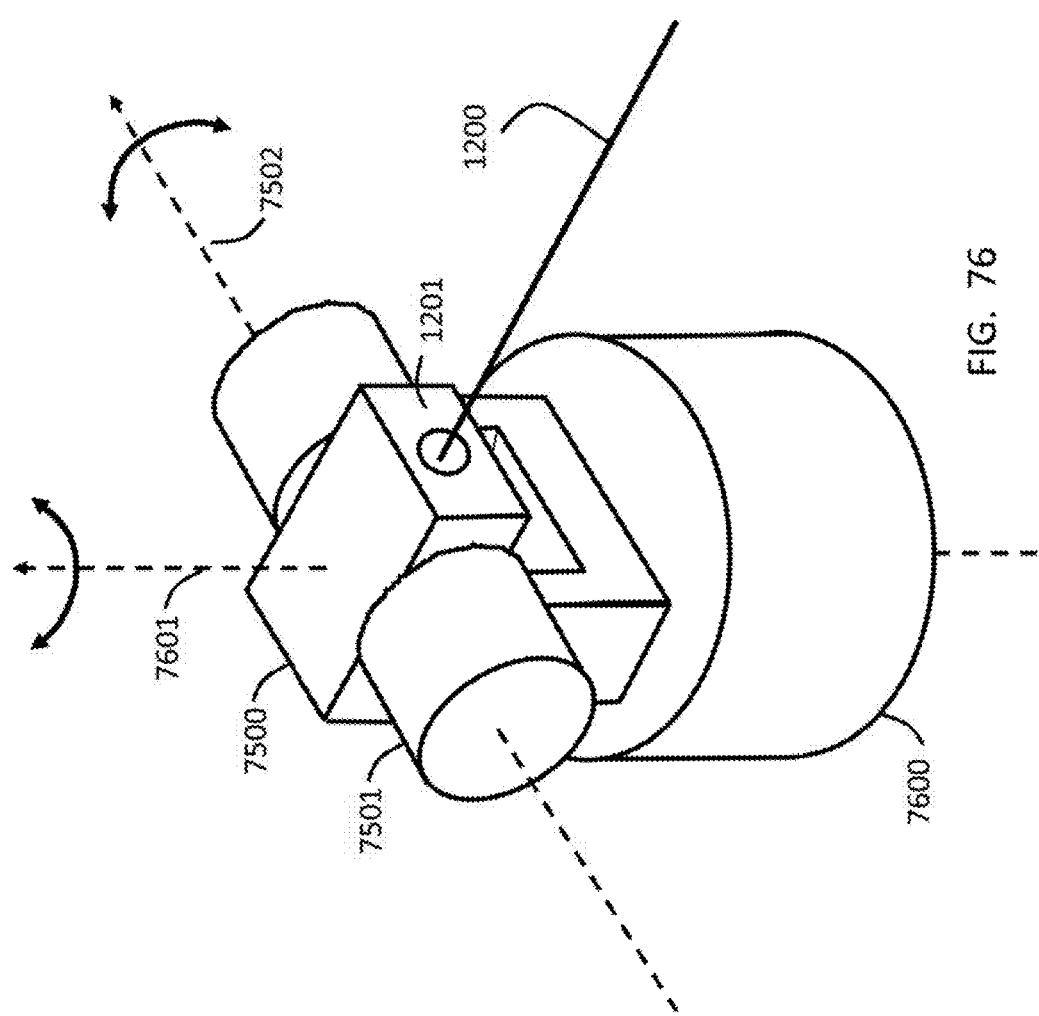

FIG. 76 shows an exemplary velocity compensated frequency sweeping interferometer mounted on a moveable platform having two rotating axes.

Figure 77:
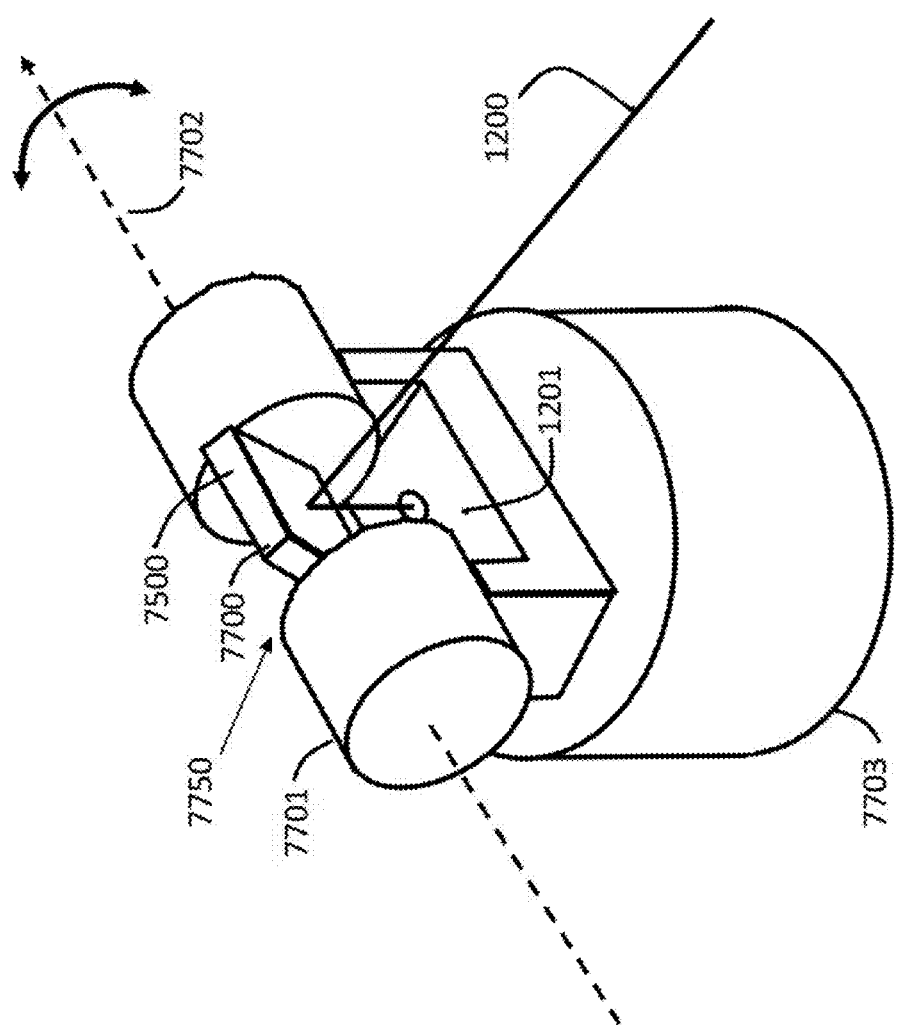

FIG. 77 shows an exemplary velocity compensated frequency sweeping interferometer with a mirror mounted on a moveable platform having a single rotating axis.

Figure 78:
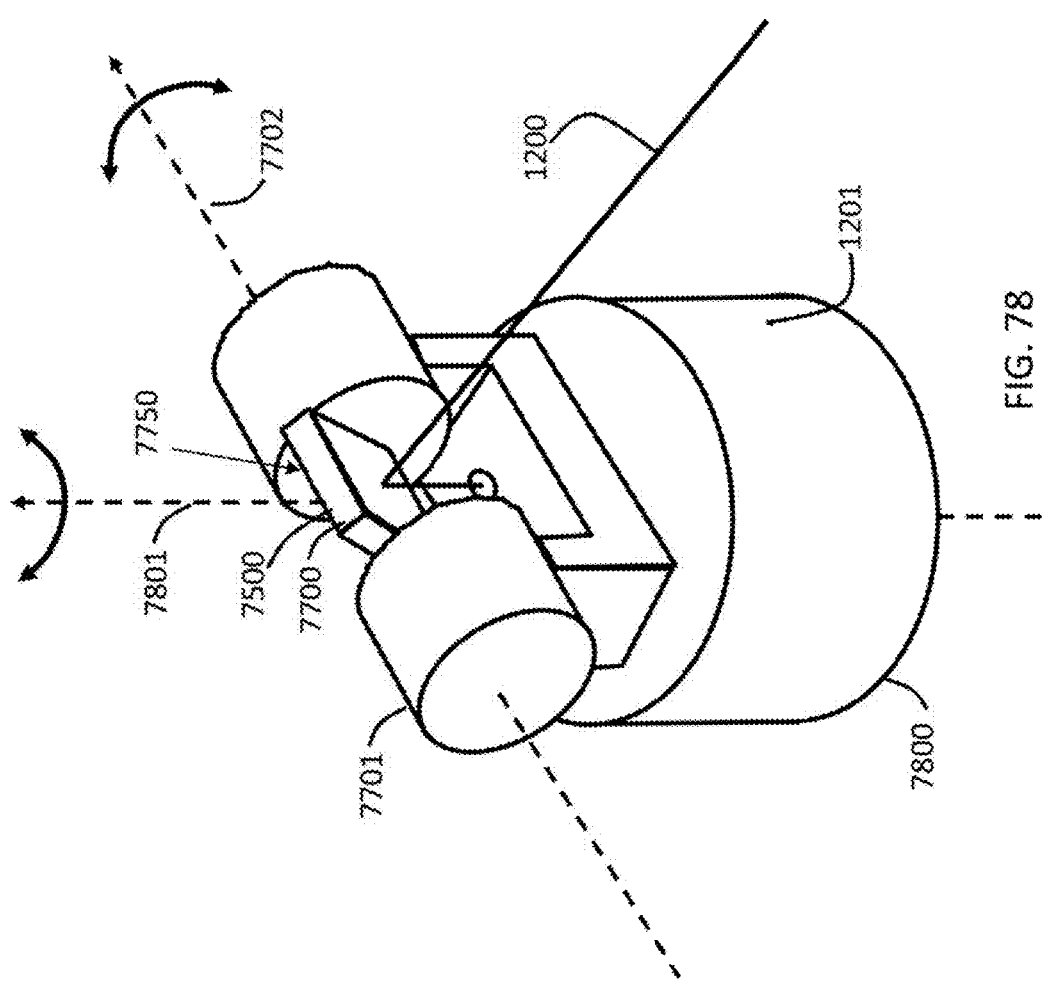

FIG. 78 shows an exemplary velocity compensated frequency sweeping interferometer with a mirror mounted on a moveable platform having two rotating axes.

Figure 79:
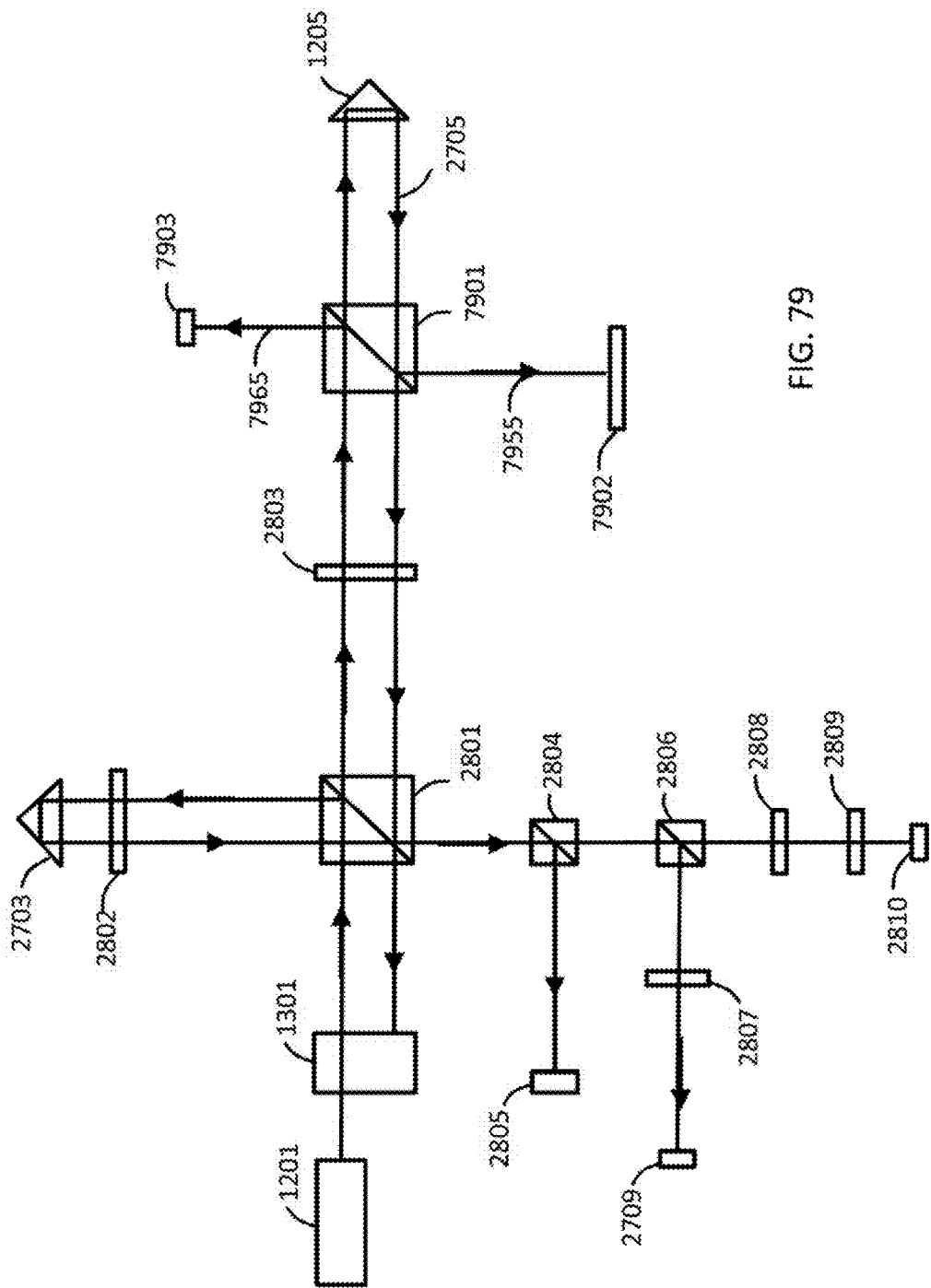

FIG. 79 shows a schematic of exemplary opto-electrical components of a velocity compensated frequency sweeping interferometer, as described herein, with a position sensing device.

Corresponding reference characters indicate corresponding parts throughout the several views of the figures. The figures represent an Illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 12:
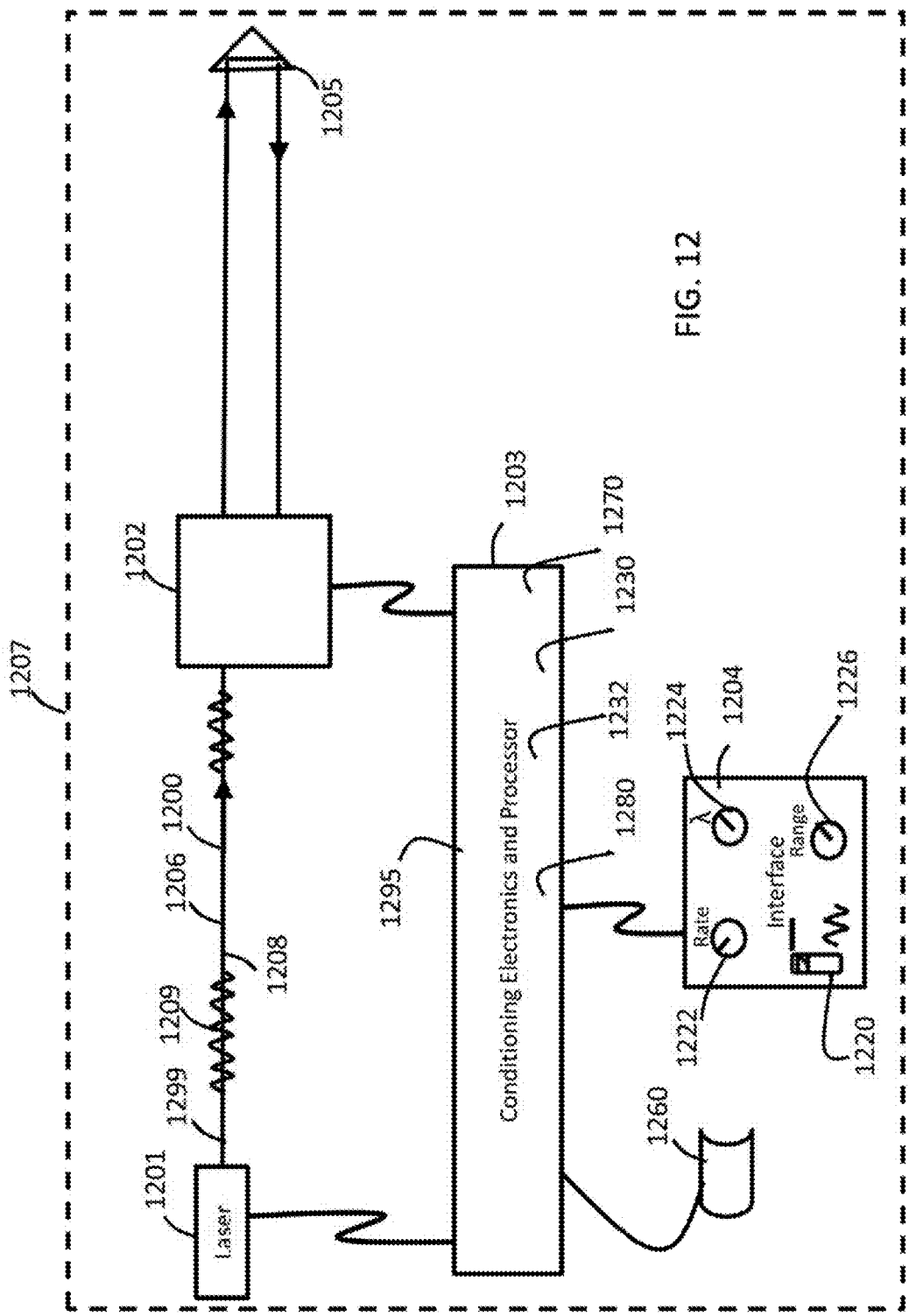

In an exemplary embodiment shown in FIG. 12, a velocity compensated frequency sweeping interferometer 1207, as described herein, comprises a single measurement light producing device 1201 configured to produce a coherent light source 1206 consisting of a single light beam 1200 or single outgoing light beam 1299. The single measurement light producing device is configured to transition the single light beam between a fixed frequency light beam 1208 to a scanning wavelength light beam 1209. A distance measurement interferometer 1202 combined with the conditioning electronics and processor 1203 measures the distance to a target 1205 and communicates it through an interface 1204. An exemplary, velocity compensated frequency sweeping interferometer 1207, as described herein may comprise a user input feature 1220 to allow control of the transition between fixed and scanning wavelength light beam modes. In addition, a user input feature 1222 may be configured to allow a user to input the sweep rate or the wavelength range of the scanning wavelength light beam 1224. A user input feature 1226 may be configured to provide an approximate range input for the target. It is to be understood that any suitable user input feature may be implemented including switches, knobs, touch-screens, keyboard input and the like.

A velocity compensated frequency sweeping interferometer 1207 may have any number of algorithms 1230 for controlling various functions of the apparatus and/or for adjusting parameters as required to provide a distance measurement value to a moveable reflective target. In one embodiment, an algorithm is configured to adjust a measured distance value to a target as a function of a refractive index of air. The index of refraction of air can vary as a function of temperature, pressure or humidity. One or more sensors 1260 may be configured to measure any of variables and provide input data to the processor and algorithm. In an alternative embodiment, a user may input any of the index of refraction variables through a user interface. An index compensation feature 1270 is configured to utilize one or more input variables to adjust a measured distance value to a target through an algorithm. In addition, the properties of a light beam interfacing with the velocity compensated frequency sweeping interferometer components, including optics, can be modified by the temperature of these components. A temperature compensating feature 1280 utilizes a temperature input and an algorithm 1230 to adjust a measured distance value to a target as a function of the input temperature value. Again, the temperature input value may be provided by a sensor 1260 or it may be input manually by a user through a user interface.

In another embodiment, an algorithm 1230, such as a transition algorithm, automatically controls the transition of the light beam from fixed to a scanning wavelength light beam. The transition algorithm may vary the transition of the light beam type as a function of input variables or as a function of electrical signals received from the digitizing electronics. A transition algorithm may control the transition of light beam type to produce a more accurate or reliable measured distance value to a movable reflective target.

In another embodiment, an algorithm 1230 is a frequency sweep rate algorithm that automatically varies the sweep rate as a function of input variables or electrical signals received. A sweep rate may need to be changed as a function of the distance of the target from the velocity compensated frequency sweeping interferometer 1207, for example. In another embodiment, an algorithm 1230 is a frequency sweep range algorithm that automatically varies the wavelength range of the single light beam as a function of input variables or electrical signals received.

FIG. 27 is an exemplary embodiment of a distance measurement interferometer comprising an input beam 2701 split by a non-polarizing beam splitter 2702, a reference reflector 2703 and a sensor 2709. The non-polarizing beam splitter 2702 may be considered a primary beam splitter as it splits the single light beam into a measurement beam 2704 and a reference beam 2750 for the purpose of measuring distance to the target 1205. The measurement light producing device 2706 produces a single coherent light source 2707 or single light beam 2700, such as a laser beam. In an exemplary embodiment, the velocity compensated frequency sweeping interferometer utilizes a single measurement light producing device that produces a single light beam that transitions from a fixed light beam to a scanning wavelength light beam. The input beam 2701 is split into a measurement beam 2704 and a reference beam 2750. The measurement beam travels to a target 2760 and returns as return beam 2705. The reference beam 2750 travels to reference reflector 2703 which is located at a fixed distance from the optics 2710 and reflects back as return reference beam 2755 where it is combined with the return beam 2705 by the interference optics 2725 to produce an interference beam 2790 that travels to a sensor 2709. The sensor 2709 is an example of an optoelectronic component 2795 that converts a beam into electrical signals. The return output beam 2708 is a beam from an optics that may or may not be used for measurement or processing. The interference optics 2725 and optics 2710 may be configured out of one or more optical components, including glass.

FIG. 28 is an exemplary embodiment of a distance measurement interferometer comprising an input beam 2701 split by a polarizing beam splitter (2801). A ¼ wave plate, 2802 and 2803, change the linear polarization state as the beam passes through it to the reflector and back. The beams recombine at splitter 2801. A non-polarizing beam splitter 2804 sends a portion of the light to sensor 2805 and is used to measure the overall intensity of the returned beam. Another non-polarizing beam splitter 2806 splits the beam again. Both paths after this splitter contain linear polarizers, 2807 and 2809, rotated 45 degrees to both polarization states so that the beams will interfere. One of the paths has an additional ¼ wave-plate 2808 so that the interference beam is 90 degrees out of phase so that the direction of target movement can be detected.

FIG. 47 is an exemplary embodiment of the electronics and processing of the present invention. The signal from sensor 2805 is conditioned with electronics 4701 and represents the overall intensity of the return beam, which is needed to normalize the readings from the other two sensors. The signal from sensor 2709 is conditioned with electronics 4702. The signal from sensor 2810 is conditioned with electronics 4703. The conditioning electronics are connected to digitizing electronics 4704 that convert the conditioned signal to a digital representation of the number of waves. The digitizing electronics are connected to a processor 4705 that performs additional processing such as mode handling, applying compensations, setting the laser frequency on laser 1201, processing input commands and outputting results. Input commands and output data pass through interface 1204.

In one embodiment, the interface 1204 is a display 4801 as shown in FIG. 48. In another embodiment, the interface 1204 is a display 4801 and a keyboard 4901 as shown in FIG. 49. The keyboard 4901 is one example of a user interface 4906 that may be used to input values and/or control an exemplary velocity compensated frequency sweeping interferometer or components thereof. In another embodiment, the interface 1204 is the electronics, synchronization, and communications protocols 5001 that define a wired interface that couple to another computing device 5002 as shown in FIG. 50. In another embodiment, the interface 1204 can be the electronics, synchronization and communications protocols 5101 that define a wireless interface that couple to another computing device 5102 as shown in FIG. 51.

The invention has two measurement modes. The first mode is the Absolute Distance Measurement mode, also referred to as the ADM mode. In this mode of operation, the invention uses Frequency Sweeping Interferometry, FSI, which is demonstrated in FIG. 10 and FIG. 11. The second mode of operation is a relative distance measurement mode using Fixed Frequency Interferometry, FFI, which is demonstrated in FIG. 3, FIG. 4, and FIG. 5.

The transition between these measurement modes can be grouped into functional modes that can be set through the interface 1204. In one embodiment, there are two functional modes referred to as "Forced Absolute" and "Forced Relative," as shown in FIG. 52. In "Forced Absolute" mode, the exemplary device uses only the FSI measurement mode. In "Forced Relative" mode, the exemplary device only uses the FFI measurement mode. In another embodiment, a third functional mode is added called "Automatic Transition," as shown in FIG. 53. In the "Automatic Transition Mode," the exemplary device analyzes the measurements based on a set of criteria and makes determinations as to which measurement mode should be used. In another embodiment, "Automatic Transition Mode," is the only functional mode that is available as shown in FIG. 54.

FIG. 55, FIG. 56, FIG. 57, and FIG. 58 show state machines for "Forced Relative," "Forced Absolute," and two embodiments of "Automatic Transition" modes. All of the state machines have a "No Target" state. In this state, the measurement mode setting is not applicable since there is no distance to be measured. Transitions from this state are caused by a "Target Acquired" event. In one embodiment, target presence can be determined by analyzing the signal from sensor 2805. The target can be said to be present when the signal increases above a pre-determined threshold. In another embodiment, target presence can be determined by some other means external to the device and then indicated through the interface. Another common event in the state machines is "Target Lost," which transitions the state machine from its current state to the "Target Lost" state. In one embodiment, target presence can be determined by analyzing the signal from sensor (2805). The target can be said to be lost when the signal decreases below a pre-determined threshold. In another embodiment, target loss can be determined by some other means external to the device and then indicated through the interface. All other states use either the FFI or FSI measurement modes. States that are "Forced" and "Final" will remain in that measurement mode and therefore only transition when the target is lost. The states labeled "Interim" take measurements and analyze the results, which generate some events.

FIG. 59 is a flow chart of the operation in the "Initial FSI" and "Interim FSI" states, which sweeps the frequency over a known range and calculates the distance based on the measured change in waves. Optical path difference, OPD, can be calculated by:

$$OPD = \Delta N \frac{\lambda_2 \lambda_1}{\lambda_2 - \lambda_1} \quad (2)$$

Where $\lambda_1$ is the initial wavelength, $\lambda_2$ is the final wavelength and $\Delta N$ is the number of waves measured after the frequency sweep.

FIG. 60 is a flowchart of another embodiment of the "Initial FSI" and "Interim FSI" states which sweeps the frequency over a known range and periodically samples the change in waves. At the end of the sweep the distance is calculated as the average of all of the calculated distances:

$$OPD = \frac{1}{n}\sum_{1}^{n}\left(\Delta N_n \frac{\lambda_n \lambda_{(n-1)}}{\lambda_n - \lambda_{(n-1)}}\right) \quad (3)$$

FIG. 61 is an embodiment of "Analysis FSI". In this embodiment, the calculated distance is still calculated by equation 3. Analysis is accomplished by calculating the standard deviation of the calculated distances:

$$\sigma = \sqrt{\frac{1}{n-1}\sum_{1}^{n}\left(OPD - \frac{\lambda_n \lambda_{(n-1)}}{\lambda_n - \lambda_{(n-1)}}\right)} \quad (4)$$

If the standard deviation is below a predetermined threshold, the criteria will be met. Otherwise a new sweep is started for another measurement.

An embodiment of "Analysis FFI" is demonstrated in FIG. 62. Here the number of waves is sampled until a specified number of samples are collected. The samples are analyzed for the average velocity and acceleration.

$$v = \frac{1}{n}\sum_{i}^{n}\left(\frac{\Delta N_n \lambda}{t}\right) \quad (5)$$

$$a = \frac{1}{n-1}\sum_{2}^{n}\left(\frac{(\Delta N_n - \Delta N_{(N-1)})\lambda}{t^2}\right) \quad (6)$$

If the velocity and acceleration are below a predetermined threshold, the criteria are met. In equations 5 and 6, "t" is time, "v" is velocity and "a" is acceleration.

Figure 13:
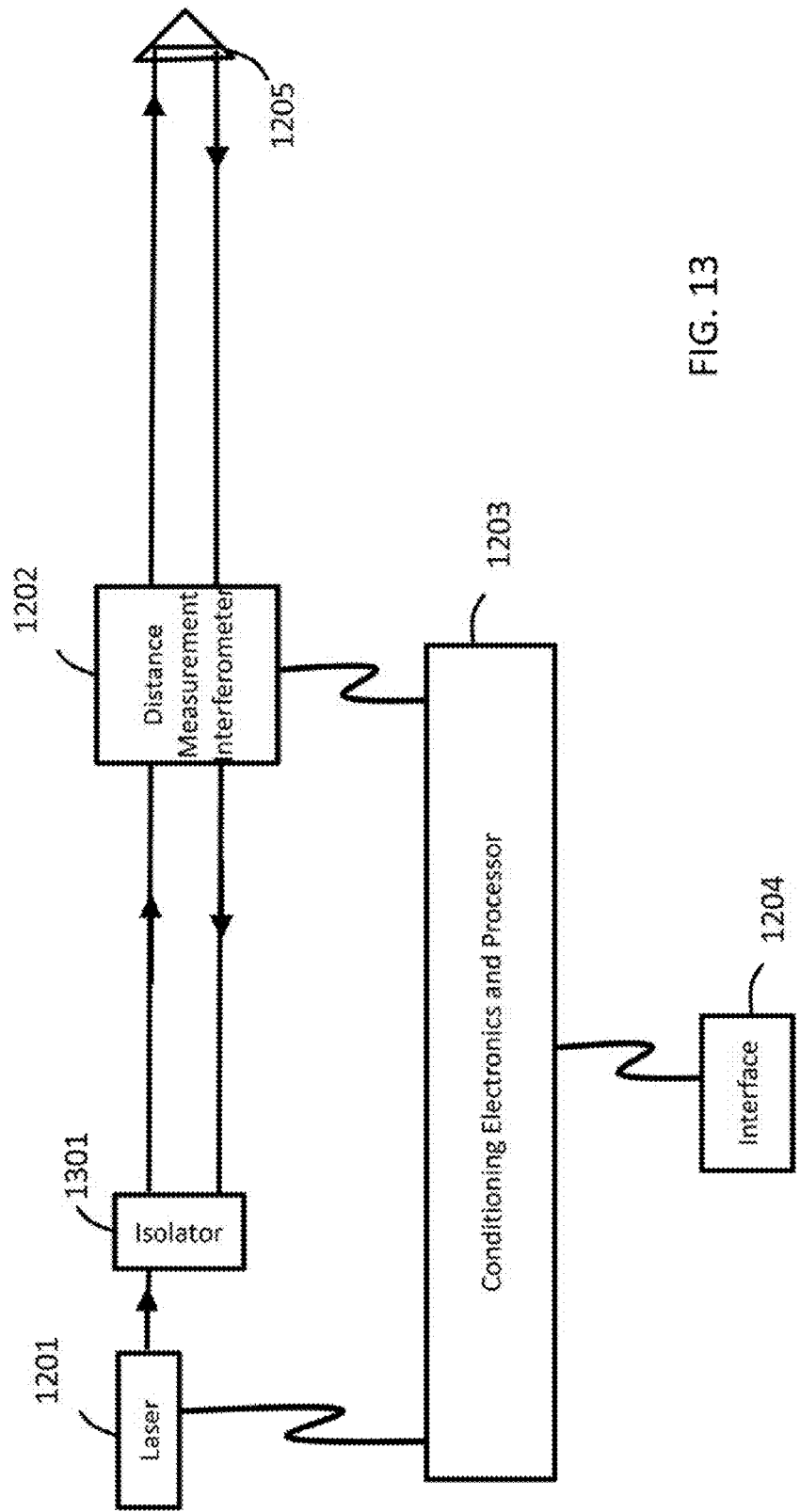

The velocity compensated frequency sweeping interferometer, as described herein, may comprise an optical isolator 1301 as shown in FIG. 13. The optical isolator would prevent light reflected back from the target from feeding back into the isolator.

Figure 14:
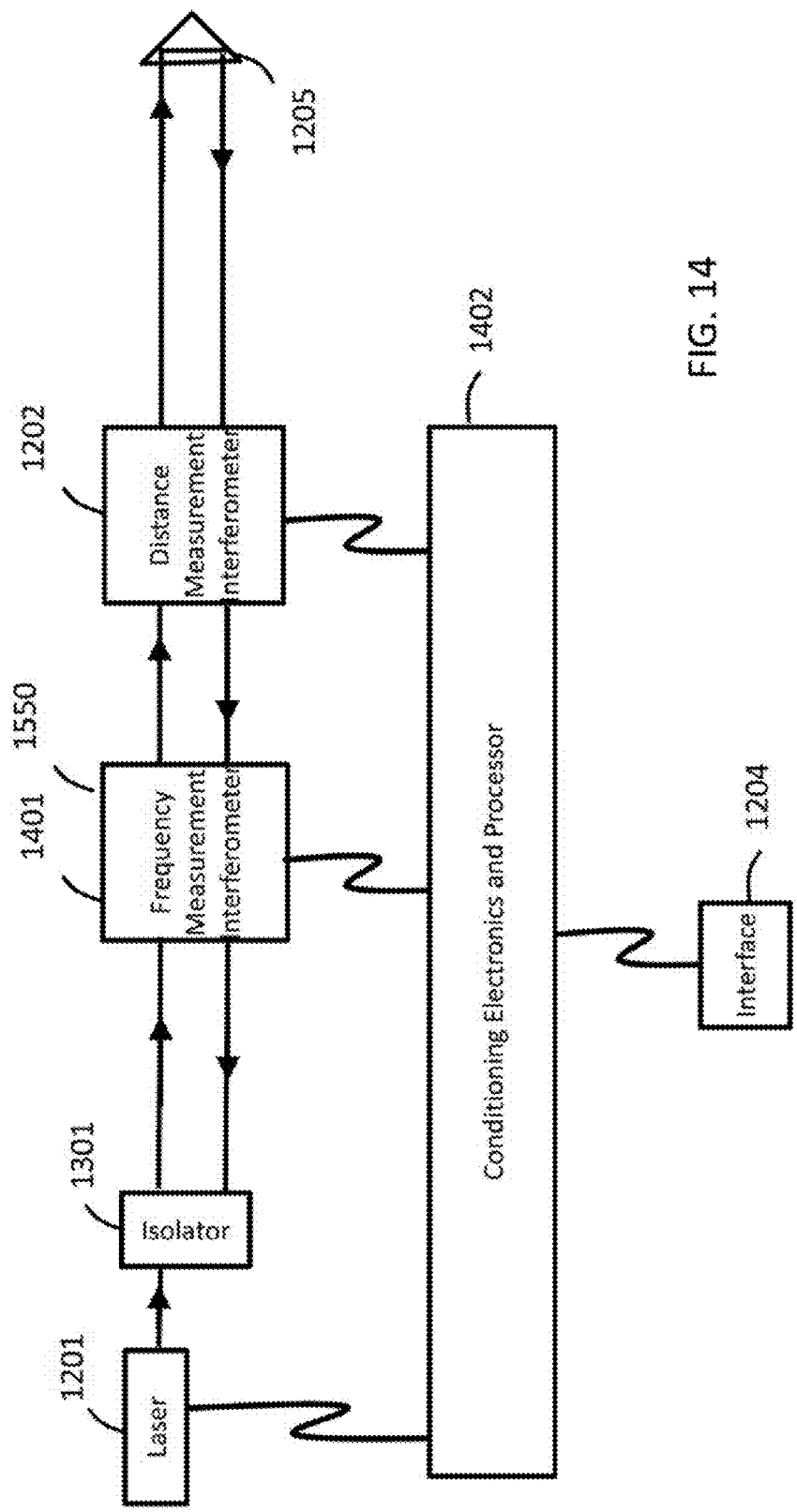
Figure 29:
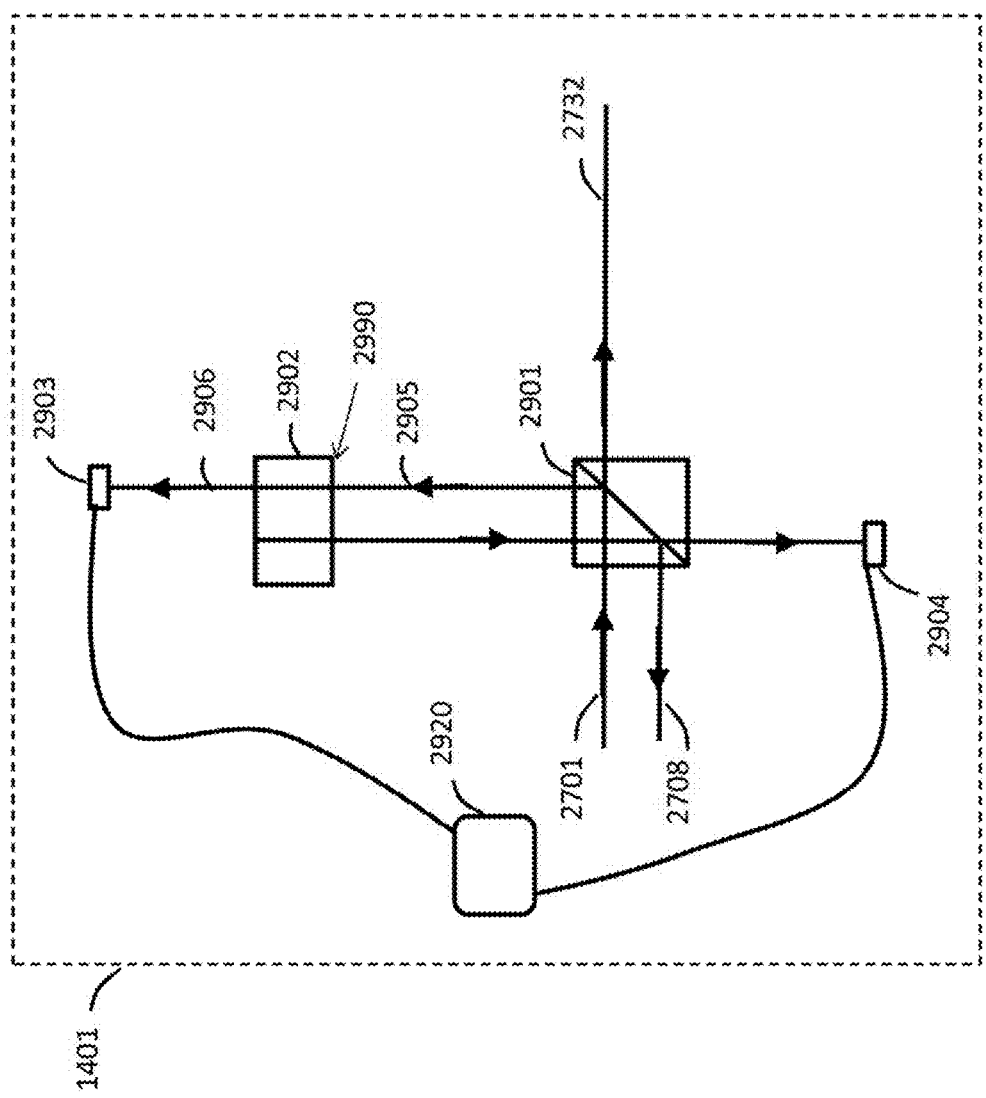
Figure 30:
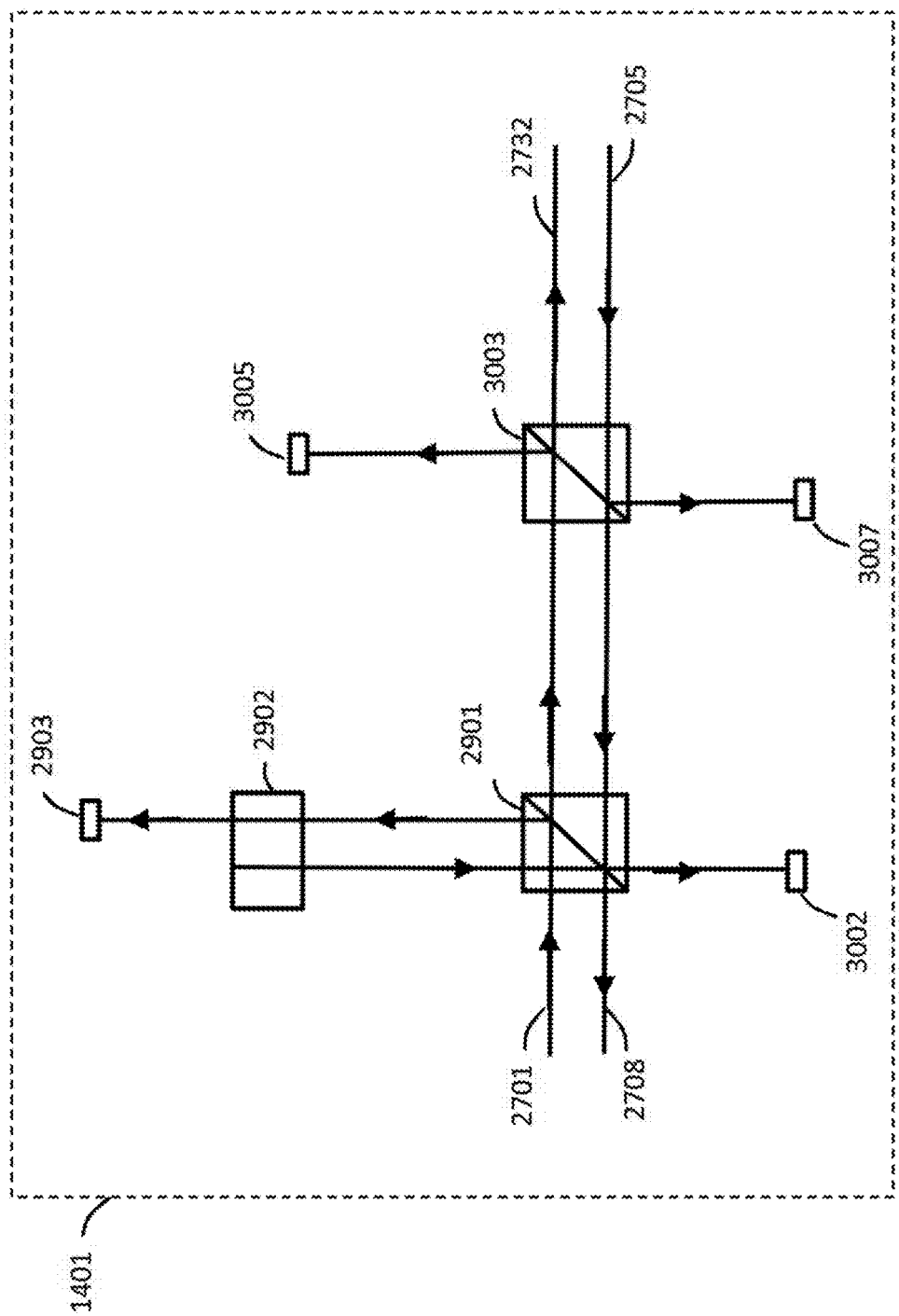
Figure 31:
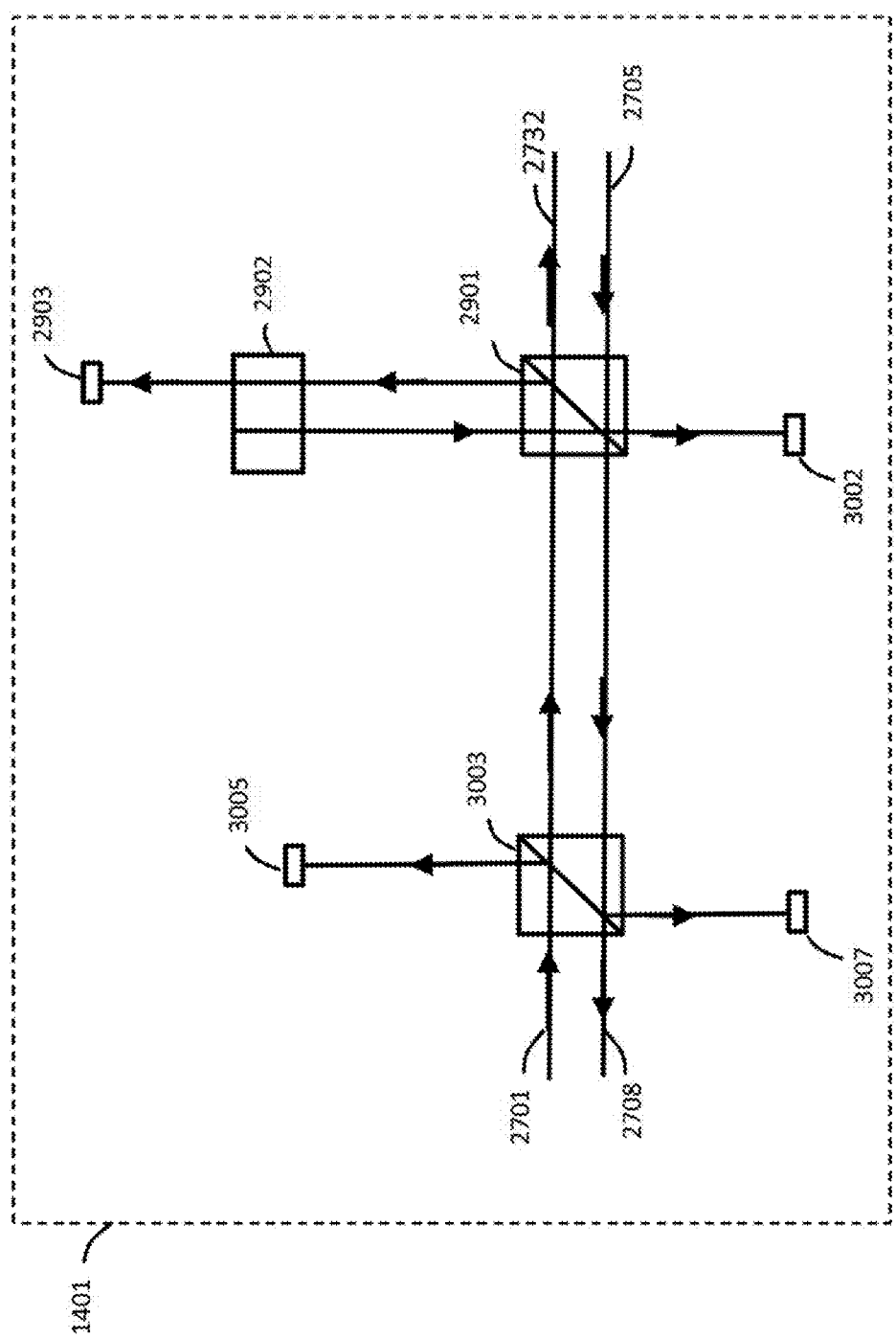
Figure 32:
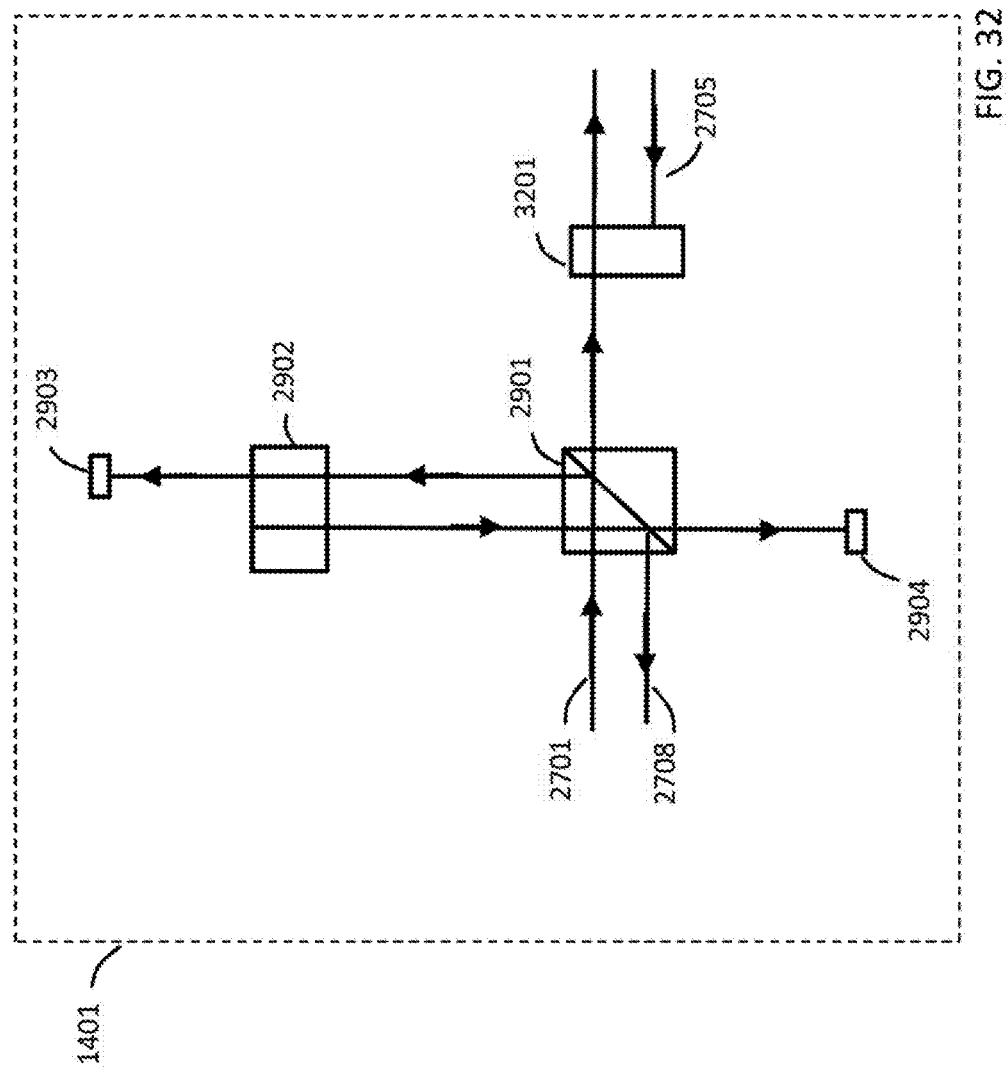

The velocity compensated frequency sweeping interferometer, as described herein, may comprise a frequency measurement interferometer 1401 placed before the distance measurement interferometer as shown in FIG. 14. An outgoing frequency measurement device 1550 may comprise any suitable combination of optics and sensors to measure an input beam frequency. A non-polarizing beam splitter 2901 produces a frequency measurement beam 2905 and a continuation beam 2732 from the input beam 2701. The non-polarizing beam splitter 2901 directs the frequency measurement beam toward an etalon 2902 to create a Fabry-Perot interferometer 2990. Two sensors 2903, 2904 measure the optical output from the etalon as shown in FIG. 29. The beam splitter 2901 produces a frequency measurement beam 2905. The outgoing frequency interference beam 2906 is produced by the etalon 2902 optic.

The Fabry-Perot interferometer may comprise or couple with one or more optoelectronic devices 2920 that convert the Fabry-Perot interferometer output into one or more second electrical signals. Digitizing electronics may be configured to produce second digital values from the second electrical signals, whereby the change in wavelength is calculated that incorporates the second digital values into the absolute distance measurement. The second digital values also provide information with respect to the change rate of change in the wavelength and can be used in conjunction with the rate of change in the first interferometer to adjust sweep rate of the scanning wavelength light beam. The second digital values may also be used as feedback for a closed loop system allowing the optical frequency to be held to a desired value. The error between the desired fixed wavelength and the measured wavelength can also be incorporated into the fixed frequency measurement calculation. A Fabry-Perot interferometer configuration may be configured with an etalon with a fixed Free Spectral Range (FSR) or with a tunable FSR.

FIG. 63 is an embodiment of the electrical and processing to support the opto-electrical design from FIG. 29. Two sensors 2903, 2904 measure the optical output from the etalon. Conditioning electronics 6301, 6302 are required for the additional sensors and digitizing electronics 6303 must support all of the sensors as shown in FIG. 63. The digitizing electronics are connected to a processor 4705 that performs additional processing such as mode handling, applying compensations, setting the laser frequency, processing input commands and outputting results. Additional processing is added for closed loop control of the laser frequency based on the Fabry-Perot etalon.

With the added capability of a processor 4705 to measure the wavelength, referred to as $\lambda$ in the equations, this embodiment does not require a priori knowledge of the laser wavelength. Per the prior art, the measured wavelengths are now used in equations 2 through 6.

FIG. 64 shows the signal 6401 from the Fabry-Perot interferometer as the frequency is swept. Those skilled in the art will appreciate that the spacing and shape of the peaks are dependent on the parameters Free Spectral Range, or FSR, and a parameter known as Finesse. By counting the peaks during the sweep, the wavelength change can be determined for FSI. Individual peaks can be correlated to specific wavelengths, so for FFI it is possible to select a particular peak and then control the laser frequency to a fixed point 6402. This can be accomplished by driving the laser in open loop to first locate the appropriate wave. Once the appropriate peak is located, the loop is closed to drive the laser to the given location.

FIG. 65 shows one embodiment of the control loop used to control the laser from processor 4705. In this case it is a PI control loop, where the signal from the Fabry-Perot interferometer is fed back to the control loop and subtracted from the command signal. The difference, referred to as the error signal is summed with previous error signals and multiplied by an integrator gain term I. The same error is multiplied by an error gain term P. The P and I signals are summed and the digital value is converted to an electrical signal that is sent to the laser to adjust the frequency. Those skilled in the art will appreciate that there are a variety of closed loop control designs that would be appropriate for this application.

Figure 15:
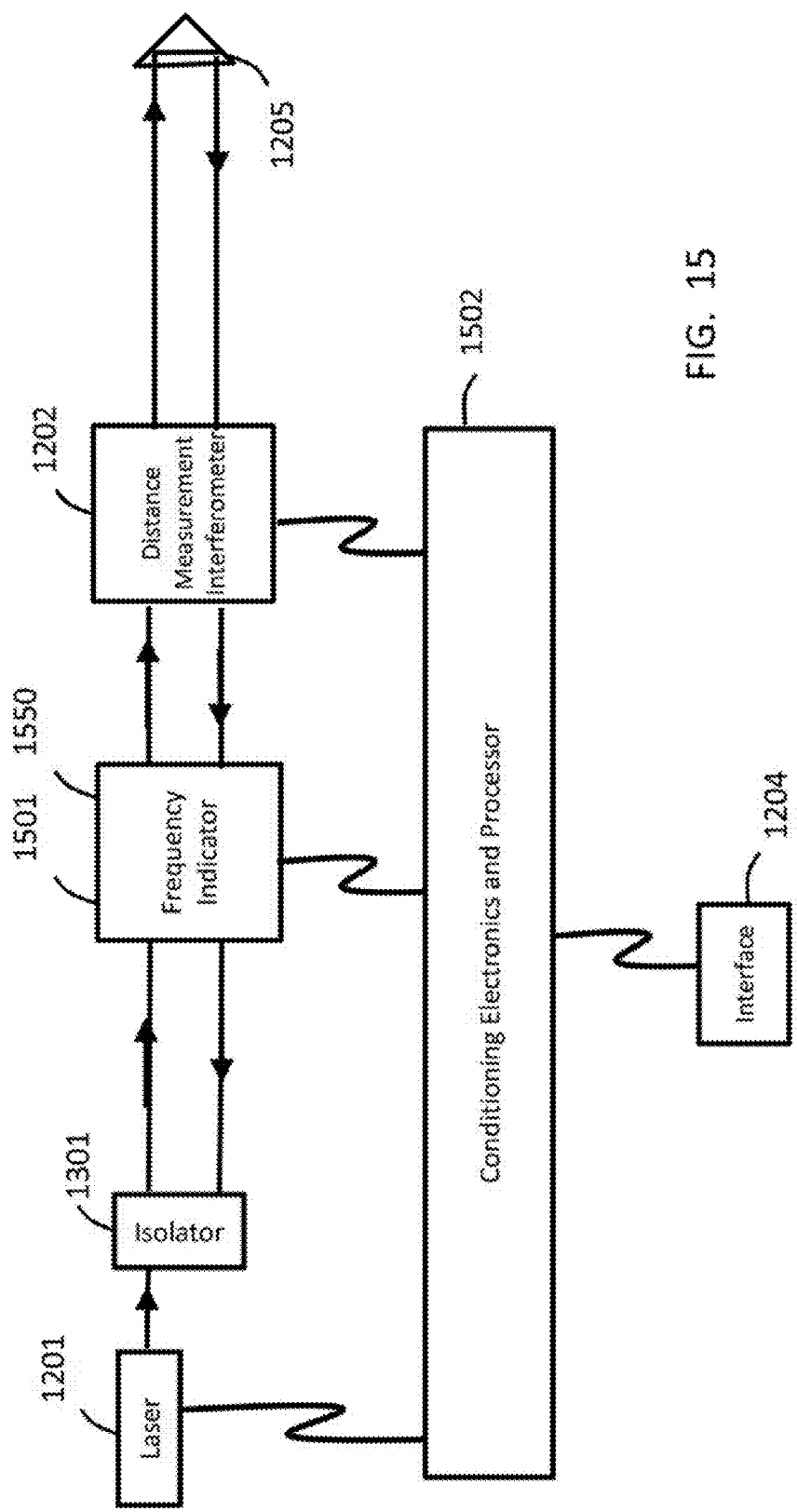
Figure 33:
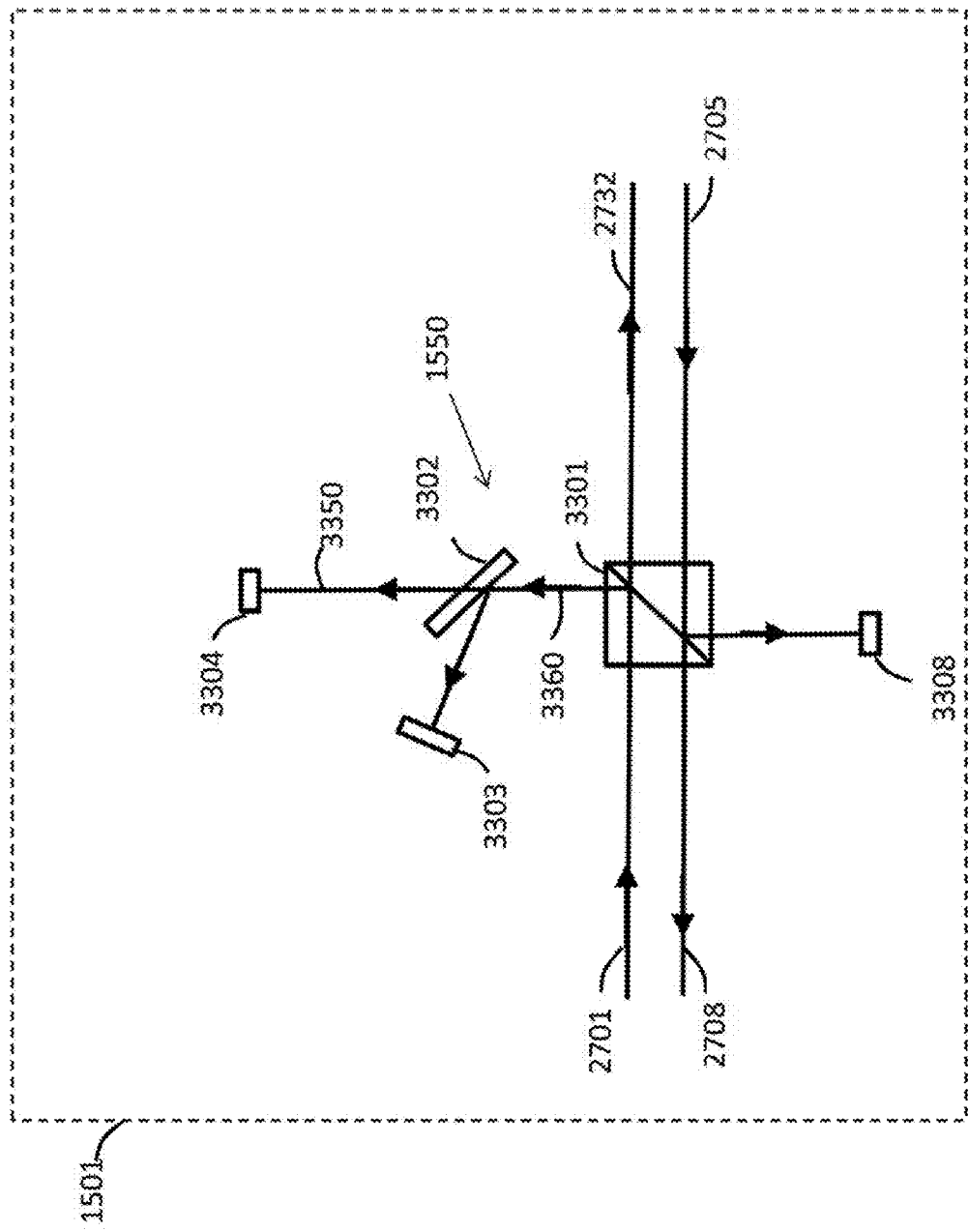
Figure 34:
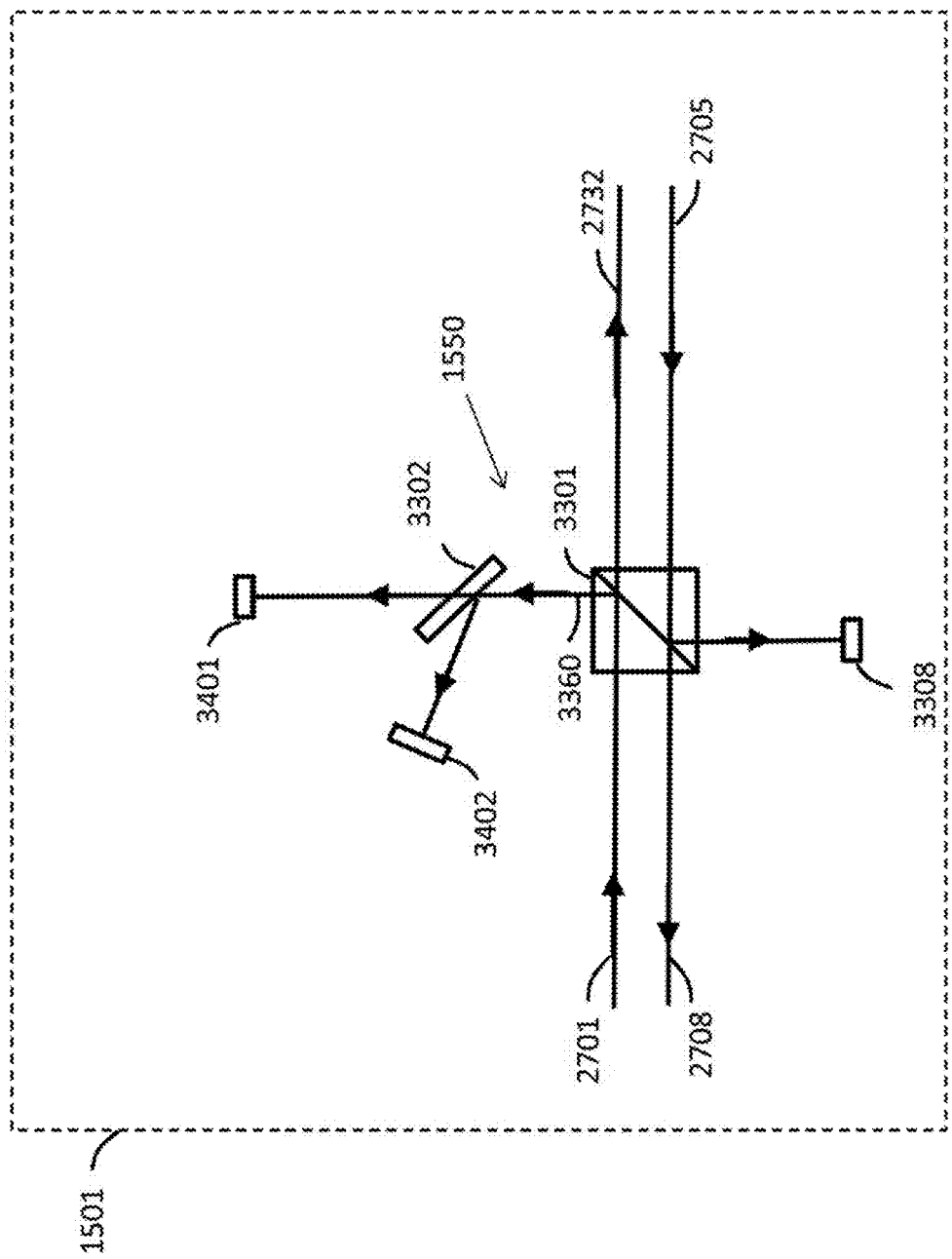
Figure 35:
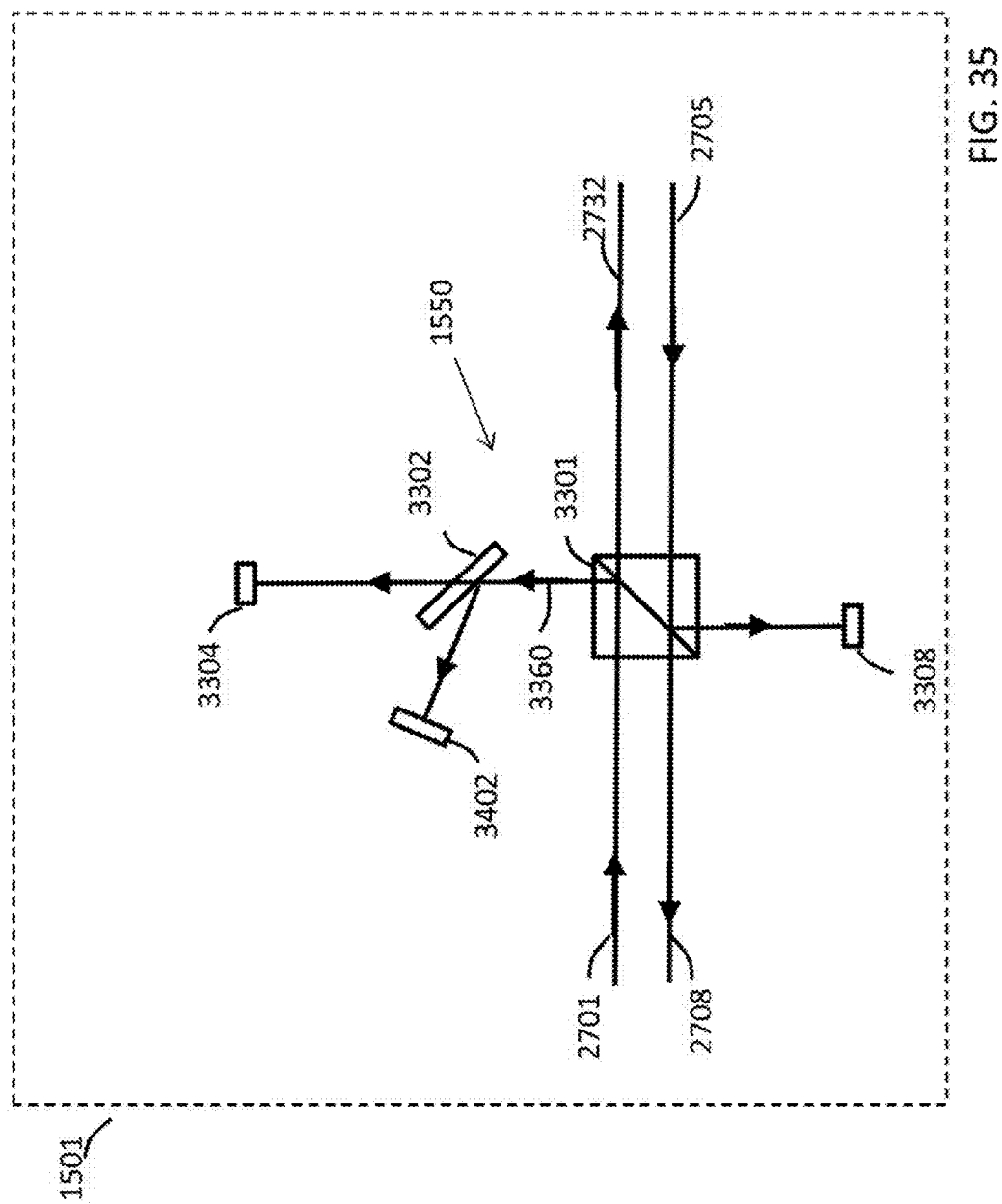
Figure 36:
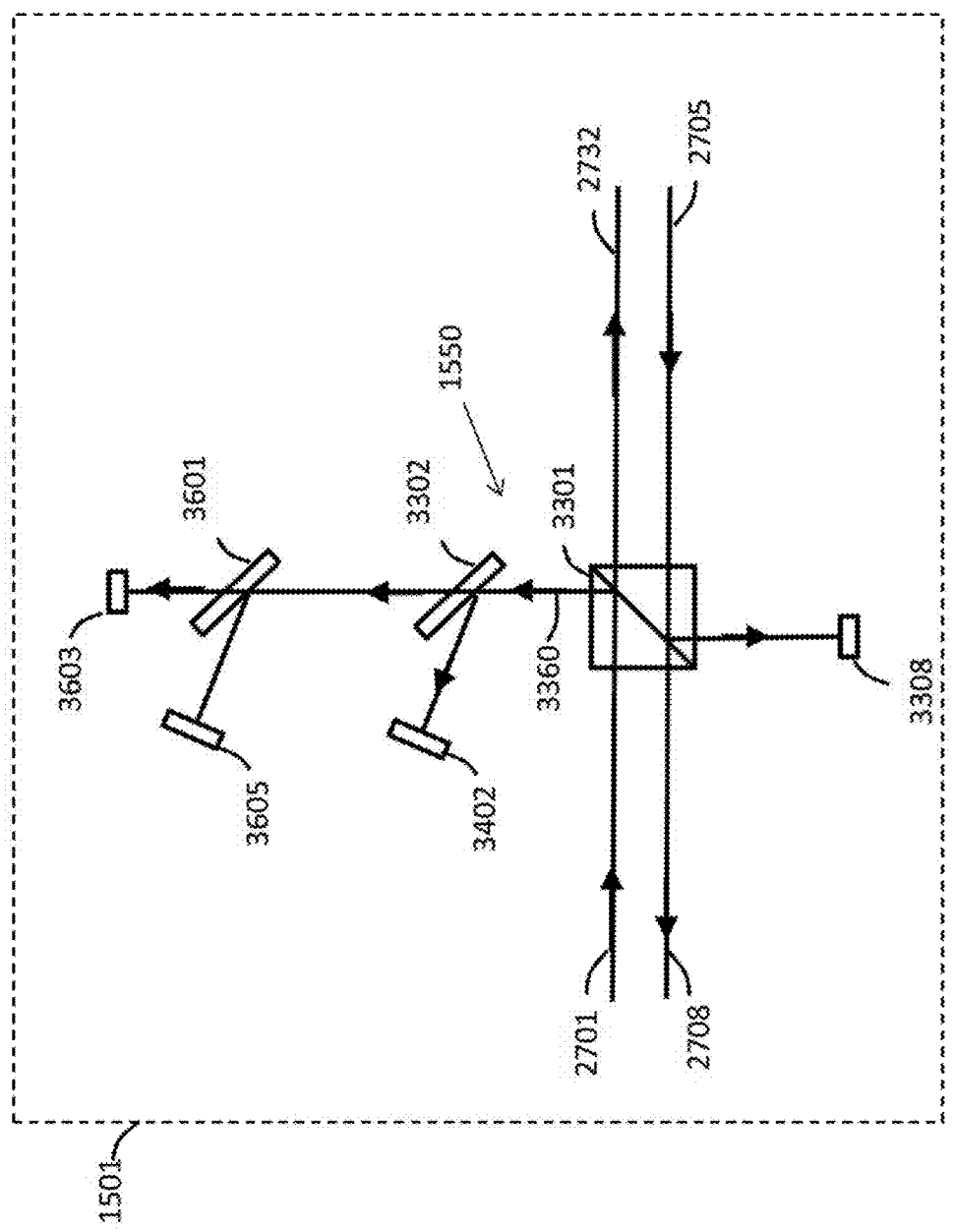
Figure 37:
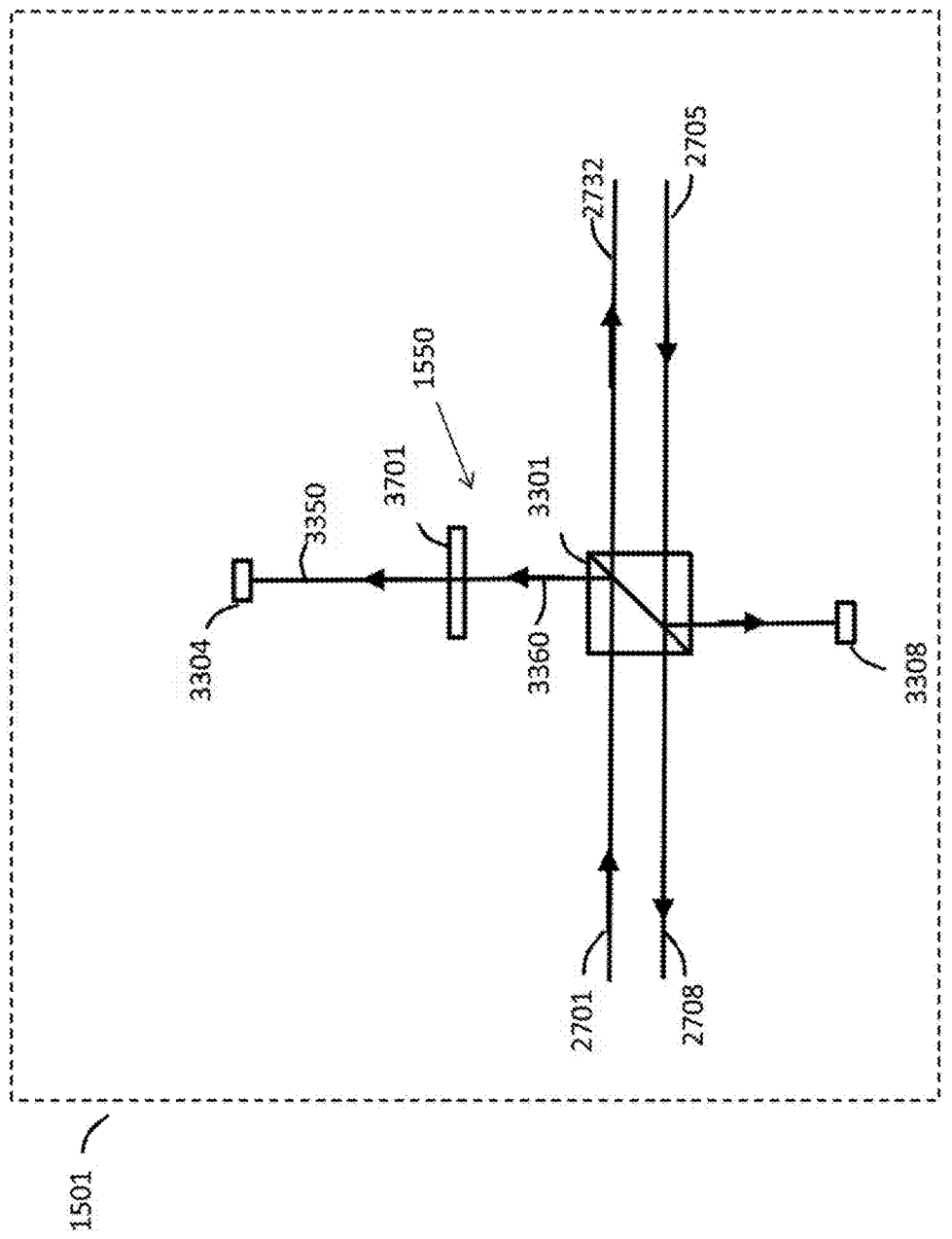

The velocity compensated frequency sweeping interferometer, as described herein, may comprise an outgoing frequency indicator 1501 as shown in FIG. 15. The outgoing frequency indicator is an exemplary embodiment of an outgoing frequency measurement device 1550. The frequency indicator may consist of a non-polarizing beam splitter 3301, a Bragg reflector 3302, and sensors 3304 as shown in FIG. 33. The non-polarizing beam splitter produces an outgoing frequency measurement 3360 from the input beam 2701. The frequency measurement beam 3360 hits the Bragg Grating at a specific angle such that a frequency indicator beam 3350, at a predetermined frequency, will be transmitted through the Bragg grating and detected by sensor. Beams at all other frequencies will be reflected and absorbed by optic 3303, such as a beam dump. The signal generated at the sensor will be as shown in FIG. 68 whereas, while the frequency is swept, the sensor will detect light at a given frequency. An alternate configuration is shown in FIG. 34 where a sensor 3402 detects reflected beams and the transmitted beams are absorbed by beam dump 3401. The signal generated at the sensor will be as shown in FIG. 69 whereas, while the frequency is swept, the sensor will detect light at most frequencies and drop out at a select frequency. An alternate configuration shown in FIG. 35 uses only sensors 3304, 3402. The use of two sensors allows for compensation for changes in the intensity of the laser output by using the crossing point of the two sensors as the indicator for the given frequency. An alternate configuration shown in FIG. 36 has an additional Bragg grating 3601 that detects a second frequency using an additional sensor 3605. The remaining transmitted beam is absorbed by beam dump 3603. The combined sensors will generate signals as shown in FIG. 70 when one peak 7001 is generated by sensor 3605 and the other peak 7002 is generated by sensor 3402. In another configuration, an optical filter 3701 will transmit light of a given frequency to the sensor 3303 as shown in FIG. 37. All other frequencies are absorbed by the material or reflected back.

Figure 17:
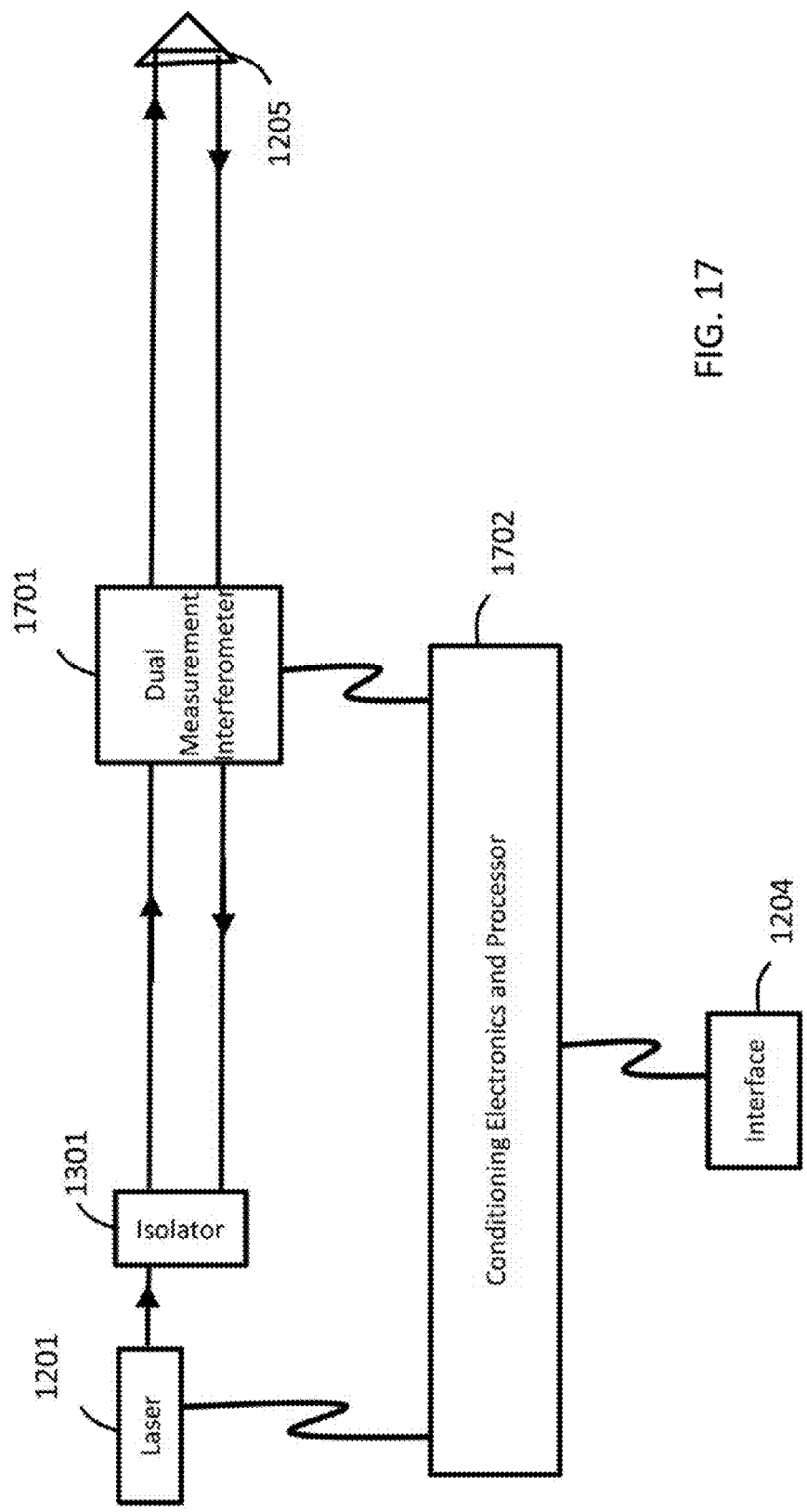

The velocity compensated frequency sweeping interferometer, as described herein, may comprise a dual measurement interferometer 1701 as shown in FIG. 17. The dual measurement interferometer may consist of a Michelson interferometer and a Mach-Zehnder interferometer. FIG. 66 shows the components of the Michelson interferometer of FIG. 28 with the addition of non-polarizing beam splitters 6601, 6602, and 6603 as well as the addition of two additional linear polarizers 6604 and 6607 rotated 45 degrees to the planes of polarization, and an additional ¼ wave plate 6606. Beam dumps 6609 and 6610 absorb unnecessary beams. A beam splitter 6601 is configured between the first or primary beam splitter 2801 and the first reference reflector 2703 and creates a second reference beam 6650. A third beam splitter 6602 is configured between the first beam splitter 2801 and the movable reflective target 1205 to produce a second measurement beam 6660. A second combining optics 6603 that combines the second reference beam 6650 and second measurement beam 6660 into a second interference beam 6670. The second interference beam 6670 impinges on optics 6605 and is converted into electrical signals that are converted into digital values by a digitizing electronic feature. The Michelson interferometer measures this distance to the target as before. The Mach-Zehnder will also measure the distance to the target, but the difference between the reference path and the path to the target will be different, so that when the frequency is changed, the readings will be changed by different amounts. With prior knowledge of the differences in the reference paths, the absolute distance to the target can be computed.

In the opto-electrical configuration of FIG. 33, both the first interferometer and the third interferometer will change during both the frequency sweep and the movement of the reflector, not shown. Taking the difference between the interferometer readings eliminates changes due to target movement providing a path difference that is fixed.

The first advantage of this embodiment is that it can use similar counter logic to that of the first interferometer. A second advantage is that an in-field compensation can be developed for the FSI method where the moveable target is placed at a plurality of known distances and the frequency is swept at each distance. From this information, the frequency sweep compensation can be developed. A third advantage is that the Mach-Zehender can operate as an alternate interferometer In certain applications, the optical path distance can grow quite long with just one interferometer. As the optical path distance increases, a given sweep rate and range will create larger changes in the number of waves for a given period of time. That rate may exceed the capability of the conditioning and digitizing electronics. By providing a second interferometer that can provide an alternate optical path difference that reduces the rate, it minimizes the burden on the conditioning and digitizing electronics.

FIG. 67 shows the third advantage of where an alternate reference path reduces the optical path difference. A line 6701 shows the waves counted for the first interferometer where the reference path is 0.1 meters and the measurement path is 10 meters, which means that the optical path distance is 9.9 meters. If the wavelength is changed from 633 nm to 631 nm 6703, approximately 100,000 waves are counted. Over a period of 0.025 seconds 6704, this implies that the electronics must be capable of counting at a rate of 4,000,000 counts per second. However, if the second reference in one embodiment is 9 meters, the optical path difference is now 1 meter and produces the line 6702, where the waves only change by approximately 10,000 counts over the same frequency sweep range and time.

Figure 16:
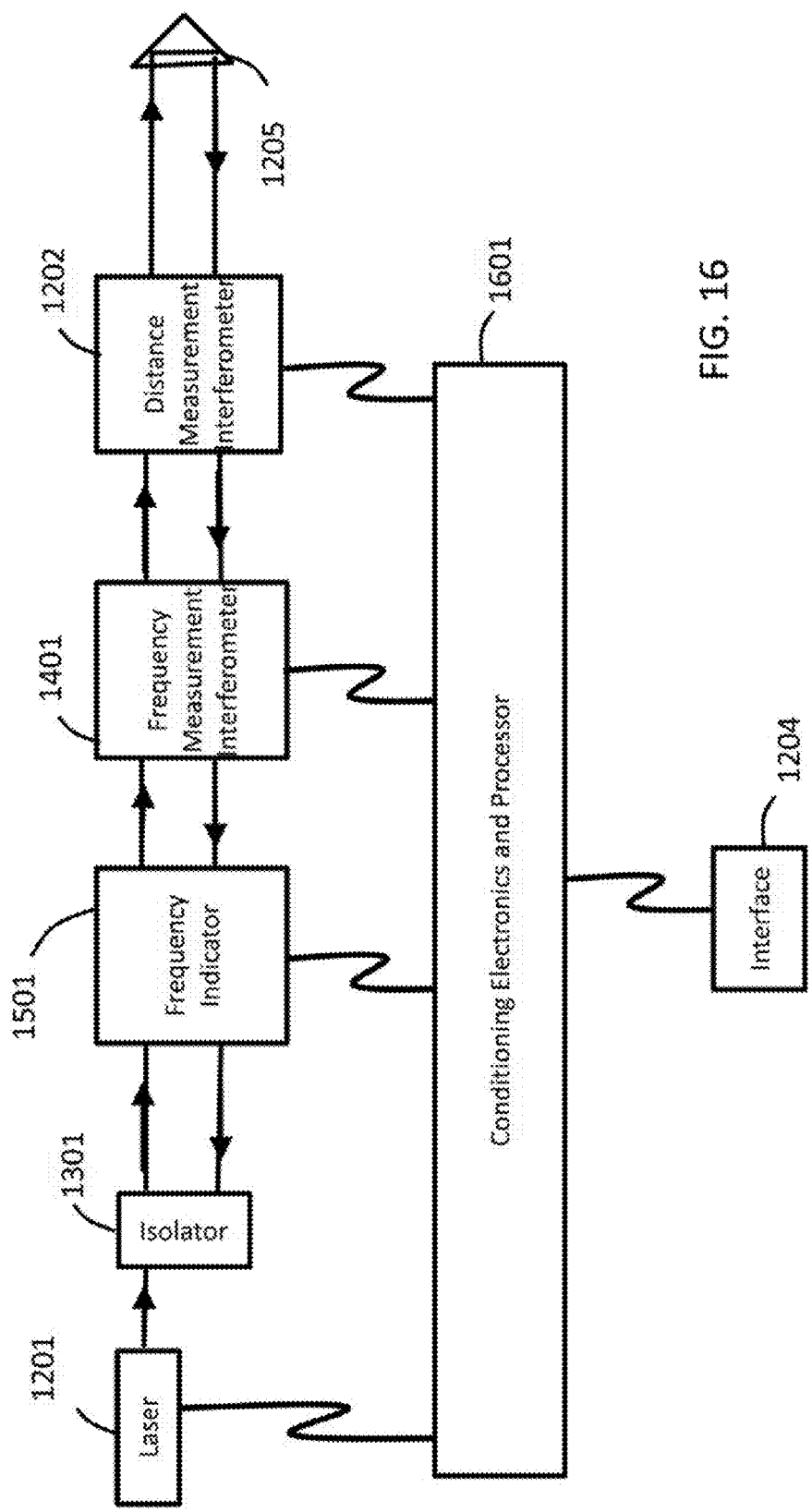

The velocity compensated frequency sweeping interferometer, as described herein, may comprise a distance interferometer combined with a frequency indicator and a frequency measurement interferometer as shown in FIG. 16.

Figure 18:
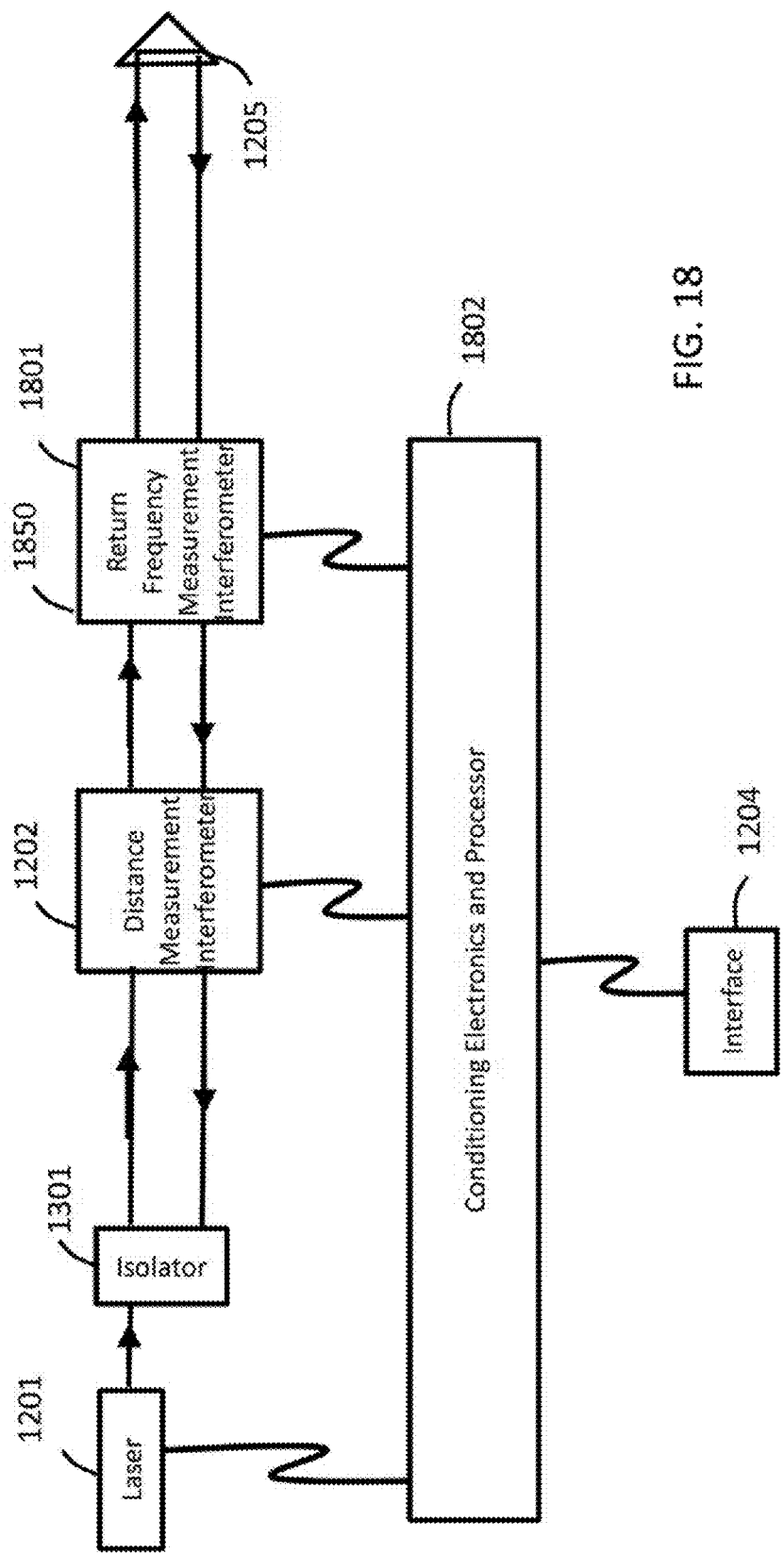

The velocity compensated frequency sweeping interferometer, as described herein, may comprise a distance interferometer combined with a return frequency measurement interferometer 1801 as shown in FIG. 18, which is used to overcome FSI errors introduced by a moving target. A return frequency measurement device 1850 may comprise any suitable configuration of optics and sensors to measure the frequency of the return beam. The error is the ratio of the change in waves from the frequency sweep to the change in waves from the target movement multiplied by the actual change in position of the target. The error is the ratio can be determined by the following equation:

$$\Delta L \frac{\Delta N_{Sweep}}{\Delta N_{Movement}} \qquad (7)$$

A moving target will create a Doppler shift in light frequency as determined by the following equation:

$$f_{Light} \frac{c}{c + v_{Target}} \quad (8)$$

Therefore, measuring the frequency of the light reflected back from the target and comparing to the frequency of the outgoing beam which will not experience Doppler shift, will provide a mechanism for determining if the target moves during frequency scanning. The velocity of the moving target can be determined by the following equation:

$$c\left(\frac{f_{Outgoing}}{f_{Return}} - 1\right) \quad (9)$$

With the velocity information and the elapsed time of the frequency sweep (either known or measured), the change in position of the target ($\Delta L$) can be calculated. From this, the number of waves from target movement can be calculated, and the errors related to target movement can be compensated.

Figure 38:
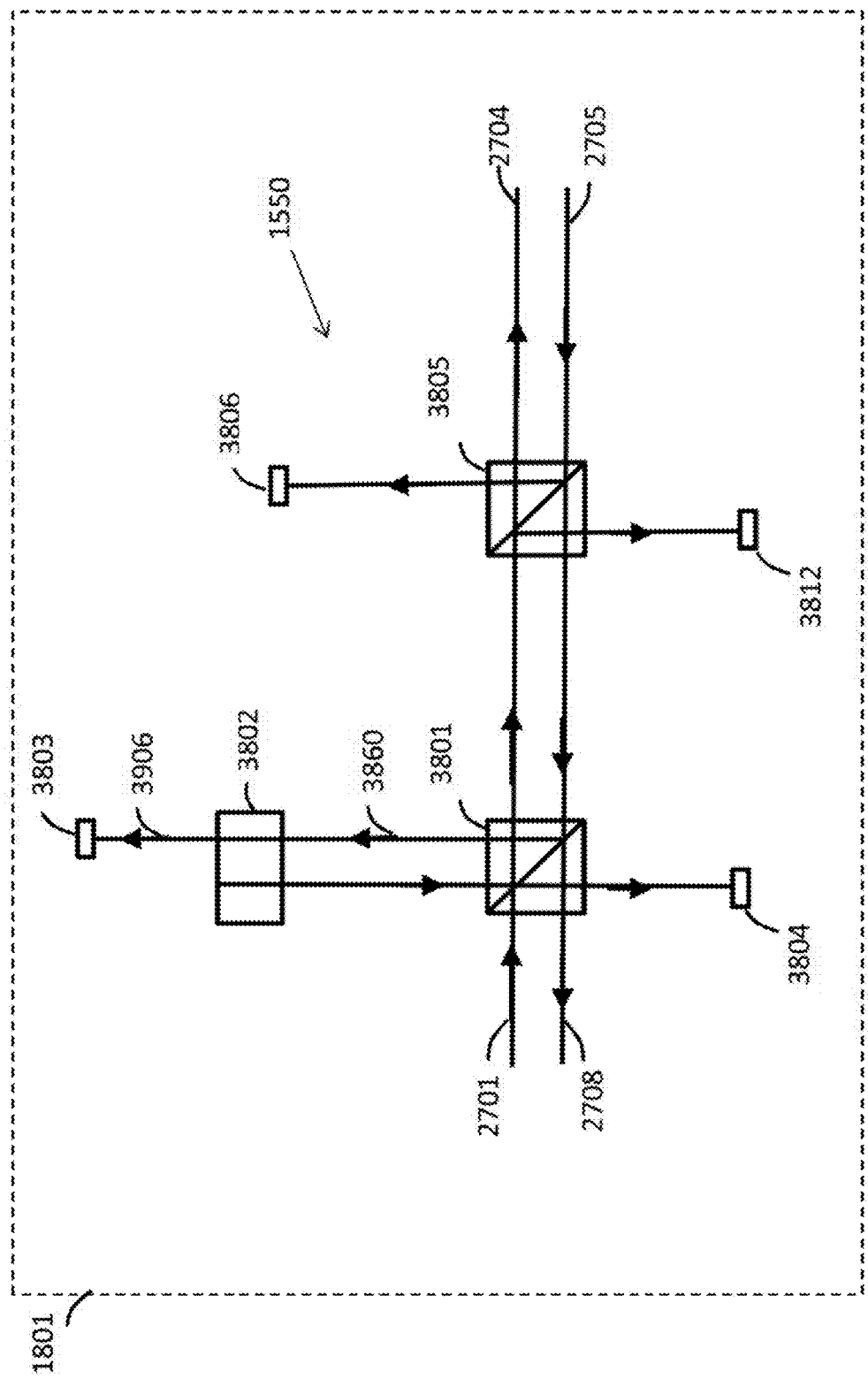
Figure 39:
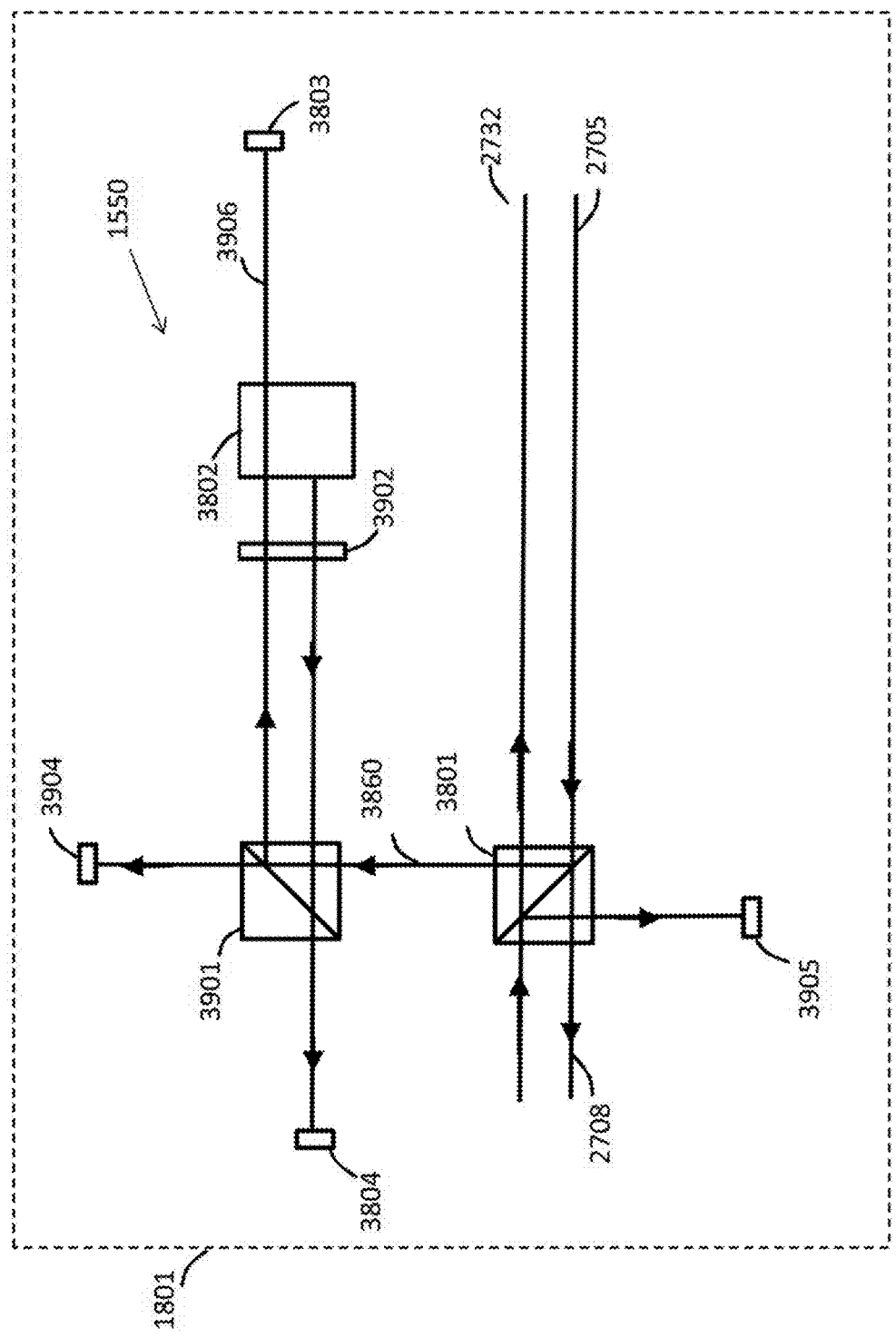
Figure 40:
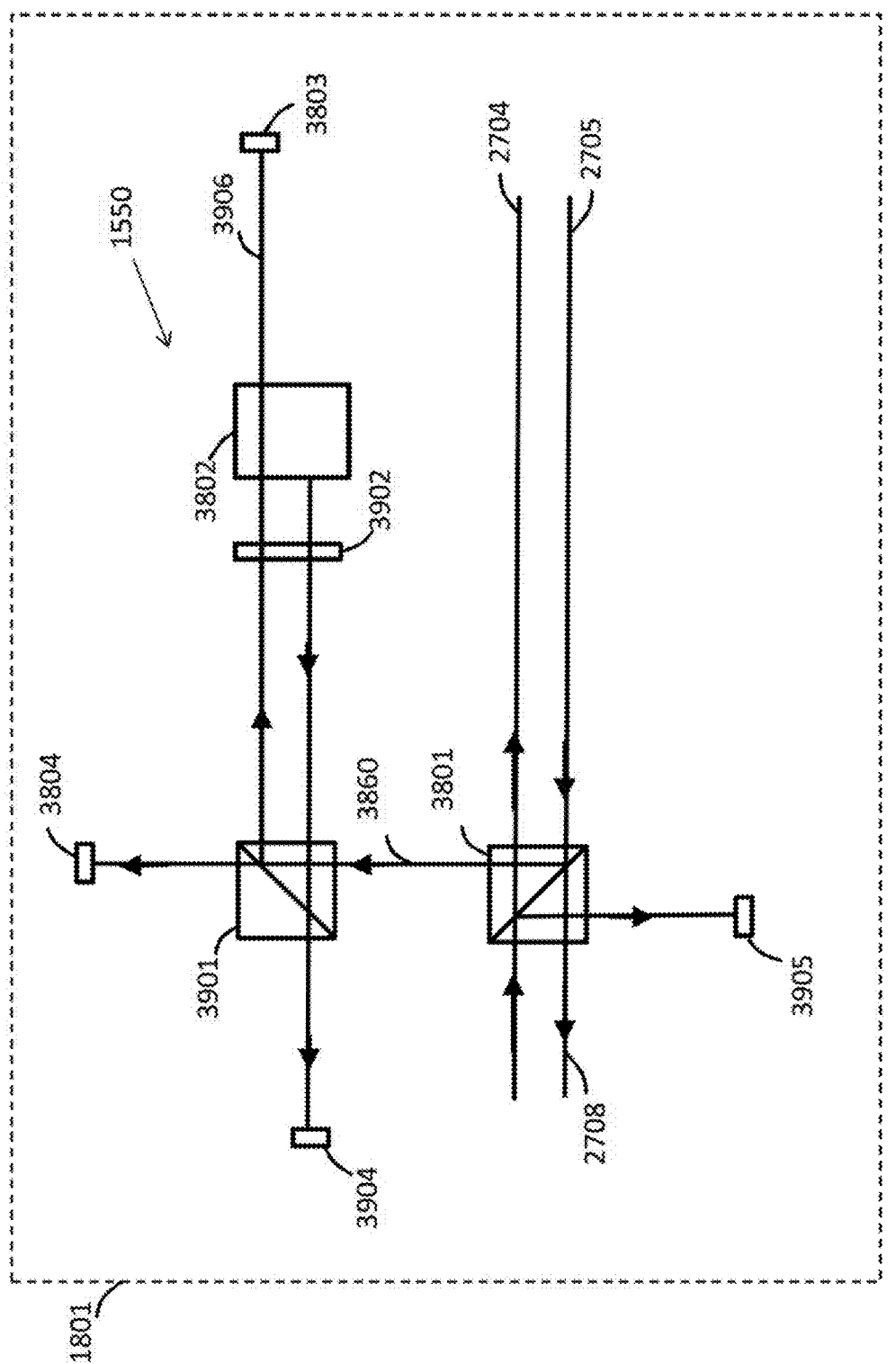
Figure 41:
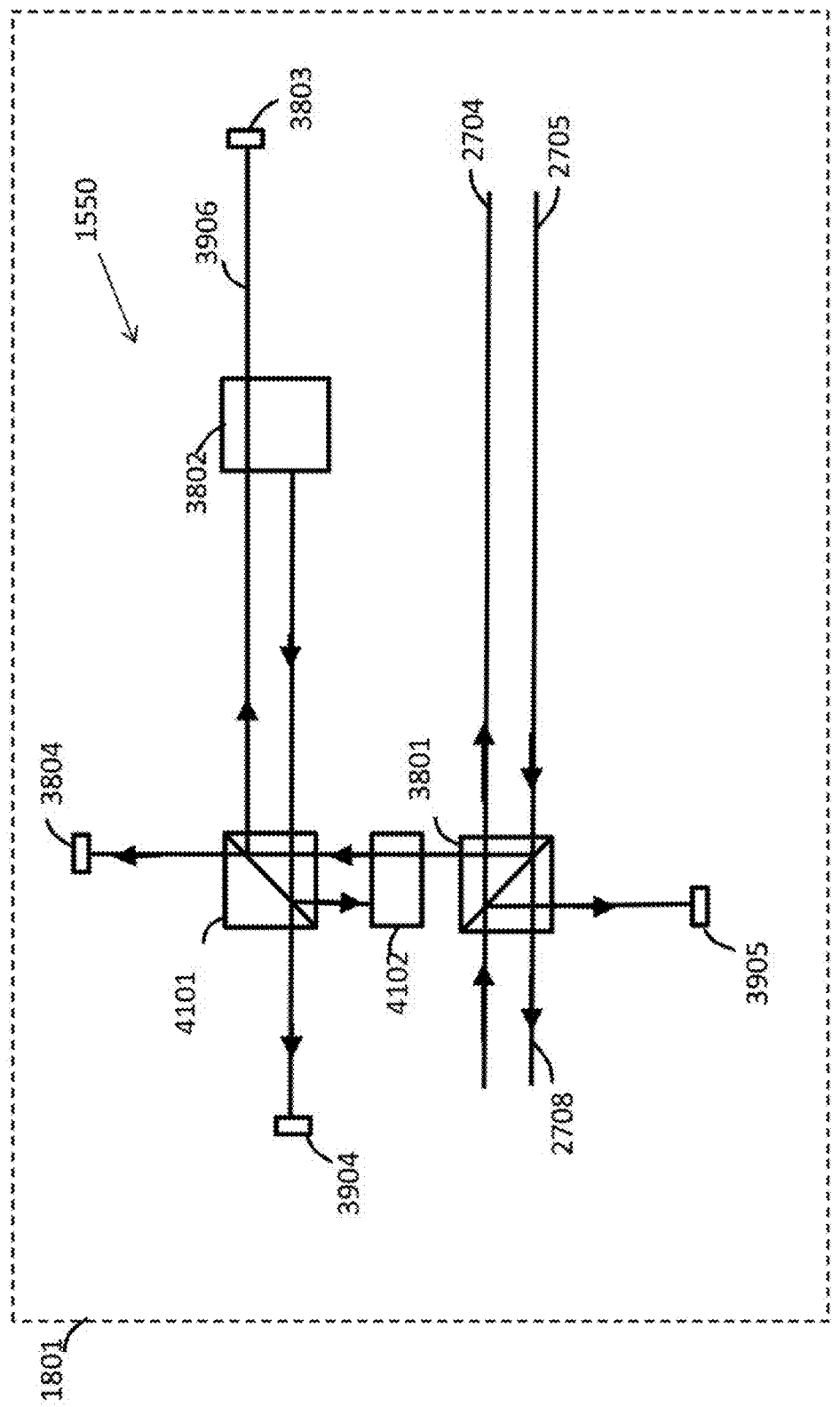

An exemplary return frequency interferometer 1801 is shown in FIG. 38 A non-polarizing beam splitter 3805 sends part of the light from return beam 2705 to sensor 3806, which provides return intensity information to normalize the readings. Another beam splitter 3801 produces a return frequency measurement beam 3860 that is directed to an etalon 3802 creating a Fabry-Perot interferometer. A return frequency interference beam 3906 passing through the etalon is measured by a sensor 3803. Beam dumps 3804, 3812 absorb unused beams. An alternate embodiment is shown in FIG. 39 that uses polarizing beam splitter 3901. The readings from sensor 3904 normalize for changes in the return intensity. The ¼ wave plate reverses the plane of polarization such that the beam passes back through the polarizing beam splitter to be absorbed by beam dump 3804. An alternate embodiment is shown in FIG. 40 that switch the placement of the sensor and the beam dump. An alternate embodiment shown in FIG. 41 uses a non-polarizing beam splitter 4101. An isolator 4102 absorbs the beam reflected back from the etalon.

Figure 19:
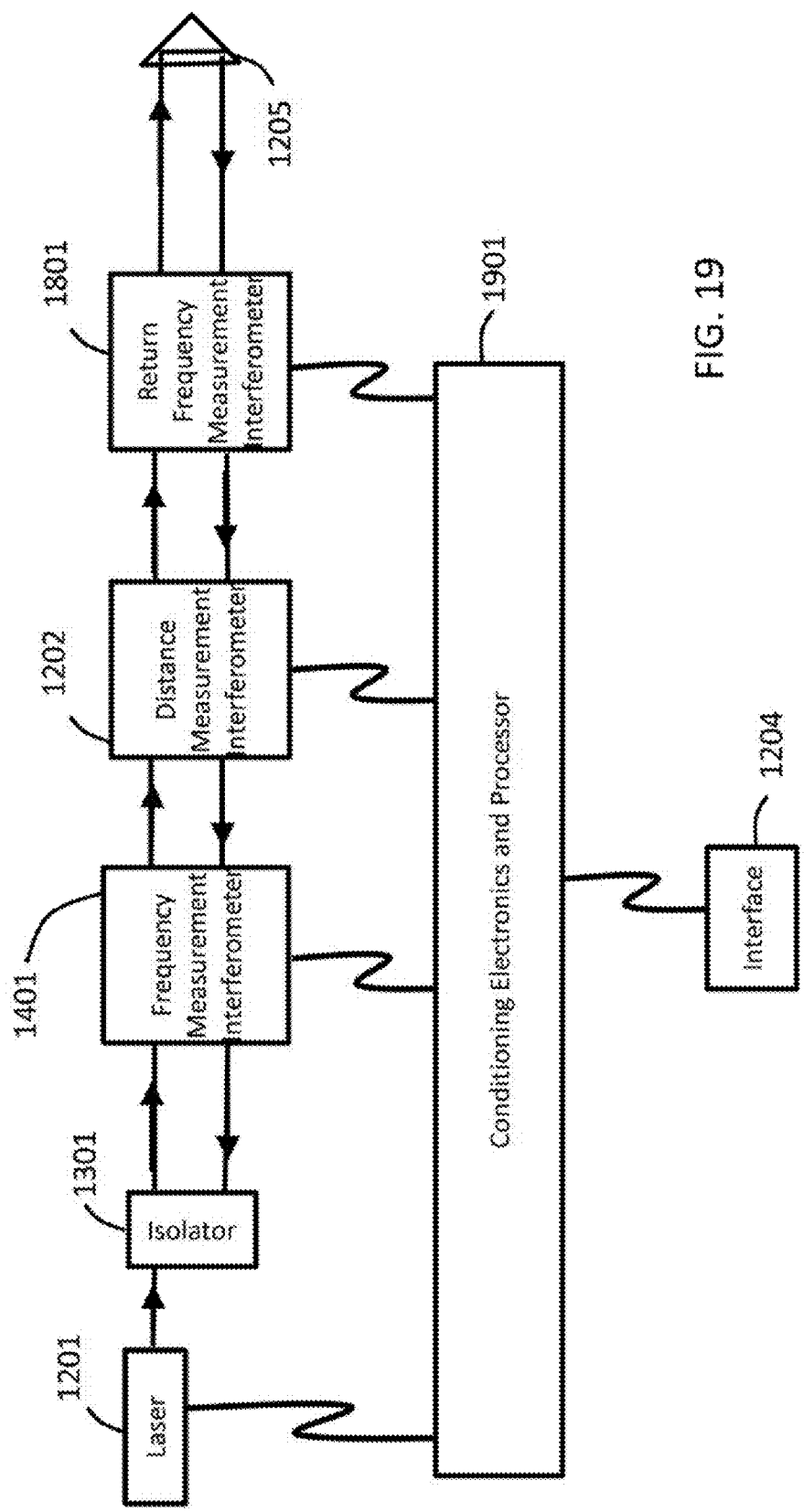

The velocity compensated frequency sweeping interferometer, as described herein, may comprise a frequency measurement interferometer and a return frequency measurement interferometer as shown in FIG. 19.

Figure 20:
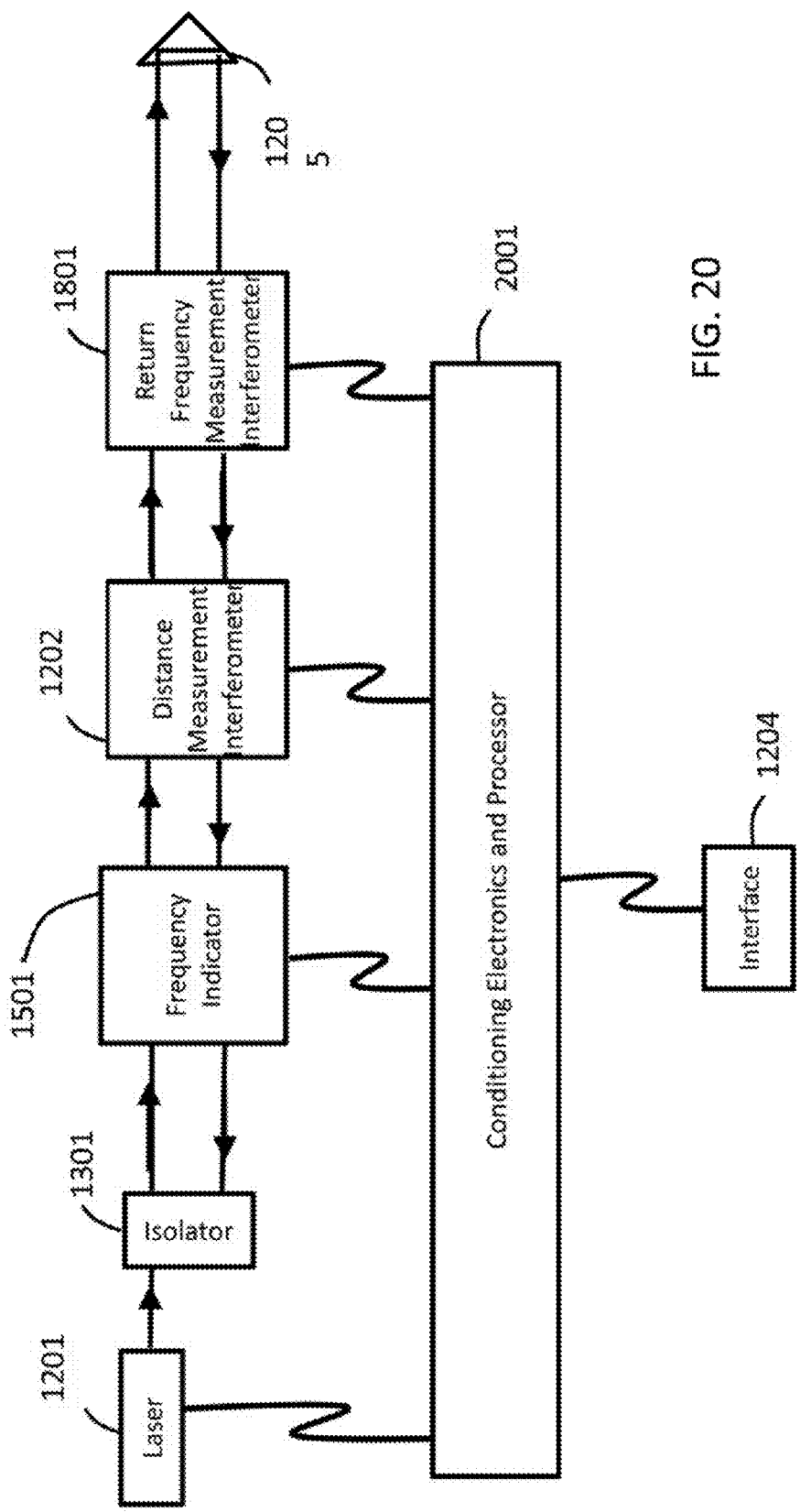

The velocity compensated frequency sweeping interferometer, as described herein, may comprise a frequency indicator and a return frequency measurement interferometer as shown in FIG. 20.

Figure 21:
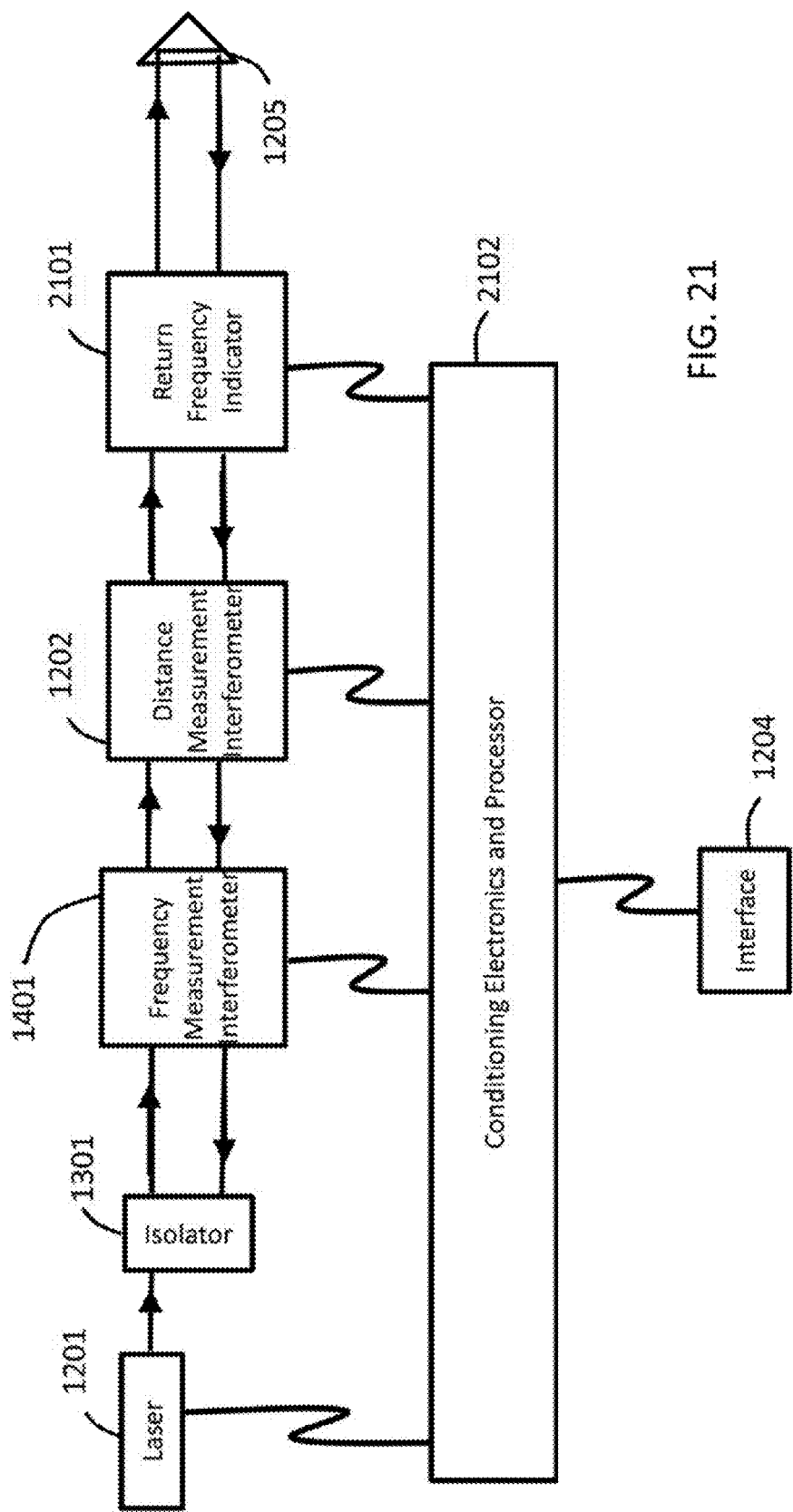
Figure 22:
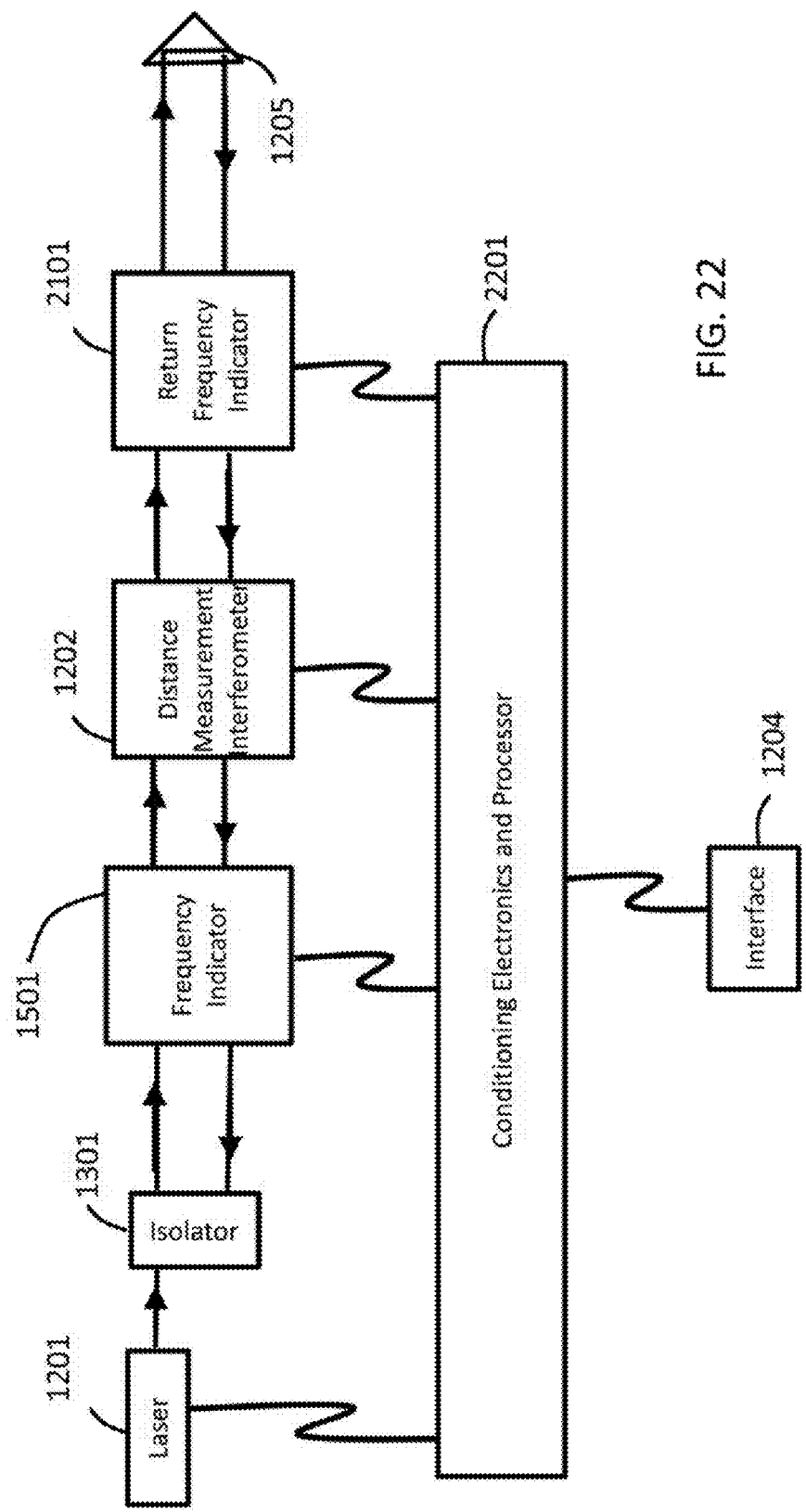
Figure 23:
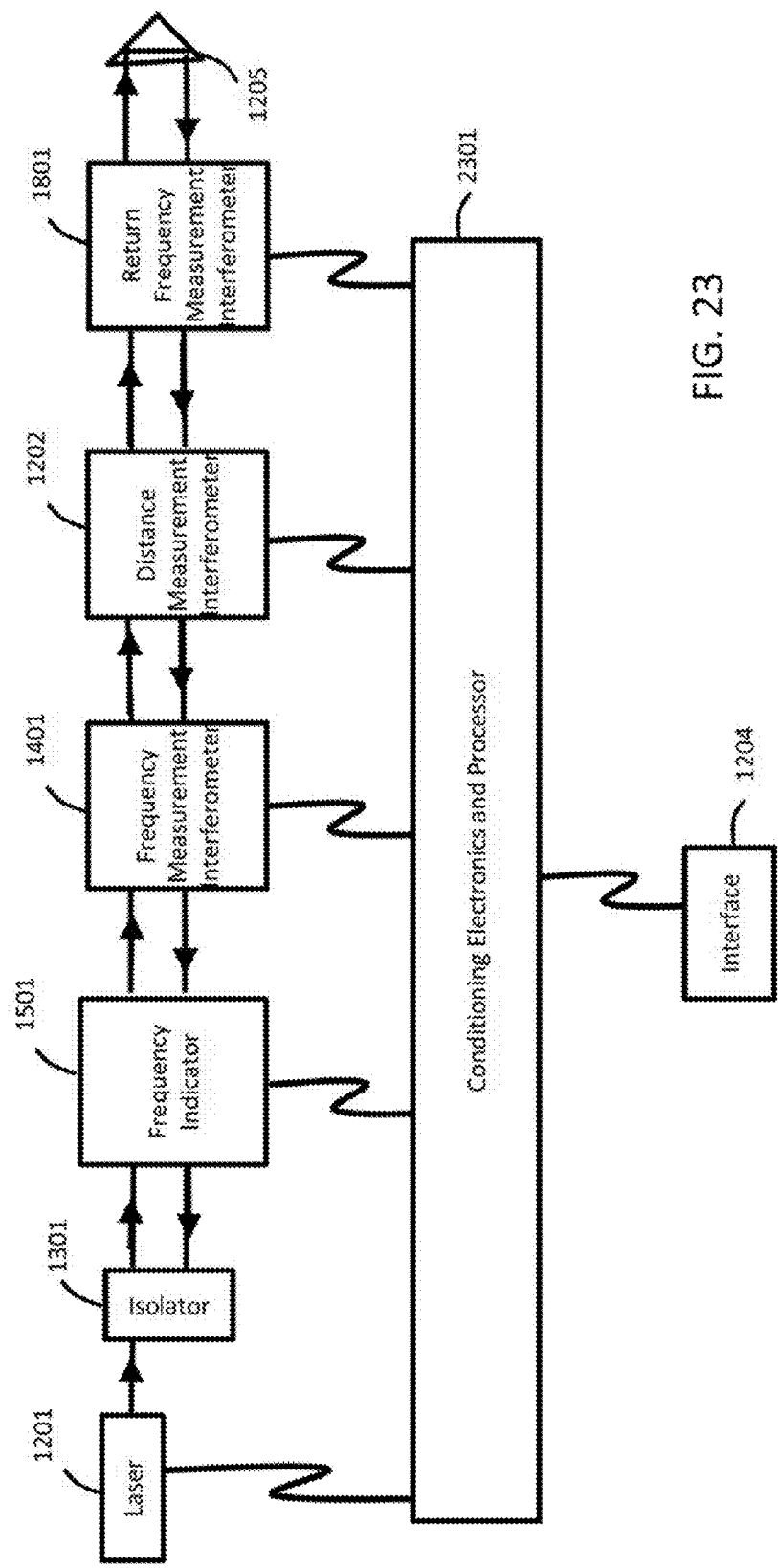
Figure 24:
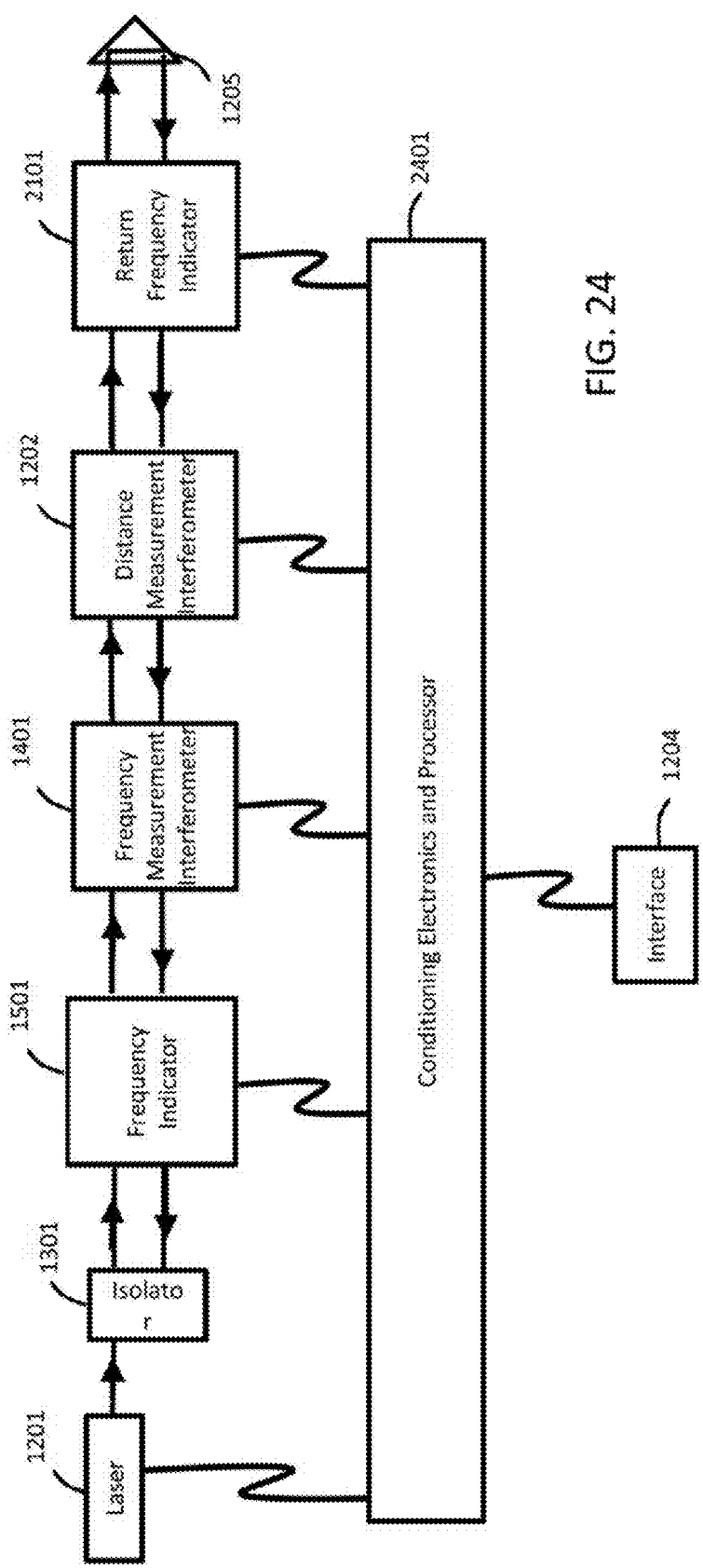
Figure 25:
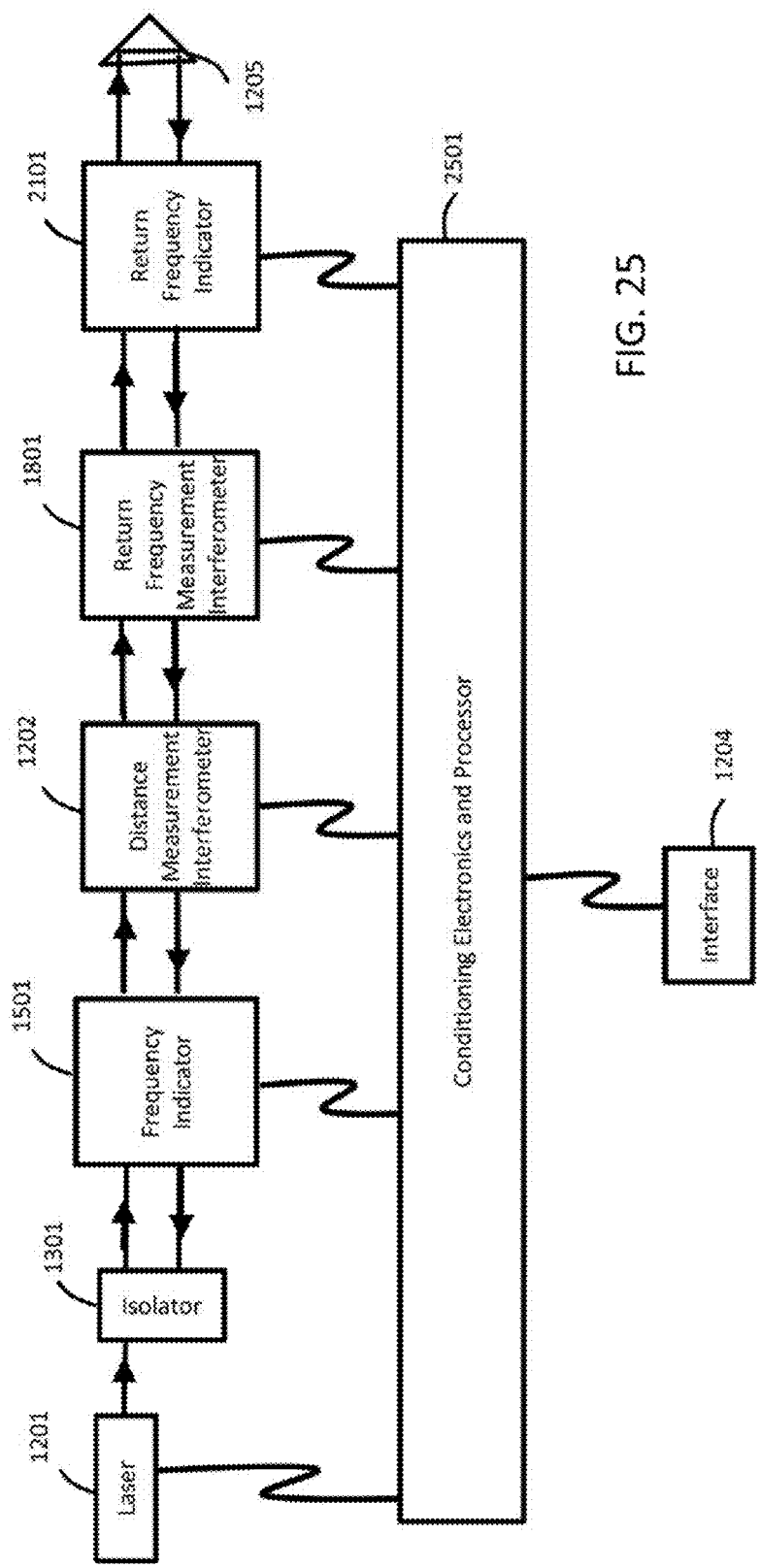
Figure 26:
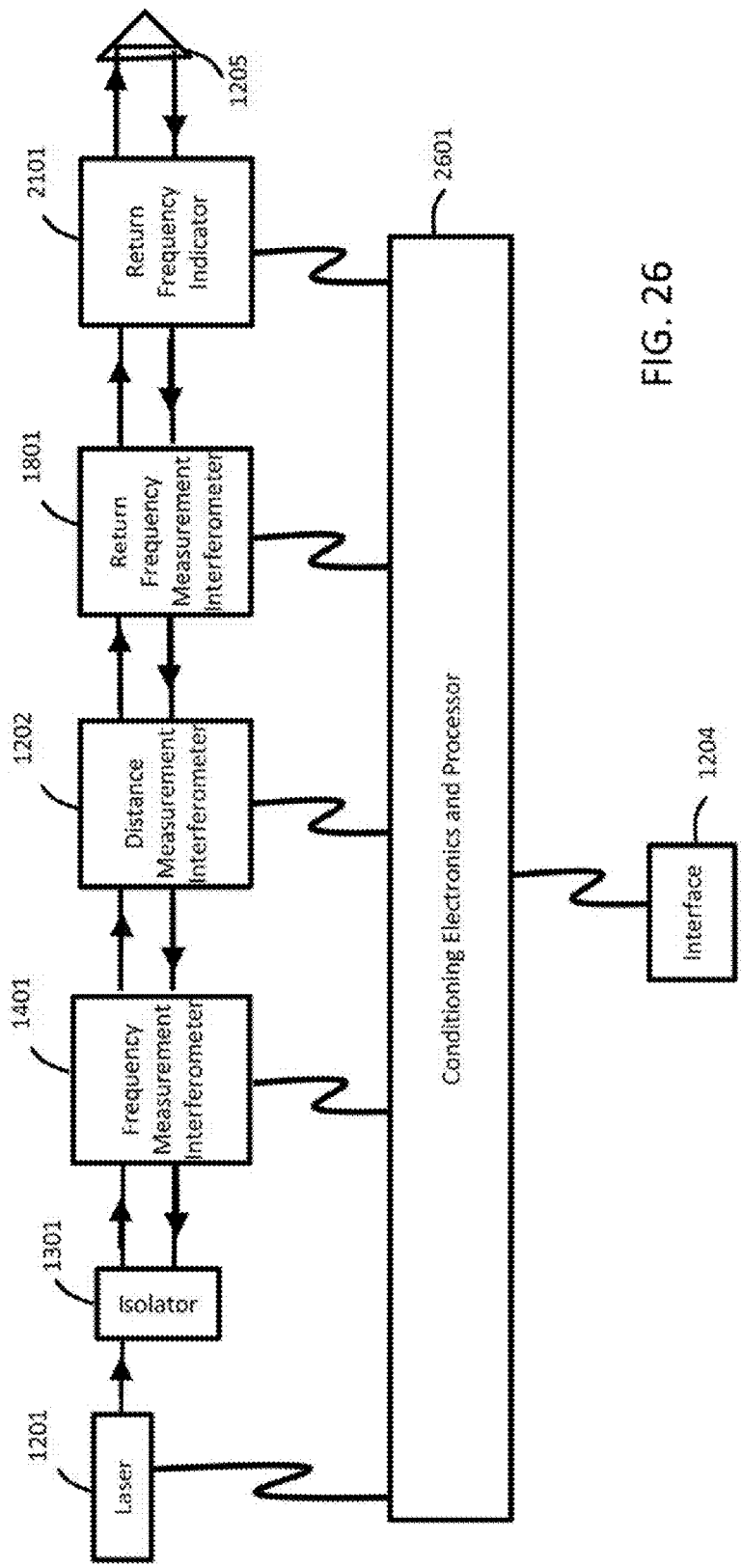
Figure 42:
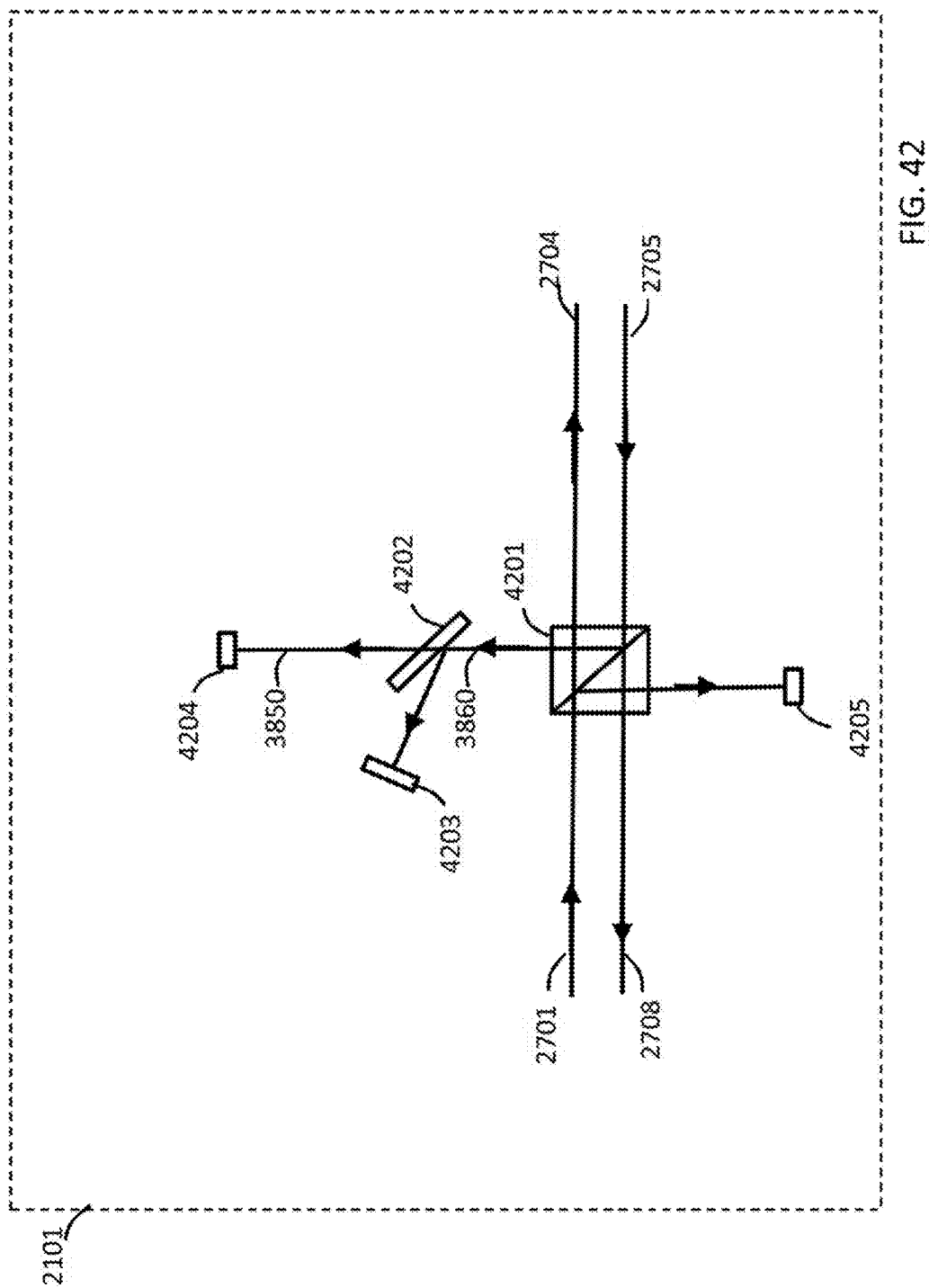
Figure 43:
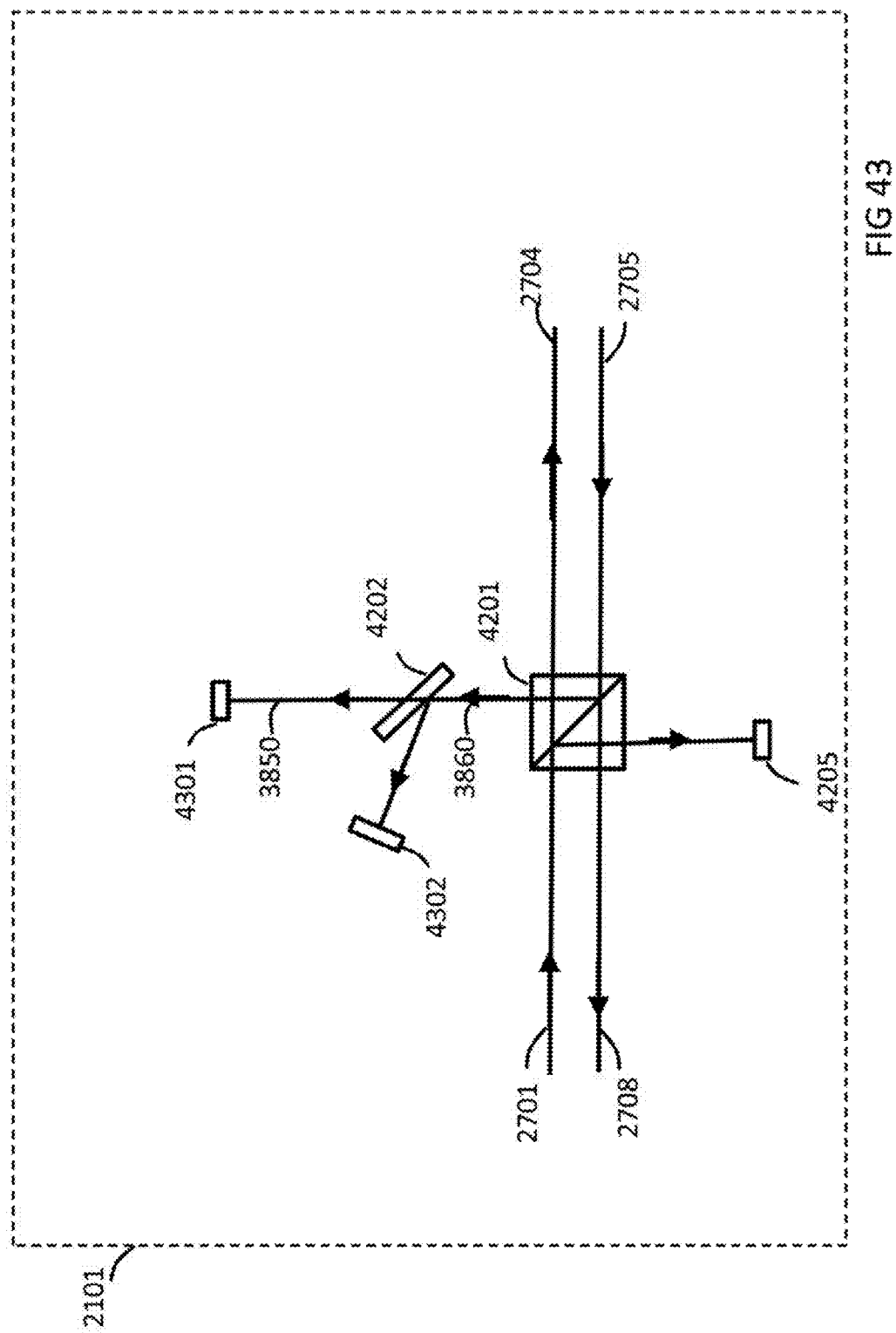
Figure 44:
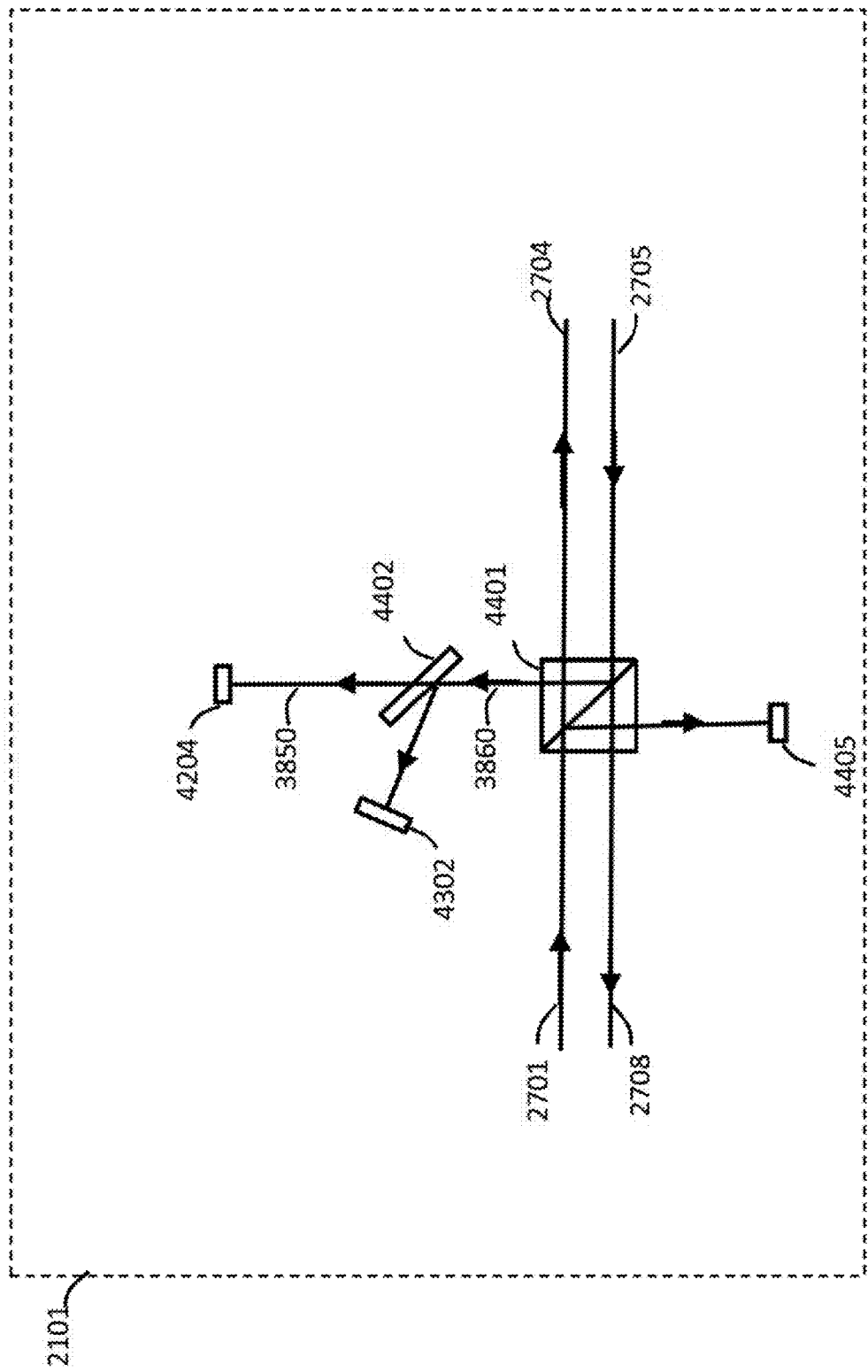
Figure 45:
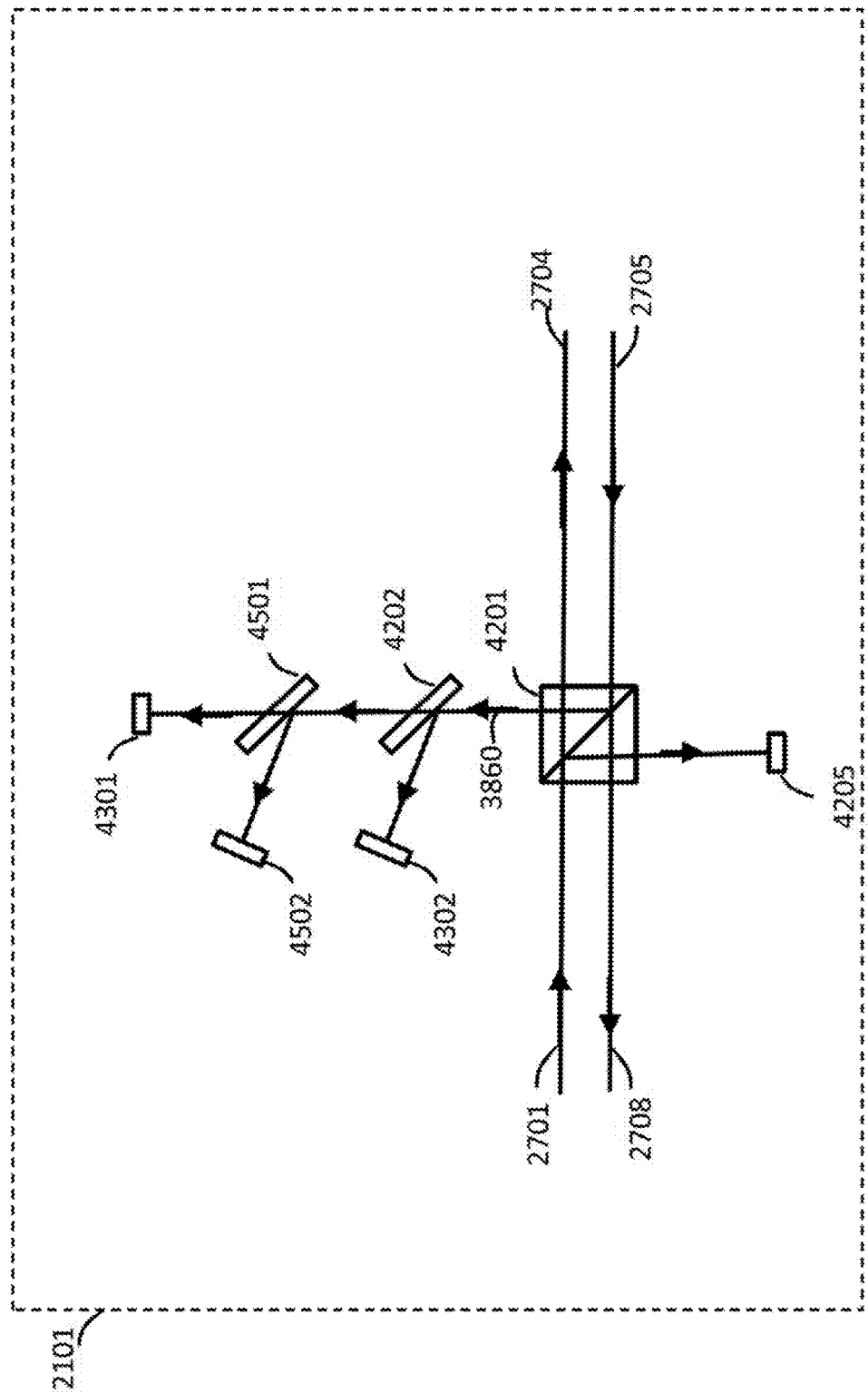
Figure 46:
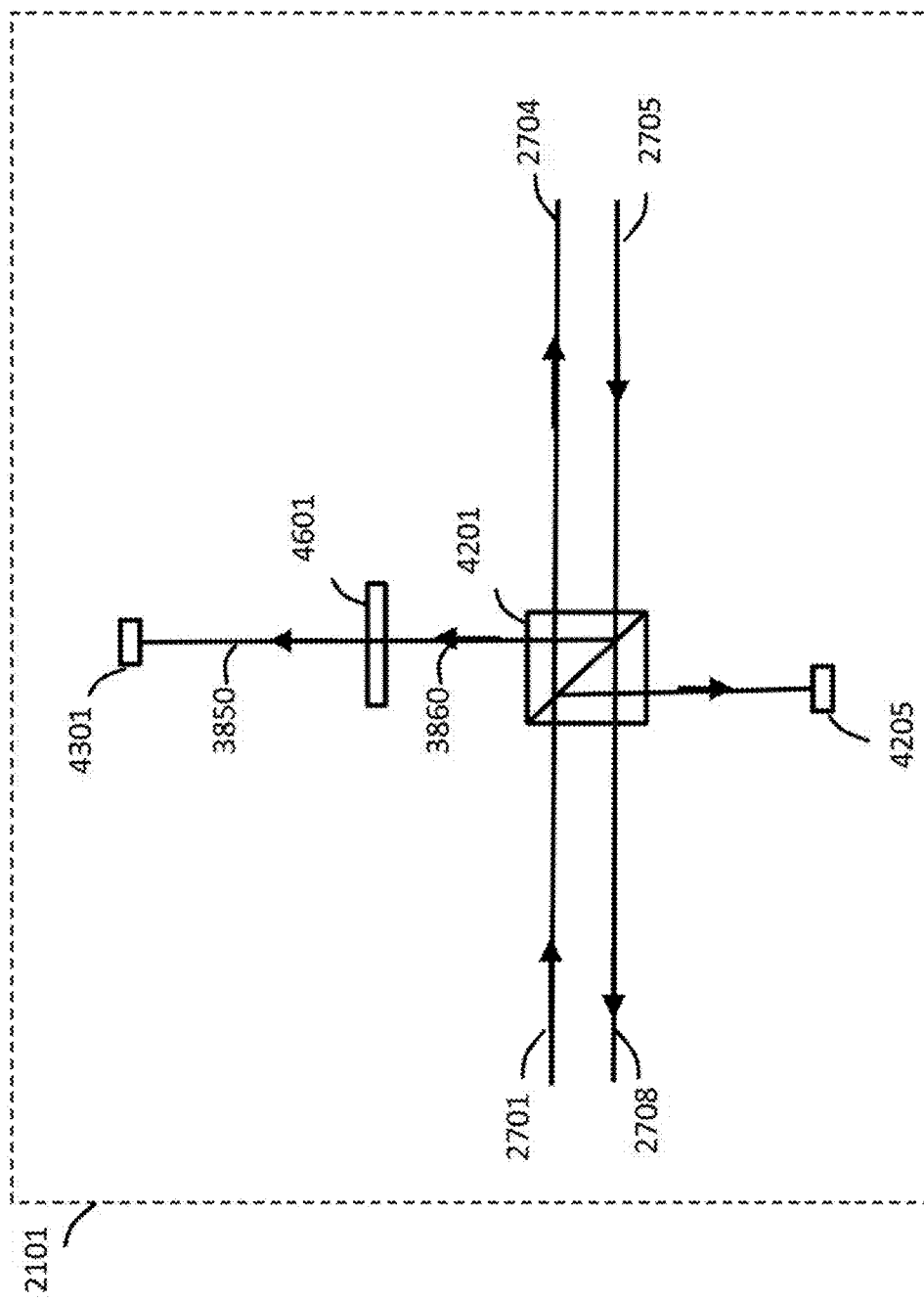

The velocity compensated frequency sweeping interferometer, as described herein, may comprise a frequency measurement interferometer and a return frequency indicator as shown in FIG. 21. The return frequency indicator serves a similar purpose as the return frequency interferometer, which is to determine target movement during a frequency sweep. An exemplary return frequency indicator is shown in FIG. 42. A non-polarizing beam splitter 4201 splits a portion of the return beam 2705 and sends it to Bragg reflector 4202. A sensor 4204 measures the intensity of light that passes through the Bragg reflector at a specific frequency while the beam dumps 4203, 4205 absorb unused beams. An alternate configuration is shown in FIG. 43 where a sensor 4302 detects reflected beams and the transmitted beams are absorbed by beam dump 4301. An alternate configuration shown in FIG. 43 uses only two sensors 4204, 4302. The concepts for these are similar to those of the frequency indicator. An alternate configuration shown in FIG. 45 has an additional Bragg grating 4501 that detects a second frequency using an additional sensor 4502. The remaining transmitted beam is absorbed by beam dump 4301. In another configuration shown in FIG. 46, an optical filter 4601 will transmit light of a given frequency to the sensor 4301. All other frequencies are absorbed by the material or reflected back.

FIG. 71 shows the measured waves for an embodiment of the device with a variable scan rate. The device scans to a first wavelength 7101 over a long enough time to ensure that the change in wavelength rate will not exceed the capability of the electronics. After the first scan, the rate of change can be analyzed and then the rate can be increased to a rate shown by line 7102 so that the scan can be completed to the final wavelength 7103.

FIG. 72 shows the measured waves for an embodiment of the device with a variable sweep range. In this embodiment, the desired number of measured waves 7200 is selected in advance. The device scans until the desired number of waves is counted and then the measured wavelength 7201 at that location is recorded. At that point, it calculates the optical path difference using equation 2 where $\lambda_1$ is the initial wavelength, $\lambda_2$ is the measured final wavelength and $\Delta N$ is the predetermined number of waves for the frequency sweep.

The velocity compensated frequency sweeping interferometer, as described herein, may comprise a means for compensating for a difference in a refractive index of air in determine a measured distance, which changes the wavelength of light. The wavelength is then derived from the equation:

$$\lambda_{vacuum} = \frac{c}{f} \quad (10)$$

Where c is the defined constant for the speed of light in a vacuum and f is the frequency of the coherent light. The wavelength of light is compensated for the index of refraction using the following equation:

$$\lambda = \frac{\lambda_{vacuum}}{n_{air}} \quad (11)$$

The wavelength used to convert a measured number of waves to a more useful unit of measure such as meters or feet is $\lambda$. The value $n_{air}$ is calculated from the Edlèn or Ciddor equations which are known to those skilled in the art. The variables in this equation can be fixed based on a priori knowledge of the measurement environment, provided by a user of the system, or measured. These variables include, but are not limited to, air temperature, air pressure, water vapor pressure, $CO_2$ concentration, and the vacuum wavelength.

FIG. 73 is an embodiment of the invention where the processor 4705, with the capability of adjusting the wavelength for the index of refraction, is connected to interface 1204 and conditioning and digitizing electronics. An air sensor 7302, pressure sensor 7303, and humidity sensor 7304 are connected to the electronics whose readings are used to calculate the change in wavelength.

The velocity compensated frequency sweeping interferometer, as described herein, may comprise one or more sensors to measure a temperature of one or more components of the system and compensate for mechanical changes due to temperature that may create optical path differences not related to movement of a target. FIG. 74 is another embodiment of the device that uses sensors to measure the temperature of components in the system and compensate for optical path changes related to temperature based mechanical changes and not movement of the target. The processor 4705 is coupled with digitizing and conditioning electronics 7401 and temperature sensors. Temperature sensor 7402 is attached to beam splitter 2801 to measure its temperature. Temperature sensor 7403 is attached to coherent light source 1201 to measure its temperature. The error compensation routines due to temperature are determined through experimentation and are fixed in the processor and then executed when a new temperature is read. The optical path difference errors are then calculated as follows:

$$OPD_{Err} = OPD_{ErrB}(t_1) + OPD_{ErrL}(t_2) \quad (12)$$

$OPD_{Err}$ is the total error in the optical path difference. $OPD_{ErrB}(t_1)$ is the error from the based on the temperature of the beam splitter and $OPD_{ErrL}(t_2)$ is the error from the based on the temperature of the coherent light source.

FIG. 75 is another embodiment that shows the single measurement light producing device 1201 coupled to a moveable platform 7500. A motor and control electronics 7501 drive the platform around a horizontal axis 7502. The beam can then be directed in a single degree of freedom.

FIG. 76 is another embodiment that shows the single measurement light producing device 1201 coupled to a moveable platform 7500. This moveable platform 7500 has two degrees of freedom, rotation about the horizontal axis 7502 and rotation about vertical axis 7601. An azimuth motor and control electronics 7600 drive the platform around a vertical axis 7601. The beam can then be directed in two degrees of freedom. Those skilled in the art will appreciate that alternate designs will allow translational rather than angular movement.

FIG. 77 is another embodiment that uses a mirror 7700 to direct the beam. A motor and control electronics 7701 drive the platform 7500 and mirror coupled thereto around a horizontal axis 7702 to create a beam steering feature 7750. Base 7703 houses optics and/or the single measurement light producing device 1201 to point the beam at the mirror. The beam can then be directed in a single degree of freedom.

FIG. 78 is another embodiment that adds a second degree of freedom. Base 7800 houses the optics and/or the single measurement light producing device 1201 to point the beam at the mirror 7700. An azimuth motor and control electronics, configured in the base 7800, drive the platform around a vertical axis (7801). The beam can then be directed in two degrees of freedom.

In another embodiment, a position sensing device is added that measures the horizontal and vertical translation of the target. FIG. 79 is an exemplary dual mode interferometer with the addition of a beam splitter 7901 configured in the path of the return beam 2705 from the moveable reflective target 1205 that creates a positioning beam 7955. The positioning beam is directed to a position sensing device 7902. The unused beam 7965 is absorbed by beam dump 7903 in this exemplary embodiment. The position sensing device provides a transverse position of the moveable target with respect to the measurement beam path.

DEFINITIONS

Sub-system, as used herein, refers to various components that are utilized in the frequency sweeping interferometer described herein and includes but is not limited to: tunable laser, frequency indicator, isolator, frequency measurement interferometer, interface, distance measurement interferometer, return frequency measurement interferometer, return frequency indicator, measure target, condition electronics and processor, digitizing electronic or device, and the like.

Primary beam splitter, as used herein is the beam splitter that splits the single light beam into a measurement beam and a reference beam for the purpose of distance measurement to the moveable reflective target.

Beam, as used herein, is light traveling in a single direction.

Fixed light beam, as used herein, is a light beam having a fixed or substantially non-changing frequency.

Scanning wavelength light beam, as used herein, is a light beam that has a changing frequency, such as a light beam that is changed at a source by varying a parameter in the laser.

Optics, as used herein, refers to components that change a property of light including, but not limited to, direction, phase, polarity, intensity and splits and/or combines a beam of light. An optic may comprise one or a plurality of individual optical components.

Splitter, as used herein, is an optics that splits a beam into two or more individual light beams.

Bragg Reflector, as used herein, refers to a type of optic that will reflect light of a particular wavelength and transmit light of a particular wavelength based on the angle of incidence of light on the reflector.

Unused Beams, as used herein, refers to beams created by optical components that are not measured and may or may not be adsorbed.

Interference Beam, as used herein, refers to a beam that is the result of two beams being combined.

Interference beam optics, as used herein, is an optic component that combines a measurement beam with a reference beam.

Isolator, as used herein, refers to an optic component that allows light to pass through in only one direction.

Quarter Wave Plate, as used herein, refers to an optic component that changes polarity of light by a quarter wave.

Beam Dump, as used herein, refers to an optic component that adsorbs unused beams and does not reflect incident light.

Non-polarizing Beam Splitter, as used herein, refers to an optic component that receives a beam of light and splits it into two beams of light.

Polarizing Beam Splitter, as used herein, refers to an optic component that receives a beam of light and reflects a light beam of one polarization and transmits a light beam of an opposing polarization to the reflected light beam. The reflected beam is 90 degrees out of phase to the transmitted beam.

Opto-electronic component, as used herein, refers to a component that converts a component of light into an electrical signal, including intensity, for example.

Photodiode, as used herein, refer to an opto-electronic device that converts light intensity to an electrical signal.

The phrase, "from source", as used herein, refers to a beam that is emitted from the light source that may or may not be modified by any upstream optics and will ultimately be directed to a measure target.

The phrase, "to source", as used herein, refers to a beam that is has been reflected and will travel back to the source if not obstructed.

The phrase, "from target", as used herein, refers to a beam that has been reflected back from a measured target, which may or may not pass through optics before traveling back to the source.

The phrase, "to target", as used herein, refers to a beam that may or may not pass through optics before traveling to a measured target.

A processor coupled to said digitizing electronics feature and said single measurement light producing device may be couple in any suitable way whereby data from the digitizing electronic feature may be received by the processor and said processor can control the single measurement light, such as by instructing a change of frequency of light.

Digitizing electronic feature, as used herein, is a device that converts an electrical signal into a value, such as a numerical value.

Between, as used herein with reference to optics, an optical component or interferometer, means that the component interfaces with a light beam between two other components and may not have to be physically configured between the two other components, whereby a light beam maybe reflected or otherwise directed in any number of directions.

A continuation beam 2732, as described herein, is a beam of light that exiting an optic in the direction of the target.

Single outgoing light beam, as used herein is a beam of light produced by the single measurement light producing device that travels to a moveable reflective target and may pass through one or more optical components. An outgoing frequency measurement device may be configured in the path of the single outgoing light beam to measure the frequency of the beam. A frequency measurement device may be configured before or after the primary beam splitter.

A Fabry-Perot etalon, as used herein is defined as an optical device comprising two parallel reflective mirrors that transmit light only at a set of specific uniformly spaced frequencies.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

REFERENCES

The reference listed below are herein incorporated by reference:

U.S. Pat. No. 4,790,651 Tracking Laser Interferometer, Brown et al.
U.S. Pat. No. 4,714,339 Three and Five Axis Laser Tracking Systems, Hoken et al.
U.S. Pat. No. 3,458,259 Interferometric System, Bailey, et al.
U.S. Pat. No. 3,970,389 Variable Frequency Interferometer, Mendrin et al.
U.S. Pat. No. 4,688,940 Heterodyne Interferometer System, Sommargren et al.
U.S. Pat. No. 5,274,436 Laser Interferometer for Measuring Distance Using a Frequency Difference Between Two Laser Beams, Chaney
U.S. Pat. No. 5,781,295 Interferometer for Absolute Distance Measurement Fuchs et al.
U.S. Pat. No. 7,701,559 ADM Measures Moving Retro Bridges et al.
U.S. Pat. No. 6,847,436 Chopper-Stabilized Absolute Distance Meter, Bridges
U.S. Pat. No. 7,609,387 Method and Measuring Device for Measuring and Absolute Distance, Meir
U.S. Pat. No. 7,538,888 Method for Estimating Absolute Distance of Tracking Laser Interferometer
U.S. Pat. No. 7,292,347 Dual Laser High Precision Interferometer, Tobiason et al.
Dimensional Metrology and Frequency Sweeping Interferometry, Alexandre Cabral, José Manuel Rebordão and Manuel Abreu
High-precision Absolute Distance Measurement using Frequency Scanned Interferometry, Hai-Jun Yang, Jason Deibel, Sven Nyberg, Keith Riles
High-precision absolute laser interferometer distance measurement system, Chen-yang Zhang, Shao-lan Zhu, Hao-dong He, and Bing Li
Laser interferometer for absolute distance measurement based on a tunable VCSEL laser O. Číp, B. Mikel and J. Lazar

What is claimed is:

1. A velocity-compensated frequency sweeping interferometer comprising:
    a) a single measurement light producing device that produces a coherent light source consisting of a single outgoing light beam;
    wherein said single measurement light producing device produces a scanning wavelength light beam;
    b) a first distance measurement interferometer comprising:
        one or more optics;
        whereby said single outgoing light beam is split by a first splitter to produce a first reference beam and a first measurement beam;
        whereby said first reference beam is configured to travel a path of fixed distance to and from a first reference reflector;
        whereby said first measurement beam is configured to travel to a moveable reflective target of unknown distance and reflect back from said moveable reflective target as a return beam;
        whereby said first reference beam and said return beam are combined by an interference optics to produce an interference beam;
    c) one or more optoelectronic components that convert said interference beam into one or more first electrical signals;
    d) a digitizing electronics feature that produces one or more first digital values of said first electrical signals;
    e) a processor coupled to said digitizing electronics feature and said single measurement light producing device;
        whereby said processor receives said one or more of first digital values and calculates a distance to said moveable reflective target;
        whereby said processor sends frequency control instructions to said single measurement light producing device to change the frequency of said scanning wavelength light beam;
        whereby said velocity-compensated frequency sweeping interferometer operates in an absolute distance mode to provide an absolute distance measurement to said moveable reflective target using a frequency scanning interferometer, f) a return frequency measurement device that is a separate device from the first distance measurement interferometer, and comprising:
   one or more optics configured in the path of the return beam to produce a return frequency measurement beam;
   one or more optics configured in the path of said return frequency measurement beam configured to measure a return beam frequency;
   whereby a change in the optical frequency between the single outgoing light beam and the return beam is measured and used to calculate the velocity of the moveable reflective target; and
   whereby said processor compensates for the calculated velocity to the moveable target in the calculated distance to said moveable reflective target.

2. The velocity-compensated frequency sweeping interferometer of claim 1, wherein the return frequency measurement device comprises a return frequency interferometer comprising:
   one or more optics configured in the path of said return frequency measurement beam whereby a return frequency interference beam is created;
   one or more optoelectronic devices that convert said return frequency interference beam into one or more second electrical signals; and
   digitizing electronics that produce second digital values of said second electrical signals.

3. The velocity-compensated frequency sweeping interferometer of claim 2, comprising an algorithm that controls the transition between the absolute distance measurement mode and the relative distance measurement mode as a function of the first electrical signals.

4. The velocity-compensated frequency sweeping interferometer of claim 1, wherein said single measurement light producing device is configured to transition said single light beam between a fixed light beam to a scanning wavelength light beam;
   whereby said velocity-compensated frequency sweeping interferometer operates in a relative distance mode to provide a relative distance measurement using a fixed frequency interferometer,
   whereby said velocity-compensated frequency sweeping interferometer is configured to transition between the absolute distance measurement mode and the relative distance measurement mode to determine a measured distance to said moveable reflective target.

5. The velocity-compensated frequency sweeping interferometer of claim 4, wherein the velocity compensated frequency sweeping interferometer automatically transition between the absolute distance measurement mode and the relative distance measurement mode to determine a measured distance to the moveable reflective target.

6. The velocity-compensated frequency sweeping interferometer of claim 1, wherein the single light beam is a laser beam.

7. The velocity-compensated frequency sweeping interferometer of claim 6 wherein the one of more optics to create an interference beam comprises a Fabry-Perot etalon.

8. The velocity-compensated frequency sweeping interferometer of claim 1, further comprising an outgoing frequency measurement interferometer comprising:
   a) one or more optics configured in the path of the single light beam before it reaches the moveable reflective target to derive a frequency measurement beam single light beam;
   b) one or more optics configured in the path of said frequency measurement beam whereby a frequency interference beam is created;
   c) one or more optoelectronic devices that convert said frequency interference beam into one or more second electrical signals; and
   d) digitizing electronics that produce second digital values of said second electrical signals;
      whereby the change in the optical frequency is measured and used to calculate the wavelength during a frequency scan.

9. The velocity-compensated frequency sweeping interferometer of claim 1, further comprising a second distance measurement interferometer comprising:
   a) a second beam splitter configured between the first beam splitter and the first reference reflector that creates a second reference beam;
   b) a third beam splitter configured between the first beam splitter and the movable reflective target to produce a second measurement beam;
   c) a second combining optics that combines the second reference beam and second measurement beam into a second interference beam;
   d) one or more optoelectronic devices that convert the second interference beam into a second electrical signal;
   e) a digitizing electronic feature that produces a one or more of second digital values of said second electrical signals;
   whereby the difference in distance as measured by the first distance measurement interferometer and the second distance measurement interferometer creates a reference distance that can be used to calculate the optical frequency;
   whereby the calculated optical frequency is used to calculate an absolute distance to the target
   whereby the calculated optical frequency can be used to control the laser to a fixed frequency.

10. The velocity-compensated frequency sweeping interferometer of claim 1, further comprising an index compensating feature that adjusts a measured distance value to a target as a function of a refractive index of air.

11. The velocity-compensated frequency sweeping interferometer of claim 1, further comprising a temperature compensating feature that adjusts a measured distance value to a target as a function of a temperature input.

12. The velocity-compensated frequency sweeping interferometer of claim 1, further comprising a frequency sweep rate algorithm that automatically adjusts the frequency sweep rate.

13. The velocity-compensated frequency sweeping interferometer of claim 1, further comprising frequency sweep range algorithm that automatically adjusts a frequency sweep range.

14. The velocity-compensated frequency sweeping interferometer of claim 1 further comprising a moveable platform;
   wherein at least a portion of the optoelectronic components are coupled to the moveable platform;
   whereby the single light beam can be directed by said moveable platform.

15. The velocity-compensated frequency sweeping interferometer of claim 14, wherein the measurement light producing device is mounted to the moveable platform.

16. The velocity-compensated frequency sweeping interferometer of claim 14, comprising a beam steering feature;

whereby the single light beam is directed by the beam steering feature.

17. The velocity-compensated frequency sweeping interferometer of claim 1, further comprising:
   a) a position sensing device that converts a positioning beam from a position sensing beam splitter to electrical signals; and
   b) digitizing electronics that produce digital values of the position sensing device electrical signals;
      wherein the position sensing device digital values are converted to a displacement value;
      whereby said position sensing device provides a transverse position the moveable target with respect to the measurement beam path.

18. The velocity-compensated frequency sweeping interferometer of claim 17, wherein the one or more optics configured in the path of the frequency measurement beam comprises a Bragg reflector.

19. The velocity-compensated frequency sweeping interferometer of claim 1, further comprising an outgoing frequency indicator comprising:
   a) one or more optics configured in the path of the single light beam before it reaches the moveable reflective target to produce a frequency measurement beam;
   b) one of more optics configured in the path of the frequency measurement beam to produce a frequency indicator beam;
   c) one or more optoelectronic devices that convert said frequency indicator beam into an outgoing frequency electrical signal;
   d) digitizing electronics that produce outing frequency digital values from said outgoing frequency electrical signal.

20. The velocity-compensated frequency sweeping interferometer of claim 1, wherein the one of more optics to create a return frequency interference beam comprises a Fabry-Perot etalon.

21. The velocity compensated frequency sweeping interferometer of claim 1, wherein the return frequency measurement device comprises a return frequency indicator comprising:
   a) one or more optics configured in the path of the frequency measurement beam to produce a frequency indicator beam;
   b) one or more optoelectronic devices that convert said frequency indicator beam into a return frequency electrical signal;
   c) digitizing electronics that produce return frequency digital values from said outgoing frequency electrical signal.

22. The velocity compensated frequency sweeping interferometer of claim 21 wherein the one or more optics configured in the path of the frequency measurement beam comprises a Bragg reflector.

* * * * *